US009607333B2

(12) United States Patent
Ackley et al.

(10) Patent No.: US 9,607,333 B2
(45) Date of Patent: Mar. 28, 2017

(54) NETWORK-BASED SALES SYSTEM WITH A CUSTOMIZABLE USER INTERFACE

(71) Applicant: eBay Inc., San Jose, CA (US)

(72) Inventors: Matthew F. Ackley, San Jose, CA (US); Joseph Aparo, Hamilton, MA (US)

(73) Assignee: eBay Inc., San Jose, CA (US)

( * ) Notice: Subject to any disclaimer, the term of this patent is extended or adjusted under 35 U.S.C. 154(b) by 329 days.

(21) Appl. No.: 14/070,301

(22) Filed: Nov. 1, 2013

(65) Prior Publication Data
US 2014/0058904 A1 Feb. 27, 2014

Related U.S. Application Data

(63) Continuation of application No. 09/441,388, filed on Nov. 16, 1999, now Pat. No. 8,601,373.

(51) Int. Cl.
*G06Q 30/00* (2012.01)
*G06Q 30/06* (2012.01)
*G06Q 40/04* (2012.01)

(52) U.S. Cl.
CPC ..... *G06Q 30/0641* (2013.01); *G06Q 30/0601* (2013.01); *G06Q 40/04* (2013.01)

(58) Field of Classification Search
CPC . G06Q 30/0641; G06Q 30/0601; G06Q 40/04
See application file for complete search history.

(56) References Cited

U.S. PATENT DOCUMENTS

| 4,853,882 A | 8/1989 | Marshall |
| 4,972,318 A | 11/1990 | Brown et al. |

(Continued)

FOREIGN PATENT DOCUMENTS

| CA | 2277848 | 10/1998 |
| CA | 2349913 | 2/2000 |

(Continued)

OTHER PUBLICATIONS

"A Beginners Guide to URLs", [Online]. Retrieved from the Internet: <URL: http://archive.nesa.uiuc.edu/demoweb/url-primer.html>, (2002), 2 pgs.

(Continued)

*Primary Examiner* — Nicholas Augustine
(74) *Attorney, Agent, or Firm* — Schwegman, Lundberg & Woessner, P.A.

(57) ABSTRACT

Systems and methods for a network-based sales system with customizable user interfaces are described. The system generates first and second sales interfaces based on customization commands and communicates the sales interfaces, over a network, through respective member sites to first and second users. The system further receives first and second requests to view a listing of an item that is presented in an offer for sale via the first and second sales interfaces, retrieves a record from a central database system that is changed responsive to a sale of the item that is presented in the first and second sales listings, modifies an object model representation of a central database system based on the retrieval of the record that is changed and regenerates the first and second sales interfaces responsive to the modification of the object model representation.

20 Claims, 48 Drawing Sheets

(56) References Cited

U.S. PATENT DOCUMENTS

| | | |
|---|---|---|
| 4,992,940 A | 2/1991 | Dworkin |
| 5,109,482 A | 4/1992 | Bohrman |
| 5,172,314 A | 12/1992 | Poland et al. |
| 5,404,528 A | 4/1995 | Mahajan |
| 5,640,569 A | 6/1997 | Miller et al. |
| 5,652,850 A | 7/1997 | Hollander |
| 5,664,111 A | 9/1997 | Nahan et al. |
| 5,701,137 A | 12/1997 | Kiernan et al. |
| 5,710,887 A | 1/1998 | Chelliah et al. |
| 5,745,882 A | 4/1998 | Bixler et al. |
| 5,784,539 A | 7/1998 | Lenz |
| 5,809,242 A | 9/1998 | Shaw et al. |
| 5,826,244 A | 10/1998 | Huberman |
| 5,835,896 A | 11/1998 | Fisher et al. |
| 5,845,265 A * | 12/1998 | Woolston ............... G06Q 20/12 705/37 |
| 5,890,138 A | 3/1999 | Godin et al. |
| 5,894,554 A | 4/1999 | Lowery et al. |
| 5,924,077 A | 7/1999 | Beach et al. |
| 5,978,811 A | 11/1999 | Smiley |
| 5,983,199 A | 11/1999 | Kaneko |
| 5,991,739 A | 11/1999 | Cupps et al. |
| 5,999,937 A | 12/1999 | Ellard |
| 6,021,398 A | 2/2000 | Ausubel |
| 6,029,141 A | 2/2000 | Bezos et al. |
| 6,032,153 A | 2/2000 | Sadiq et al. |
| 6,041,310 A | 3/2000 | Green et al. |
| 6,052,667 A | 4/2000 | Walker |
| 6,055,519 A | 4/2000 | Kennedy et al. |
| 6,058,417 A | 5/2000 | Hess et al. |
| 6,064,981 A | 5/2000 | Barni et al. |
| 6,085,176 A * | 7/2000 | Woolston ............... G06Q 20/10 705/16 |
| 6,101,484 A | 8/2000 | Halbert et al. |
| 6,108,639 A * | 8/2000 | Walker ................... G06Q 10/02 705/26.2 |
| 6,119,152 A | 9/2000 | Carlin et al. |
| 6,125,352 A | 9/2000 | Franklin et al. |
| 6,134,548 A | 10/2000 | Gottsman |
| 6,182,053 B1 | 1/2001 | Rauber et al. |
| 6,202,051 B1 | 3/2001 | Woolston |
| 6,243,691 B1 | 6/2001 | Fisher et al. |
| 6,253,188 B1 | 6/2001 | Witek et al. |
| 6,260,024 B1 * | 7/2001 | Shkedy ................ G06Q 10/087 705/23 |
| 6,263,341 B1 | 7/2001 | Smiley |
| 6,266,651 B1 | 7/2001 | Woolston |
| 6,269,343 B1 | 7/2001 | Pallakoff |
| 6,272,472 B1 | 8/2001 | Danneels et al. |
| 6,285,989 B1 | 9/2001 | Shoham |
| 6,295,058 B1 | 9/2001 | Hsu et al. |
| 6,304,855 B1 | 10/2001 | Burke |
| 6,314,424 B1 | 11/2001 | Kaczmarski et al. |
| 6,332,124 B1 | 12/2001 | Loeb et al. |
| 6,356,878 B1 | 3/2002 | Walker et al. |
| 6,356,909 B1 | 3/2002 | Spencer |
| 6,374,229 B1 | 4/2002 | Lowrey et al. |
| 6,393,427 B1 | 5/2002 | Vu et al. |
| 6,401,080 B1 | 6/2002 | Bigus et al. |
| 6,405,175 B1 | 6/2002 | Ng |
| 6,415,270 B1 * | 7/2002 | Rackson ................ G06Q 30/02 705/36 R |
| 6,430,541 B1 | 8/2002 | Brown et al. |
| 6,434,536 B1 | 8/2002 | Geiger |
| 6,470,389 B1 | 10/2002 | Chung et al. |
| 6,473,609 B1 | 10/2002 | Schwartz et al. |
| 6,473,748 B1 | 10/2002 | Archer |
| 6,484,149 B1 | 11/2002 | Jammes et al. |
| 6,496,568 B1 | 12/2002 | Nelson |
| 6,499,052 B1 | 12/2002 | Hoang et al. |
| 6,516,301 B1 | 2/2003 | Aykin |
| 6,560,620 B1 | 5/2003 | Ching |
| 6,564,192 B1 | 5/2003 | Kinney, Jr. et al. |
| 6,584,451 B1 | 6/2003 | Shoham et al. |
| 6,587,837 B1 | 7/2003 | Spagna et al. |
| 6,598,026 B1 | 7/2003 | Ojha et al. |
| 6,606,608 B1 | 8/2003 | Bezos |
| 6,609,133 B2 | 8/2003 | Ng et al. |
| 6,611,881 B1 | 8/2003 | Gottfurcht et al. |
| 6,629,082 B1 | 9/2003 | Hambrecht et al. |
| 6,658,568 B1 | 12/2003 | Ginter et al. |
| 6,671,358 B1 | 12/2003 | Seidman et al. |
| 6,671,670 B2 | 12/2003 | Levin et al. |
| 6,671,818 B1 | 12/2003 | Mikurak |
| 6,684,250 B2 | 1/2004 | Anderson et al. |
| 6,704,713 B1 | 3/2004 | Brett |
| 6,714,915 B1 | 3/2004 | Barnard et al. |
| 6,731,729 B2 | 5/2004 | Eng et al. |
| 6,754,181 B1 | 6/2004 | Elliott et al. |
| 6,868,413 B1 | 3/2005 | Grindrod et al. |
| 6,901,376 B1 | 5/2005 | Sculler et al. |
| 6,910,028 B2 | 6/2005 | Chan et al. |
| 7,010,511 B1 | 3/2006 | Kinney et al. |
| 7,020,632 B1 | 3/2006 | Kohls et al. |
| 7,039,594 B1 | 5/2006 | Gersting |
| 7,039,608 B2 | 5/2006 | Johnson et al. |
| 7,039,860 B1 | 5/2006 | Gautestad |
| 7,039,875 B2 | 5/2006 | Khalfay et al. |
| 7,062,756 B2 | 6/2006 | Kamen et al. |
| 7,065,709 B2 | 6/2006 | Ellis et al. |
| 7,069,242 B1 | 6/2006 | Sheth et al. |
| 7,110,967 B1 | 9/2006 | Espenes et al. |
| 7,120,629 B1 | 10/2006 | Seibel et al. |
| 7,130,807 B1 | 10/2006 | Mikurak |
| 7,133,834 B1 | 11/2006 | Abelow |
| 7,133,835 B1 * | 11/2006 | Fusz ................. G06Q 30/0601 705/26.3 |
| 7,145,898 B1 | 12/2006 | Elliott |
| 7,149,698 B2 | 12/2006 | Guheen et al. |
| 7,165,041 B1 | 1/2007 | Guheen et al. |
| 7,165,248 B2 | 1/2007 | Holtz et al. |
| 7,184,984 B2 | 2/2007 | Glodjo et al. |
| 7,185,044 B2 | 2/2007 | Ryan et al. |
| 7,188,073 B1 | 3/2007 | Tam et al. |
| 7,188,080 B1 | 3/2007 | Walker et al. |
| 7,188,091 B2 | 3/2007 | Huelsman et al. |
| 7,249,044 B2 | 7/2007 | Kumar et al. |
| 7,249,055 B1 | 7/2007 | Elder |
| 7,289,964 B1 | 10/2007 | Bowman-Amuah |
| 7,289,967 B1 | 10/2007 | Brader-Araje et al. |
| 7,308,423 B1 | 12/2007 | Woodward et al. |
| 7,315,826 B1 | 1/2008 | Guheen et al. |
| 7,318,049 B2 | 1/2008 | Iannacci |
| 7,346,559 B2 | 3/2008 | Kraft et al. |
| 7,363,246 B1 | 4/2008 | Van Horn et al. |
| 7,403,920 B2 | 7/2008 | Nishikiori et al. |
| 7,490,060 B2 | 2/2009 | Brown et al. |
| 7,505,932 B2 | 3/2009 | Kemp et al. |
| 7,509,283 B2 | 3/2009 | Friesen et al. |
| 7,558,752 B1 | 7/2009 | Ephrati et al. |
| 7,587,350 B1 | 9/2009 | Stewart et al. |
| 7,596,509 B1 | 9/2009 | Bryson |
| 7,660,740 B2 | 2/2010 | Boone et al. |
| 7,673,319 B1 | 3/2010 | Hendricks et al. |
| 7,818,415 B2 | 10/2010 | Jhanji |
| 7,860,776 B1 | 12/2010 | Chin et al. |
| 7,865,407 B2 | 1/2011 | Kraft et al. |
| 7,883,002 B2 | 2/2011 | Jin et al. |
| 7,895,118 B2 | 2/2011 | Glodjo et al. |
| 8,015,097 B2 | 9/2011 | Lawrence |
| 8,108,277 B2 | 1/2012 | Chin et al. |
| 8,161,081 B2 | 4/2012 | Kaufman et al. |
| 8,229,841 B2 | 7/2012 | Pappas et al. |
| 8,386,328 B2 | 2/2013 | Jin et al. |
| 8,452,670 B2 | 5/2013 | Sutter et al. |
| 8,601,373 B1 | 12/2013 | Ackley et al. |
| 8,876,608 B2 | 11/2014 | Shepherd et al. |
| 8,918,338 B1 | 12/2014 | Bornhofen et al. |
| 9,043,228 B1 | 5/2015 | Ross, Jr. et al. |
| 9,390,449 B2 | 7/2016 | Ackley et al. |
| 2001/0032170 A1 | 10/2001 | Sheth |
| 2001/0043595 A1 | 11/2001 | Aravamudan et al. |
| 2001/0047308 A1 | 11/2001 | Kaminsky et al. |

(56) References Cited

U.S. PATENT DOCUMENTS

| | | |
|---|---|---|
| 2001/0051932 A1 | 12/2001 | Srinivasan |
| 2005/0114229 A1 | 5/2005 | Ackley et al. |
| 2006/0129476 A1 | 6/2006 | Chin et al. |
| 2007/0112645 A1 | 5/2007 | Traynor et al. |
| 2008/0133426 A1 | 6/2008 | Porat et al. |
| 2011/0191201 A1 | 8/2011 | Jin et al. |
| 2013/0166403 A1 | 6/2013 | Jin et al. |

FOREIGN PATENT DOCUMENTS

| | | |
|---|---|---|
| CA | 2377939 | 12/2000 |
| EP | 1001355 A2 | 5/2000 |
| WO | WO-9914688 A2 | 3/1999 |
| WO | WO-0042558 A2 | 7/2000 |

OTHER PUBLICATIONS

"Amazon listing: The Carbohydrate Addict's LifeSpan ProgramL PErsonalized Plan for bcmg Slim Fit Healty your 40's, 50s, 60s, and Beyond", [Online]. Retrieved from the Internet: <URL: http://www.amazon.com/Carbohydrate-Additcs-Lifespan-Parogram-personalized/dp/0525941>, (Jan. 1, 2007), 9 pgs.

"U.S. Appl. No. 09/441,385, Non Final Office Action mailed Apr. 9, 2002", 10 pgs.

"U.S. Appl. No. 09/441,385, Non Final Office Action mailed Sep. 20, 2002", 14 pgs.

"U.S. Appl. No. 09/441,385, Response filed Jul. 9, 2002 to Non Final Office Action mailed Apr. 9, 2002", 10 pgs.

"U.S. Appl. No. 09/441,388, Advisory Action mailed Jan. 2, 2004", 3 pgs.

"U.S. Appl. No. 09/441,388, Advisory Action mailed Jan. 28, 2010", 3 pgs.

"U.S. Appl. No. 09/441,388, Advisory Action mailed Feb. 27, 2012", 3 pgs.

"U.S. Appl. No. 09/441,388, Advisory Action mailed Dec. 12, 2005", 3 pgs.

"U.S. Appl. No. 09/441,388, Amendment filed Nov. 1, 2007", 15 pgs.

"U.S. Appl. No. 09/441,388, Appeal Brief filed Jan. 9, 2006", 21 pgs.

"U.S. Appl. No. 09/441,388, Decision on Pre-Appeal Brief mailed May 8, 2012", 2 pgs.

"U.S. Appl. No. 09/441,388, Examiner's Answer mailed Apr. 5, 2006", 10 pgs.

"U.S. Appl. No. 09/441,388, Final Office Action mailed Feb. 6, 2004", 8 pgs.

"U.S. Appl. No. 09/441,388, Final Office Action mailed Mar. 25, 2011", 23 pgs.

"U.S. Appl. No. 09/441,388, Final Office Action mailed Jun. 23, 2003", 7 pgs.

"U.S. Appl. No. 09/441,388, Final Office Action mailed Aug. 10, 2005", 9 pgs.

"U.S. Appl. No. 09/441,388, Final Office Action mailed Oct. 21, 2008", 12 pgs.

"U.S. Appl. No. 09/441,388, Final Office Action mailed Oct. 30, 2009", 24 pgs.

"U.S. Appl. No. 09/441,388, Final Office Action mailed Dec. 20, 2011", 23 pgs.

"U.S. Appl. No. 09/441,388, Final Office Action mailed Dec. 31, 2002", 12 pgs.

"U.S. Appl. No. 09/441,388, Non Final Office Action mailed Mar. 19, 2009", 21 pgs.

"U.S. Appl. No. 09/441,388, Non Final Office Action mailed Jun. 5, 2002", 11 pgs.

"U.S. Appl. No. 09/441,388, Non Final Office Action mailed Jun. 14, 2004", 9 pgs.

"U.S. Appl. No. 09/441,388, Non Final Office Action mailed Jul. 20, 2011", 22 pgs.

"U.S. Appl. No. 09/441,388, Non Final Office Action mailed Aug. 19, 2010", 22 pgs.

"U.S. Appl. No. 09/441,388, Non-Final Office Action mailed Feb. 8, 2008", 3 pgs.

"U.S. Appl. No. 09/441,388, Non-Final Office Action mailed Aug. 19, 2010", 23 pgs.

"U.S. Appl. No. 09/441,388, Notice of Allowance mailed Jul. 26, 2013", 9 pgs.

"U.S. Appl. No. 09/441,388, Pre-Appeal Brief Filed Mar. 19, 2012", 5 pgs.

"U.S. Appl. No. 09/441,388, PTO Response to 312 Amendment mailed Nov. 8, 2013", 2 pgs.

"U.S. Appl. No. 09/441,388, Response filed Jan. 21, 2009 to Final Office Action mailed Oct. 21, 2008", 16 pgs.

"U.S. Appl. No. 09/441,388, Response filed Feb. 1, 2010 to Advisory Action mailed Jan. 28, 2010", 17 pgs.

"U.S. Appl. No. 09/441,388, Response filed Feb. 20, 2012 to Final Office Action mailed Dec. 20, 2011", 16 pgs.

"U.S. Appl. No. 09/441,388, Response filed Mar. 15, 2005 to Non Final Office Action mailed Jul. 14, 2004", 15 pgs.

"U.S. Appl. No. 09/441,388, Response filed May 6, 2004 to Final Office Action mailed Feb. 6, 2004", 11 pgs.

"U.S. Appl. No. 09/441,388, Response filed May 17, 2011 to Final Office Action mailed Mar. 25, 2011", 21 pgs.

"U.S. Appl. No. 09/441,388, Response filed May 28, 2003 to Final Office Action mailed Dec. 31, 2002", 7 pgs.

"U.S. Appl. No. 09/441,388, Response filed Jun. 8, 2012 to Final Office Action mailed Dec. 20, 2011", 18 pgs.

"U.S. Appl. No. 09/441,388, Response filed Jul. 8, 2008 to Non-Final Office Action mailed Feb. 8, 2008", 22 pgs.

"U.S. Appl. No. 09/441,388, Response filed Jul. 20, 2009 to Non Final Office Action mailed Mar. 19, 2009", 21 pgs.

"U.S. Appl. No. 09/441,388, Response filed Sep. 13, 2004 to Non Final Office Action mailed Jun. 14, 2004", 11 pgs.

"U.S. Appl. No. 09/441,388, Response filed Oct. 7, 2002 to Non Final Office Action mailed Jun. 3, 2002", 7 pgs.

"U.S. Appl. No. 09/441,388, Response filed Oct. 19, 2011 to Non Final Office Action mailed Jul. 20, 2011", 15 pgs.

"U.S. Appl. No. 09/441,388, Response filed Nov. 4, 2005 to Final Office Action mailed Aug. 10, 2005", 10 pgs.

"U.S. Appl. No. 09/441,388, Response filed Dec. 12, 2003 to Final Office Action mailed Jun. 23, 2003", 5 pgs.

"U.S. Appl. No. 09/441,388, Response filed Dec. 17, 2010 to Non Final Office Action mailed Aug. 19, 2010", 18 pgs.

"U.S. Appl. No. 09/441,388, Response filed Dec. 30, 2009 to Final Office Action mailed Oct. 30, 2009", 17 pgs.

"U.S. Appl. No. 09/441,616, Non Final Office Action mailed Jul. 27, 2001", 6 pgs.

"U.S. Appl. No. 09/441,617, Non Final Office Action mailed Jan. 31, 2002", 5 pgs.

"U.S. Appl. No. 09/685,449, Final Office Action mailed Jan. 22, 2010", 23 pgs.

"U.S. Appl. No. 09/685,449, Final Office Action mailed Jun. 20, 2006", 16 pgs.

"U.S. Appl. No. 09/685,449, Advisory Action mailed Sep. 12, 2006", 3 pgs.

"U.S. Appl. No. 09/685,449, Final Office Action mailed Jan. 4, 2005", 8 pgs.

"U.S. Appl. No. 09/685,449, Non Final Office Action mailed Jun. 14, 2004", 9 pgs.

"U.S. Appl. No. 09/685,449, Non Final Office Action mailed Sep. 19, 2005", 13 pgs.

"U.S. Appl. No. 09/685,449, Non-Final Office Action Mailed May 27, 2009", 26 pgs.

"U.S. Appl. No. 09/685,449, Non-Final Office Action mailed Sep. 24, 2007", 7 pgs.

"U.S. Appl. No. 09/685,449, Notice of Allowance mailed Jul. 21, 2010", 14 pgs.

"U.S. Appl. No. 09/685,449, Pre-Appeal Brief Request filed Nov. 20, 2006", 5 pgs.

"U.S. Appl. No. 09/685,449, Response filed Jan. 24, 2008 to Non-Final Office Action mailed Sep. 24, 2007", 12 pgs.

(56) References Cited

OTHER PUBLICATIONS

"U.S. Appl. No. 09/685,449, Response filed Mar. 1, 2005 to Final Office Action mailed Jan. 4, 2005", 18 pgs.
"U.S. Appl. No. 09/685,449, Response filed Mar. 29, 2006 to Non Final Office Action mailed Mar. 2, 2006", 7 pgs.
"U.S. Appl. No. 09/685,449, Response filed May 24, 2010 to Final Office Action mailed Jan. 22, 2010", 9 pgs.
"U.S. Appl. No. 09/685,449, Response filed Jun. 20, 2005 to Restriction Requirement mailed May 19, 2005", 8 pgs.
"U.S. Appl. No. 09/685,449, Response filed Aug. 13, 2008 to Restriction Requirement mailed May 13, 2008", 9 pgs.
"U.S. Appl. No. 09/685,449, Response filed Aug. 21, 2006 to Final Office Action mailed Jun. 20, 2006", 13 pgs.
"U.S. Appl. No. 09/685,449, Response filed Sep. 24, 2004 to Non Final Office Action mailed Jun. 14, 2004", 13 pgs.
"U.S. Appl. No. 09/685,449, Response filed Oct. 27, 2009 to Non Final Office Action mailed May 27, 2009", 11 pgs.
"U.S. Appl. No. 09/685,449, Response filed Nov. 30, 2005 to Non Final Office Action mailed Sep. 19, 2005", 12 pgs.
"U.S. Appl. No. 09/685,449, Response filed Dec. 12, 2003 to Restriction Requirement mailed Sep. 17, 2003", 10 pgs.
"U.S. Appl. No. 09/685,449, Restriction Requirement mailed May 13, 2008", 7 pgs.
"U.S. Appl. No. 09/685,449, Restriction Requirement mailed May 19, 2005", 5 pgs.
"U.S. Appl. No. 09/685,449, Restriction Requirement mailed Sep. 17, 2003", 5 pgs.
"U.S. Appl. No. 09/685,449,Non Final Office Action mailed Mar. 2, 2006", 4 pgs.
"U.S. Appl. No. 09/686,073, Final Office Action mailed Feb. 6, 2006", 15 pgs.
"U.S. Appl. No. 09/686,073, Final Office Action mailed Nov. 5, 2007", 13 pgs.
"U.S. Appl. No. 09/686,073, Advisory Action mailed Apr. 12, 2005", 2 pgs.
"U.S. Appl. No. 09/686,073, Examiner Interview Summary mailed May 22, 2008", 3 pgs.
"U.S. Appl. No. 09/686,073, Non Final Office Action mailed Mar. 29, 2004", 11 pgs.
"U.S. Appl. No. 09/686,073, Non Final Office Action mailed May 8, 2007", 23 pgs.
"U.S. Appl. No. 09/686,073, Non Final Office Action mailed Jun. 30, 2009", 10 pgs.
"U.S. Appl. No. 09/686,073, Non Final Office Action mailed Aug. 12, 2005", 12 pgs.
"U.S. Appl. No. 09/686,073, Non Final Office Action mailed Oct. 5, 2006", 12 pgs.
"U.S. Appl. No. 09/686,073, Non Final Office Action mailed Nov. 5, 2004", 8 pgs.
"U.S. Appl. No. 09/686,073, Non-Final Office Action mailed Mar. 17, 2008", 24 pgs.
"U.S. Appl. No. 09/686,073, Response filed Jan. 8, 2008 to Final Office Action mailed Nov. 5, 2007", 10 pgs.
"U.S. Appl. No. 09/686,073, Response filed Jan. 25, 2007 to Non Final Office Action mailed Oct. 5, 2006", 14 pgs.
"U.S. Appl. No. 09/686,073, Response filed Mar. 24, 2005 to Non Final Office Action mailed Nov. 5, 2004", 8 pgs.
"U.S. Appl. No. 09/686,073, Response filed Apr. 6, 2009 to Restriction Requirement mailed Mar. 5, 2009", 7 pgs.
"U.S. Appl. No. 09/686,073, Response filed Jun. 17, 2008 to Non-Final Office Action mailed Mar. 17, 2008", 10 pgs.
"U.S. Appl. No. 09/686,073, Response filed Jul. 6, 2006 to Final Office Action mailed Feb. 6, 2006", 10 pgs.
"U.S. Appl. No. 09/686,073, Response filed Jul. 29, 2004 to Non Final Office Action mailed Mar. 29, 2004", 10 pgs.
"U.S. Appl. No. 09/686,073, Response filed Nov. 14, 2005 to Non Final Office Action mailed Aug. 12, 2005", 9 pgs.
"U.S. Appl. No. 09/686,073, Response filed Dec. 19, 2003 to Restriction Requirement mailed Oct. 3, 2003", 5 pgs.
"U.S. Appl. No. 09/686,073, Response filed Jul. 31, 2007 to Non Final Office Action mailed May 8, 2007", 16 pgs.
"U.S. Appl. No. 09/686,073, Restriction Requirement mailed Mar. 5, 2009", 6 pgs.
"U.S. Appl. No. 09/686,073, Restriction Requirement mailed Oct. 3, 2003", 4 pgs.
"U.S. Appl. No. 09/686,073, Response filed Nov. 20, 2008 to Non Final Office Action mailed Oct. 21, 2008", 6 pgs.
"U.S. Appl. No. 10/201,586, Advisory Action mailed Jul. 6, 2009", 3 pgs.
"U.S. Appl. No. 10/201,586, Decision on Pre-Appeal Brief Request mailed Jul. 27, 2010", 2 pgs.
"U.S. Appl. No. 10/201,586, Examiner Interview Summary mailed May 13, 2008", 2 pgs.
"U.S. Appl. No. 10/201,586, Final Office Action mailed Mar. 25, 2010", 10 pgs.
"U.S. Appl. No. 10/201,586, Final Office Action mailed Apr. 15, 2008", 10 pgs.
"U.S. Appl. No. 10/201,586, Final Office Action mailed Apr. 29, 2009", 5 pgs.
"U.S. Appl. No. 10/201,586, Final Office Action mailed Nov. 20, 2006", 8 pgs.
"U.S. Appl. No. 10/201,586, Non Final Office Action mailed Apr. 6, 2006", 7 pgs.
"U.S. Appl. No. 10/201,586, Non Final Office Action mailed May 9, 2007", 10 pgs.
"U.S. Appl. No. 10/201,586, Non Final Office Action mailed Oct. 15, 2009", 5 pgs.
"U.S. Appl. No. 10/201,586, Non-Final Office Action mailed Oct. 10, 2008", 4 pgs.
"U.S. Appl. No. 10/201,586, Notice of Allowance mailed Sep. 9, 2008", 6 pgs.
"U.S. Appl. No. 10/201,586, Notice of Allowance mailed Sep. 30, 2010", 6 pgs.
"U.S. Appl. No. 10/201,586, Pre-Appeal Brief Request filed Jun. 23, 2010", 5 pgs.
"U.S. Appl. No. 10/201,586, Pre-Appeal Brief Request filed Jul. 29, 2009", 4 pgs.
"U.S. Appl. No. 10/201,586, Response filed Jan. 9, 2009 to Non-Final Office Action mailed Oct. 10, 2008", 7 pgs.
"U.S. Appl. No. 10/201,586, Response filed Jan. 15, 2010 to Non Final Office Action mailed Oct. 15, 2009", 11 pgs.
"U.S. Appl. No. 10/201,586, Response filed Jan. 17, 2006 to Restriction Requirement mailed Dec. 15, 2005", 7 pgs.
"U.S. Appl. No. 10/201,586, Response filed Feb. 1, 2007 to Final Office Action mailed Nov. 20, 2006", 12 pgs.
"U.S. Appl. No. 10/201,586, Response filed May 15, 2008 to Final Office Action mailed Apr. 15, 2008", 14 pgs.
"U.S. Appl. No. 10/201,586, Response filed Jun. 17, 2009 to Final Office Action mailed Apr. 29, 2009", 9 pgs.
"U.S. Appl. No. 10/201,586, Response filed Jun. 23, 2010 to Final Office Action mailed Mar. 25, 2010", 7 pgs.
"U.S. Appl. No. 10/201,586, Response filed Aug. 8, 2007 to Non-Final Office Action mailed May 9, 2007", 16 pgs.
"U.S. Appl. No. 10/201,586, Response filed Aug. 22, 2006 to Non Final Office Action mailed Apr. 6, 2006", 6 pgs.
"U.S. Appl. No. 10/201,586, Restriction Requirement mailed Dec. 15, 2005", 4 pgs.
"U.S. Appl. No. 11/027,735, Appeal Brief filed Oct. 14, 2009", 26 pgs.
"U.S. Appl. No. 11/027,735, Appeal Decision mailed Aug. 13, 2013", 3 pgs.
"U.S. Appl. No. 11/027,735, Decision on Supplemental Appeal Brief mailed Aug. 19, 2010", 10 pgs.
"U.S. Appl. No. 11/027,735, Final Office Action mailed Apr. 14, 2009", 13 pgs.
"U.S. Appl. No. 11/027,735, Non-Final Office Action mailed Oct. 2, 2008", 7 pgs.
"U.S. Appl. No. 11/027,735, Notice of Allowance mailed Apr. 3, 2008", 7 pgs.
"U.S. Appl. No. 11/027,735, Preliminary Amendment mailed Jan. 26, 2005", 4 pgs.

(56) References Cited

OTHER PUBLICATIONS

"U.S. Appl. No. 11/027,735, Preliminary Amendment mailed Dec. 30, 2004", 3 pgs.
"U.S. Appl. No. 11/027,735, Response filed Jan. 2, 2009 to Non-Final Office Action mailed Oct. 2, 2008", 8 pgs.
"U.S. Appl. No. 11/027,735, Supplemental Appeal Brief filed Feb. 4, 2010", 24 pgs.
"U.S. Appl. No. 11/027,735, Supplemental Appeal Brief filed Jun. 25, 2010", 25 pgs.
"U.S. Appl. No. 11/352,173, *Ex Parte Quayle* Action mailed Jun. 30, 2011", 3 pgs.
"U.S. Appl. No. 11/352,173, Final Office Action mailed Jan. 22, 2010", 18 pgs.
"U.S. Appl. No. 11/352,173, Final Office Action mailed Apr. 14, 2011", 25 pgs.
"U.S. Appl. No. 11/352,173, Non Final Office Action mailed May 27, 2009", 15 pgs.
"U.S. Appl. No. 11/352,173, Non Final Office Action mailed Jun. 22, 2007", 7 pgs.
"U.S. Appl. No. 11/352,173, Non-Final Office Action mailed Jul. 22, 2010", 12 pgs.
"U.S. Appl. No. 11/352,173, Notice of Allowance mailed Sep. 22, 2011", 10 pgs.
"U.S. Appl. No. 11/352,173, Response filed Jan. 24, 2011 to Non Final Office Action mailed Jul. 22, 2010", 7 pgs.
"U.S. Appl. No. 11/352,173, Response filed May 24, 2010 to Final Office Action mailed Jan. 22, 2010", 8 pgs.
"U.S. Appl. No. 11/352,173, Response filed Jun. 14, 2011 to Final Office Action mailed Apr. 14, 2011", 8 pgs.
"U.S. Appl. No. 11/352,173, Response filed Aug. 1, 2011 to *Ex Parte Quayle* Action mailed Jun. 30, 2011", 14 pgs.
"U.S. Appl. No. 11/352,173, Response filed Aug. 30, 2007 to Non Final Office Action mailed Jun. 22, 2007", 8 pgs.
"U.S. Appl. No. 11/352,173, Response filed Oct. 27, 2009 to Non Final Office Action mailed May 27, 2009", 10 pgs.
"U.S. Appl. No. 11/352,173, Response filed Dec. 17, 2007 to Restriction Requirement mailed Nov. 15, 2007", 6 pgs.
"U.S. Appl. No. 11/352,173, Restriction Requirement mailed Nov. 15, 2007", 7 pgs.
"U.S. Appl. No. 11/648,307, Advisory Action mailed May 8, 2009", 3 pgs.
"U.S. Appl. No. 11/648,307, Examiner Interview Summary mailed Mar. 30, 2009", 2 pgs.
"U.S. Appl. No. 11/648,307, Final Office Action mailed Feb. 23, 2009", 10 pgs.
"U.S. Appl. No. 11/648,307, Non Final Office Action mailed Aug. 20, 2009", 10 pgs.
"U.S. Appl. No. 11/648,307, Non-Final Office Action mailed Aug. 25, 2008", 9 pgs.
"U.S. Appl. No. 11/648,307, Preliminary Amendment mailed Dec. 29, 2006", 3 pgs.
"U.S. Appl. No. 11/648,307, Response filed Apr. 17, 2008 to Restriction Requirement mailed Mar. 17, 2008", 6 pgs.
"U.S. Appl. No. 11/648,307, Response filed Apr. 23, 2009 to Final Office Action mailed Feb. 23, 2009", 9 pgs.
"U.S. Appl. No. 11/648,307, Response filed Nov. 11, 2008 to Non-Final Office Action mailed Aug. 25, 2008", 9 pgs.
"U.S. Appl. No. 11/648,307, Restriction Requirement mailed Mar. 17, 2008", 7 pgs.
"U.S. Appl. No. 13/017,471, Non Final Office Action mailed Apr. 16, 2012", 5 pgs.
"U.S. Appl. No. 13/017,471, Notice of Allowance mailed Oct. 16, 2012", 5 pgs.
"U.S. Appl. No. 13/017,471, Response filed Feb. 7, 2012 to Restriction Requirement mailed Jan. 12, 2012", 6 pgs.
"U.S. Appl. No. 13/017,471, Response filed Aug. 16, 2012 to Non Final Office Action mailed Apr. 16, 2012", 10 pgs.
"U.S. Appl. No. 13/017,471, Restriction Requirement mailed Jan. 12, 2012", 5 pgs.

"Australian Application Serial No. 2002355130, Examiner's First Report mailed Aug. 7, 2007", 2 pgs.
"Australian Application Serial No. 2002355130, First Office Action mailed Aug. 15, 2007", 1 pg.
"Australian Application Serial No. 2002355130, Response filed May 29, 2008 to Examiner's First Report mailed Aug. 7, 2007", 22 pgs.
"Canadian Application Serial No. 2,455,639, Office Action mailed Jul. 20, 2009", 5 pgs.
"Canadian Application Serial No. 2,455,639, Response filed Jan. 20, 2010 to Office Action mailed Jul. 20, 2009", 24 pgs.
"Canadian Application Serial No. 2,455,639, Response filed Nov. 15, 2012 to Office Action mailed May 15, 2012", 23 pgs.
"Canadian Application Serial No. 2,455,639, Office Action mailed May 15, 2012", 4 pgs.
"Chinese Application Serial No. 02818562.5, Decision on Rejection mailed Sep. 15, 2011", with English translation of claims, 12 pgs.
"Chinese Application Serial No. 02818562.5, Fourth Office Action mailed Jun. 15, 2011", with English translation of claims, 8 pgs.
"Chinese Application Serial No. 02818562.5, Office Action mailed Jun. 19, 2009", with English translation of claims, 12 pgs.
"Chinese Application Serial No. 02818562.5, Office Action mailed Aug. 3, 2010", with English translation of claims, 7 pgs.
"Chinese Application Serial No. 02818562.5, Office Action Mailed Dec. 5, 2008", with English translation of claims, 8 pgs.
"Chinese Application Serial No. 02818562.5, Reexamination Notification mailed May 8, 2013", with English translation., 7 pgs.
"Chinese Application Serial No. 02818562.5, Response filed Apr. 20, 2009 to Office Action mailed Dec. 5, 2008", with English translation of claims, 11 pgs.
"Chinese Application Serial No. 02818562.5, Response filed Aug. 30, 2011 to Office Action mailed Jun. 15, 2011", with English translation of claims, 9 pgs.
"Chinese Application Serial No. 02818562.5, Response filed Sep. 4, 2009 to Office Action mailed Jun. 19, 2009", with English translation of claims, 11 pgs.
"Chinese Application Serial No. 02818562.5, Response filed Dec. 30, 2011 to Office Action mailed Sep. 15, 2011", with English translation of claims, 7 pgs.
"Chinese Application Serial No. 02818562.5, Response filed on Nov. 4, 2010", with English translation of claims, 9 pgs.
"European Application Serial No. 01986779, Voluntary Amendment filed Oct. 26, 2009", 16 pgs.
"European Application Serial No. 01986779.5, Office Action Mailed Dec. 3, 2008", 9 pgs.
"European Application Serial No. 01986779.5, Supplemental European Search Report mailed Jul. 9, 2008", 3 pgs.
"European Application Serial No. 02752516.1, Office Action mailed Feb. 20, 2009", 3 pgs.
"European Application Serial No. 01986779.5, Response filed Jun. 15, 2009 to Office Action mailed Dec. 3, 2008", 18 pgs.
"International Application Serial No. PCT/US02/23289, International Search Report mailed May 27, 2003", 2 pgs.
"Mercata—Group Buying Power", [Online]. Retrieved from the Internet: <URL: http://mercata.com>, (Downloaded Aug. 9, 2006).
"Onedayfree-B2B product exchange powered by the Dynamic Price Calendar Auction", [Online]. Retrieved from the Internet: <URL: http://web.archive.org/web/20001007030239/http://www.onedayfree.com/>, (2000).
"Priceline.com Airline Tickets", [Online]. Retrieved from the Internet: <URL: http://www.pricline.com/travel/airlines>, (Downloaded Aug. 9, 2006).
"Ubid listing: 1$ No Reserve Genuine Buffalo Leather Cruiser Motorcycle Jacket", [Online]. Retrieved from the Internet: <URL: http://www.ubid.com/category/listing.aspx?catid=O&uwb=uwb63174&AID=10297033&PID=799335>, (Jul. 11, 2000), 12 pgs.
"Welcome to the ODBC Section of the Microsoft Universal Data Access Web Site", (2001), 1 pg.
Anonymous, "Standard on ratio studies", Assessment Journal, (1999), 1-74.

(56) References Cited

OTHER PUBLICATIONS

Brain, Marshall, "How Domain Servers Work", [Online]. Retrieved from the Internet: <URL: http://www.howstuffworks.com/dns.htm/printable>, (2002), 9 pgs.

Elliott, S R, "Innovative Rate Structures for Electrical Utility peak Load Management: An Experimental Approach", University of Colorado at Boulder, (1990), p. 1.

Ketcham, J, et al., "A Comparison of Posted-Offer and Double-Auction Pricing Institutions", The Review of Economic Studies; vol. 51, No. 4, (Oct. 1984), 595-614 Pages.

Ketcham, Jon, et al., "A Comparison of Posted-Offer and Double-Auction Pricing Institutions", The Review of Economic Studies, vol. 51, No. 4, (Oct. 1984), 595-614.

Lottor, M., "Domain Administrators Operations Guide", Network Working Group, Request for Comments: 1033, SRI International, [Online]. Retrieved from the Internet: <URL: http://rfc.sunsite.dk/rfc/rfc1033.html\>, (Nov. 1987), 1-22.

Lucking-Reiley, David, "Auctions on the Internet: What's Being Auctioned, and How?", JEL: D44 (Auctions), (Aug. 14, 1999), pp. 1-55.

Mockapetris, P., "Domain Names: Concepts and Facilities", Network Working Group, Request for Comments: 1034, [Online]. Retrieved from the Internet: <URL: http://rfc.sunsite.dk/rfc/rfc1034.html>, (Nov. 1987), 1-55.

Monkey, W. T., "Intro to HTML", [Online]. Retrieved from the Internet: <URL: http://hotwired.lycos.com/webmonkey/96/53/index.html?tw=authoring>, (2001), 22 pgs.

Narayanaswamy, Shankar, et al., "Abstract; User Interface for a PCS smart phone", AT&T Bell Labs; IEEE, (Jul. 1999), 1.

Narayanaswamy, Shankar, et al., "User Interface for a PCS Smart Phone", Bell Laboratories; IEEE, (Jul. 1999), 777-781.

Reiley, Lucking David, "Auctions on the internet", What's Being Auctioned, and How?, (Aug. 14, 1999), 1-55.

Rittenhouse, R C, "Action builds on 1990 Clean Air Act compliance", Power Engineering v96, n5, (May 1992), 1-6 Pages.

Timothy, S V, "A model of the Perishable Inventory System with Reference to Consumer-Realized Product Expiration", The journal of the Operational Research Society; vol. 45, No. 5, (May 1991), 519-528 Pages.

William Jr., P, et al., "Toy Story", Barron's, v79, n52;, (Dec. 27, 1999), 1-4.

U.S. Appl. No. 09/441,386, filed Nov. 16, 1999, Network-Based Sales System.

U.S. Appl. No. 09/441,616, filed Nov. 16, 1999, Item Categorization System for Network-Based Sales.

U.S. Appl. No. 11/027,735, filed Dec. 30, 2004, Network-Based Sales System With Customizable and Categorization User Interface.

U.S. Appl. No. 09/441,617, filed Nov. 16, 1999, Network-Based Sales System With Bulk Upload Interface.

U.S. Appl. No. 09/686,073, filed Oct. 11, 2000, Sales System With Sales Activity Feedback.

U.S. Appl. No. 09/441,385, filed Nov. 16, 1999, Publishing System for Network-Based Sales.

U.S. Appl. No. 11/648,307, filed Dec. 29, 2006, Sales System With Sales Activity Feedback.

U.S. Appl. No. 13/774,394, filed Feb. 22, 2013, Automated Listing Management.

"U.S. Appl. No. 11/027,735, Non Final Office Action mailed Feb. 14, 2014", 8 pgs.

"U.S. Appl. No. 11/027,735, Examiner Interview Summary mailed Sep. 11, 2014", 3 pgs.

"U.S. Appl. No. 11/027,735, Final Office Action mailed Jul. 29, 2014", 8 pgs.

"U.S. Appl. No. 11/027,735, Non Final Office Action mailed Aug. 14, 2015", 11 pgs.

"U.S. Appl. No. 11/027,735, Notice of Non-Compliant Appeal Brief mailed Jan. 4, 2010", 2 pgs.

"U.S. Appl. No. 11/027,735, Reply Brief filed Oct. 19, 2010", 4 pgs.

"U.S. Appl. No. 11/027,735, Response filed May 14, 2014 to Non Final Office Action mailed Feb. 14, 2014", 12 pgs.

"U.S. Appl. No. 11/027,735, Response filed Sep. 29, 2014 to Final Office Action mailed Feb. 14, 2014", 14 pgs.

"U.S. Appl. No. 11/027,735, Response filed Nov. 16, 2015 to Non Final Office Action mailed Aug. 14, 2015", 6 pgs.

"U.S. Appl. No. 13/774,394, Non Final Office Action mailed Sep. 4, 2015", 6 pgs.

"U.S. Appl. No. 13/774,394, Response filed Aug. 13, 2015 to Restriction Requirement mailed Jul. 20, 2015", 6 pgs.

"U.S. Appl. No. 13/774,394, Restriction Requirement mailed Jul. 20, 2015", 6 pgs.

"U.S. Appl. No. 11/027,735, 312 Amendment filed Mar. 30, 2016", 5 pgs.

"U.S. Appl. No. 11/027,735, Corrected Notice of Allowance mailed Jun. 10, 2016", 7 pgs.

"U.S. Appl. No. 11/027,735, Notice of Allowance mailed Mar. 2, 2016", 10 pgs.

"U.S. Appl. No. 11/027,735, PTO Response to 312 Amendment mailed Apr. 8, 2016", 2 pgs.

"U.S. Appl. No. 13/774,394, Non Final Office Action mailed May 13, 2016", 10 pgs.

"U.S. Appl. No. 13/774,394, Notice of Allowance mailed Oct. 7, 2016", 8 pgs.

"U.S. Appl. No. 13/774,394, Response filed Apr. 21, 2016 to Final Office Action mailed Jan. 21, 2016", 16 pgs.

"U.S. Appl. No. 13/774,394, Response filed Aug. 4, 2016 to Non Final Office Action mailed May 13, 2016", 21 pgs.

"U.S. Appl. No. 13/774,394, Final Office Action mailed Jan. 21, 2016", 7 pgs.

"U.S. Appl. No. 13/774,394, Response filed Dec. 3, 2015 to Non Final Office Action mailed Sep. 4, 2015", 15 pgs.

* cited by examiner

FIG. 6

![Screenshot of advanced search form in Netscape browser]

```
╔═══════════════════════════════════════════════════════════════════╗
║ ✱MY AUCTIONPLACE SETUP - NETSCAPE                        □□⊠ ║
║ FILE EDIT VIEW GO WINDOW HELP                                     ║
║ ← BACK ⇒ FORWARD RELOAD  HOME SEARCH NETSCAPE PRINT SECURITY STOP ║
║ ⌂▽BOOKMARKS 🔍 LOCATION: HTTP://AUCTIONS.EXCITE.COM/SCRIPTS/LOTSEARCH.ASP?SITECATNO=18223 ║
```

\ EXCITE  AUCTIONS
         AUCTIONS.EXCITE.COM                                MEMBER
                                                            FAIR MARKET
                                                    MY EXCITE | CHECK EMAIL

TICKETS.COM    🎸 LIMP BIZKIT    ONLY THE BEST SEATS
                              CLICK HERE!

[TOOLS]   SEARCH   SELL AN ITEM   REGISTER   MY ACCOUNT   HELP   CLASSIFIEDS

EXCITE HOME > AUCTIONS HOME > SEARCH LISTINGS > ADVANCED SEARCH
                                                                SEARCH LIST
PRODUCT INFORMATION
LOOKING FOR A SPECIFIC PRODUCT FIRST SELECT A CATEGORY TO SEE A LIST OF SPECIFIC PRODUCT ATTRIBUTES (WHEN YOU
SELECT A CATEGORY THE PAGE WILL REFRESH TO DISPLAY THE PRODUCT ATTRIBUTES )

CATEGORY        [ COINS/US                    ▽ ]
    TYPE            [ ALL         ▽ ]
    YEAR            [                ]
    CONDITION       [ ALL              ▽ ]

LISTING INFORMATION
    DESCRIPTION     [                            ]
    FOR SALE BY     ○ MERCHANT   ○ PRIVATE PARTY   ○ EITHER
    TYPE            [ ALL         ▽ ]
    PRICE           BETWEEN [       ] AND [       ]
    END DATE        BETWEEN [       ] AND [       ] (MM/DD/YYYY)
    LISTING #       [              ]
    RESERVE PRICE   ○ YES    ○ NO    ⊙ EITHER

SELLERS INFORMATION
    SELLER NAME     [                            ]
    SELLERS RATING  [ ALL SELLERS   ▽ ]
    SELLERS LOCATION [ ALL          ▽ ]

GEOGRAPHIC INFORMATION
    ZIP/POSTAL CODE [                            ]
    SEARCH RADIUS   [ -CHOOSE ONE- ▽ ]

[ SEARCH ]   [ RESET ]   [ CANCEL ]

DOCUMENT DONE

```
╔═ MY AUCTIONPLACE SETUP - NETSCAPE ═══════════════════════════════ □ □ ⊠ ╗
  FILE  EDIT  VIEW  GO  WINDOW  HELP
  ⇐ BACK  ⇒ FORWARD  RELOAD  HOME  SEARCH  NETSCAPE  PRINT  SECURITY  STOP          N
  ▽ BOOKMARKS   LOCATION: HTTP://AUCTIONS.EXCITE.COM/SCRIPTS/CUSTLOTADD.ASP?SITECATNO=18223&CCID=69291
```

AUCTIONS                                                    ┌─────────┐
  EXCITE AUCTIONS.EXCITE.COM                                         │ MEMBER  │
                                                                     │FAIR MARKET│
                                                                     └─────────┘
                                              MY EXCITE │ CHECK EMAIL

┌──────────────────────────────────────┐
              │ ▯    INTRODUCING 74 PER MIN.         │
              │       ALL DAY, EVERY DAY             │
              │                         ┌──────────┐ │
              │                         │CLICK HERE!│ │
              └──────────────────────────────────────┘
                          CLICK HERE !

[TOOLS]   SEARCH   SELL EN ITEM   REGISTER   MY ACCOUNT   HELP   CLASSIFIEDS

EXCITE HOME > AUCTIONS HOME > PLACE LISTING > COINS AND STAMPS > COINS > US
                                                                     FEES SELECT FAQ
  USE THE FORM BELOW TO EDIT YOUR LISTINGS FIELDS WITH AN * ARE REQUIRED

LISTING INFORMATION

ENTER THE TYPE OF LISTING YOU WISH TO PLACE:
      LISTING TYPE *                    ⊙ ENGLISH AUCTION         ⟋ 152
      (WHAT IS THE DIFFERENCE)          ○ DUTCH AUCTION

ENTER THE TITLE OF YOUR LISTING:
      LISTING TITLE *                   ┌──────────────────────────┐
      (SOME BASIC NEEDS)                └──────────────────────────┘

ENTER WHEN YOU WANT THE LISTING TO START, WHEN YOU WANT IT TO END, AND THE NUMBER OF ITEMS THAT YOU HAVE FOR
  SALE:
      LISTING START DATE *   [11/9/99]      START TIME *      [2 PM ▽]
      (MM/DD/YYYY)                          (EST)

LISTING END DATE *     [11/9/99]      END TIME *        [2 PM ▽]
      (MM/DD/YYYY)                          (EST)

AVAILABLE QUANTITY *   [1]

ENTER THE OPENING BID, THE RESERVE/THRESHOLD PRICE, AND THE MINIMUM QUANTITY A USER MUST PURCHASE:

OPENING BID *              [       ]
      (MM/DD/YYYY)

RESERVE/THRESHOLD PRICE *  [       ]
      (WHAT IS THIS ?)

MINIMUM QUANTITY *         [       ]
      (WHEN SHOULD I USE THIS ?)

PRODUCT INFORMATION
  PLEASE DESCRIBE THE PRODUCT .. YOU MAY USE BASIC HTML BUT PLEASE DO NOT USE QUOTATION MARKS. THERE IS A LIMIT
  OF 64K (ABOUT 8,000 WORDS):
      (SOME BASIC HTML GUIDELINES)
                                                            ⟋ 154
      ┌─────────────────────────────────────────────────┐
      │                                                 │
      │                                                 │▮
      └─────────────────────────────────────────────────┘
                                                              150

│DOCUMENT DONE

*FIG. 14A*

```
┌─────────────────────────────────────────────────────────────────────┐
│ ✕ MY AUCTIONPLACE SETUP - NETSCAPE                          ▭ ⃞ ✕  │
│ FILE  EDIT  VIEW  GO  WINDOW  HELP                                  │
│ ⇦ BACK  ⇨ FORWARD  RELOAD  HOME  SEARCH  NETSCAPE  PRINT  SECURITY  STOP  N│
│ ▽BOOKMARKS  LOCATION: │HTTP://AUCTIONS.EXCITE.COM/SCRIPTS/CUSTLOTADD.ASP?SITECATNO=18223&CCID=69291│ │
│   (SOME BASIC HTML GUIDELINES)                                   ▲  │
│   ┌───────────────────────┐                                         │
│   │                       │                                         │
│   │                       │                                         │
│   │                       │                                         │
│   └───────────────────────┘                                         │
│                                                                     │
│   ADD A URL WITH A PICTURE OF YOUR PRODUCT:                         │
│      IMAGE URL                    ┌──────────────────────┐          │
│      (SOME TIPS AND TRICKS)       └──────────────────────┘          │
│                                                                     │
│   PLEASE SELECT THE SPECIFICATIONS WHICH BEST DESCRIBE YOUR PRODUCT:│
│      TYPE *                       ┌─ -PLEASE CHOOSE ONE- ▽┐         │
│      YEAR                         ┌──────────────────────┐          │
│                                   └──────────────────────┘          │
│      CONDITION                    ┌─ -CHOOSE OPTION-     ▽┐         │
│                                                                     │
│   PAYMENT/SHIPPING INFORMATION                                      │
│   PLEASE ENTER THE PAYMENT METHODS THAT YOU WOULD LIKE THE BUYER TO USE:│
│      (PAYMENT IDEAS)                                      ╱─156     │
│         ☐ VISA              ☐ MASTERCARD                            │
│         ☐ AMERICAN EXPRESS  ☐ PREPAY                                │
│         ☐ COD               ☐ WIRE                                  │
│         ☐ ESCROW            ☐ CASHIER'S CHECK                       │
│         ☐ MONEY ORDER       ☐ SEE DESCRIPTION                       │
│         ☐ OTHER                                                     │
│   ENTER YOUR CITY, STATE AND COUNTRY:                               │
│      LOACTION                     ┌──────────────────────┐          │
│      (SOME TIPS AND TRICKS)       └──────────────────────┘          │
│   PLEASE ENTER THE SHIPPING METHODS THAT YOU CAN USE IN ORDER TO SEND THE ITEM TO THE BUYER:│
│      (SHIPPING IDEAS)                                               │
│         ☐ FEDEX OVERNIGHT   ☐ UPS OVERNIGHT                         │
│         ☐ FEDEX 2 DAY       ☐ PREPAY                                │
│         ☐ COD               ☐ UPS 2 DAY                             │
│         ☐ US POSTAL SERVICE ☐ UPS GROUND                            │
│         ☐ SEE DESCRIPTION   ☐ OTHER                                 │
│                    158─┤ REVIEW LISTING │  │ CLEAR FORM │           │
│                                                                     │
│         AUCTIONS TOOLS │ MY ACCOUNT │ FAQS │ QUESTIONS & COMMENTS │ TERMS │ FEES │
│         HELP  ADD URL  ADVERTISE ON EXCITE  EXCITE AFFILIATES  PRESS RELEASES  JOBS@EXCITE│
│              COPYRIGHT © 1995 EXCITE INC. ALL RIGHT RESERVED  DISCLAIMER  ▽│
│ ⌐┘      │DOCUMENT DONE                                              │
└─────────────────────────────────────────────────────────────────────┘
```

*FIG. 14B*

```
MY AUCTIONPLACE SETUP - NETSCAPE
FILE  EDIT  VIEW  GO  WINDOW  HELP
← BACK  → FORWARD  RELOAD  HOME  SEARCH  NETSCAPE  PRINT  SECURITY  STOP
BOOKMARKS  LOCATION: HTTP://AUCTIONS.EXCITE.COM/SCRIPTS/CUSTLOTADD.ASP
```

EXCITE  AUCTIONS
AUCTIONS.EXCITE.COM                                     MEMBER FAIR MARKET
                                                        MY EXCITE | CHECK EMAIL

ONLINE GAMBLING       CHOOSE YOUR GAME NOW !!!
⊙ BLACKJACK  ○ SLOT MEANING                              GAMES
○ ROULETTE   ○ ROULETTE                                  REVIEW
                      CLICK HERE !

[TOOLS]   SEARCH   SELL EN ITEM   REGISTER   MY ACCOUNT   HELP   CLASSIFIEDS

EXCITE HOME > AUCTIONS HOME > PLACE LISTING > COINS AND STAMPS > COINS > US

TO EDIT THIS LISTINGS, USE YOUR BROWSER'S BACK ARROW BUTTON
LISTING INFORMATION
PRODUCT NAME:        1997 QUARTER
LOCATION:
LISTING TYPE:        ENGLISH AUCTION
START DATE AND TIME: 11/11 1PM
END DATE AND TIME:   11/12 7PM                    ⟋— 162
DURATION:            1 DAY 6 HOURS
QUANTITY FOR SALE:   1
OPENING BID:         $1.00
RESERVE PRICE:       $100.00
MIN QUANTITY:        1
PAYMENT OPTIONS:     CASHIER'S CHECK
SHIPPING OPTIONS:    FEDEX OVERNIGHT, FEDEX 2 DAY, US POSTAL SERVICE
TYPE:                QUARTERS
YEAR:                1997
CONDITION:           SBOUT GOOD (AG-3)
IMAGE URL:
DESCRIPTION:         MAY BRING GOOD LUCK           ⟋— 164

MERCHANDISING OPTIONS
SELECT THINGS YOU CAN DO TO PROMOTE YOUR ITEM ON THE SITE:
(MORE INFO)
    ☐ FEATURED ON HOME PAGE[1]   $49.95
    ☐ FEATURED ON CATEGORY       $9.95
    ☐ BOLD                       $2.00

BIDDER REQUIREMENTS
INDICATE IF A BIDDER NEEDS TO HAVE A CREDIT CARD TO PLACE A BID ON THIS LISTING:   ⟋— 166
    BIDDER CREDIT CARD REQUIRED                              ○ YES
    (MORE INFO)                                              ⊙ NO
          168 — [PLACE LISTING]  [CANCEL LISTING]                     160

DOCUMENT DONE

*FIG. 15*

```
MY AUCTIONPLACE SETUP - NETSCAPE
FILE EDIT VIEW GO WINDOW HELP
<= BACK => FORWARD  RELOAD  HOME  SEARCH  NETSCAPE  PRINT  SECURITY  STOP
BOOKMARKS  LOCATION: HTTP://AUCTIONS.EXCITE.COM/SCRIPTS/MASSUPLOAD.ASP
```

EXCITE AUCTIONS
AUCTIONS.EXCITE.COM

MEMBER FAIR MARKET

MY EXCITE | CHECK EMAIL

HAVE AN ONLINE BUSINESS?   BANNERNETWORK MICROSOFT BCENTRAL
LINKEXCHANGE

[TOOLS]   SEARCH   SELL EN ITEM   REGISTER   MY ACCOUNT   HELP   CLASSIFIEDS

EXCITE HOME > AUCTIONS HOME > MY ACCOUNT > SELLER INFORMATION > MASS UPLOAD

FOLLOW THESE SIMPLE STEPS TO UPLOAD YOUR LISTINGS

- CREATE A TAB DELIMITED TEXT FILE (SAVE AN EXCEL FILE AS A TXT FILE) OR MODIFY YOUR PRESENT FILE WITH THE HEADINGS LISTED BELOW IF YOU DO NOT HAVE A PREPARED FILE. YOU CAN CLICK HERE TO CREATE AN EXCEL TEMPLATE TO BE USED IN UPLOADING YOUR LISTING. THE FILE SHOULD SHOW CATEGORY HEADINGS LISTED BELOW. EACH ROW FOLLOWING SHOULD BE A UNIQUE LISTING. ONLY ONE LISTING PER ROW PLEASE
- VIEW OR PRINT THIS EXAMPLE FOR REFERENCE (THIS IS NOT A TEMPLATE. PLEASE DO NOT USE IT TO UPLOAD LISTINGS)

TO UPLOAD YOUR FILE ENTER THE DIRECTORY BELOW OR CLICK ON BROWSE TO FIND IT. PLEASE LIMIT YOUR FILE SIZE TO...

FILE: [         ] [BROWSE...]
LOCATION: [              ]

[SUBMIT] [RESET] [CANCEL]

FILE EXAMPLE    CATEGORY NUMBERS LIST
THE FOLLOWING IS AN EXPLANATION OF ALL FIELDS REQUIRED FOR THE UPLOAD FILE

LISTING TYPE IF YOU WOULD LIKE TO RUN YOUR POSTING AS AN ENGLISH AUCTION, PUT AN "A" IN THE FIELD IF YOU WANT TO RUN YOUR LISTING AS A "DUTCH" AUCTION, PUT A "D" IN THIS FIELD

CATEGORY NUMBER THE CATEGORY NUMBER IS THE NUMBER THAT CORRESPONDS TO THE CATEGORY YOU ARE LISTING UNDER. FOR EXAMPLE, IF YOU ARE POSTING A LAPTOP, YOU WOULD FILL IN THE NUMBER 14 SEE THE CATEGORY LIST FOR ALL CATEGORIES AND CORRESPONDING CATEGORY NUMBERS. SELECT THE CATEGORY THAT BEST DESCRIBES THE PRODUCT YOU WANT TO LIST

LISTING TITLE – THIS IS THE FIRST THING THAT BUYERS WILL SEE WHEN THEY SEARCH FOR OR BROWSE LISTINGS. HERE'S YOUR BEST CHANCE TO ENCOURAGE BIDDERS -- TO COMMUNICATE THE KEY POINTS OF THE ITEM YOU'RE LISTING WITH A FEW WELL CHOSEN WORDS (YOU HAVE MAX. 100 CHARACTERS FOR YOUR TITLE)

AVAILABLE QUANTITY – THIS IS THE TOTAL NUMBER OF UNITS AVAILABLE IN THE LISTING. IF YOU HAVE 100 MODEMS AVAILABLE ENTER "00" – THIS FIELD IF YOU ARE LISTING YOUR POSTING IN A DUTCH AUCTION. THIS VALUE MUST BE MORE THAN 1

MIN. PURCHASE QTY.- THIS IS THE TOTAL NUMBER OF UNITS AVAILABLE TO EACH BUYER IF YOU HAVE 100 MODEMS USED BUT YOU WANT TO SHIP ORDERS OF LESS THAN 5. THEN PUT 5 IN THIS FIELD. IF YOU WANT TO SHIP THE ENTIRE LISTING AS A SINGLE USER THEN PUT 100 IN THIS FIELD

OPENING BID/PRICE – IF YOU PLAN TO POST AN AUCTION, THE OPENING BID IS THE STARTING BID (IN US DOLLARS) PER UNIT OR TELL THE MINIMUM PURCHASE QUANTITY FOR YOUR MODEMS TO 20 AND THE OPENING BID TO $10, THE EXTENDED TOTAL IS $200 OR PUT THE POSSIBLE INTIAL BID. IF YOU ARE POSTING A CLASSIFIED AD, YOUR DESIRED PRICE GOES IN THIS FIELD

170

DOCUMENT DONE

*FIG. 17*

```
ADMIN – USER INTERFACE – NETSCAPE
FILE  EDIT  VIEW  GO  WINDOW  HELP
← BACK  → FORWARD  RELOAD  HOME  SEARCH  NETSCAPE  PRINT  SECURITY  STOP
BOOKMARKS  LOCATION: HTTPS://ADMIN.FAIRMARKET.COM/ADMIN/TEMPLATEMAINT.ASP
```

| FAIR MARKET | AUCTION ADMIN |
|---|---|

TEMPLATE MAINTENANCE
ADMIN HOME | USER INTERFACE

ADMIN HELP

LAYOUT HTML

PLEASE USE THE LINK BELOW TO EDIT THE HTML IN EACH PAGE TEMPLATE
HTML PAGE TEMPLATES

LAYOUT OPTIONS

| SHOW AUCTION CLOCK: | ✓ |
|---|---|
| ENGLISH AUCTION IMAGE: | HTTP://IMAGES.FAIRMARKET.COM/IMAGES/A.GIF |
| DUTCH AUCTION IMAGE: | HTTP://IMAGES.FAIRMARKET.COM/IMAGES/D.GIF |
| QUICKWIN AUCTION IMAGE: | HTTP://IMAGES.FAIRMARKET.COM/IMAGES/Q.GIF |
| CLASSIFIED IMAGE: | HTTP://IMAGES.FAIRMARKET.COM/IMAGES/C.GIF |
| RESERVE PRICE IMAGE: | HTTP://IMAGES.FAIRMARKET.COM/IMAGES/R.GIF |
| MERCHANT LISTING IMAGE: | HTTP://IMAGES.FAIRMARKET.COM/IMAGES/FINALSTAR.GIF |
| LISTING PHOTO IMAGE: | HTTP://IMAGES.FAIRMARKET.COM/IMAGES/CAMERA1.GIF |
| HOT IMAGE: | HTTP://IMAGES.FAIRMARKET.COM/IMAGES/HOT1.GIF |
| NEW IMAGE: | HTTP://IMAGES.FAIRMARKET.COM/IMAGES/NEW.GIF |
| AUCTIONPLACE USER IMAGE: | HTTP://IMAGES.FAIRMARKET.COM/IMAGES/AUCTIONPLACEUSER.GIF |
| DEFAULT AD REFNO: | |
| SHOW COUNTS: | ☐ |

[PUBLISH]

DOCUMENT DONE

*FIG. 20*

```
NETSCAPE                                                      _ □ ×
FILE  EDIT  VIEW  GO  WINDOW  HELP
← BACK  → FORWARD  RELOAD  HOME  SEARCH  NETSCAPE  PRINT  SECURITY  STOP    N
   BOOKMARKS    LOCATION: HTTPS://ADMIN.FAIRMARKET.COM/ADMIN/CATTREEFRAME.ASP
```

📁 CATEGORY TREE
   📁 COMPUTERS
   📁 ENTERTAINMENT, GIFT, TRAVEL
   📁 EQUIPMENT & SUPPLIERS
   📁 GENERAL MERCHANDISE
   📁 SHELTERS

FAIR MARKET            AUCTION ADMIN

CATEGORY INFORMATION

ADMIN HOME | CATEGORY TREE | CD RECORDERS

CATEGORY DETAILS

MODIFY    DELETE
NAME:               COMPUTERS
DESCRIPTION:
ALLOW PRODUCTS:      YES
PROMOTION TEXT:
CAT REF. NO.:
AD REF. NO.:
STATUS:            USED

PARENT CATEGORY:      STORAGE

MAPPED FAIRMARKET NETWORK CATEGORY/CD RECORDERS [CHANGE MAPPING]

CATEGORY SPECIFICATION

| SPEC NAME | DATA TYPE | INPUT TYPE | USED BY | INPUT REQUIRED | STATUS |
|---|---|---|---|---|---|
| MANUFACTURER | STRONG | FREE TEXT | PRODUCT | NO | USED |
| MFG. PART NO. | STRONG | FREE TEXT | PRODUCT | NO | USED |
| CONDITION | STRONG | SELECTION | LISTING | NO | USED |
| PLATFORM | STRONG | SELECTION | PRODUCT | NO | USED |
| ROAD SPEED | STRONG | FREE TEXT | PRODUCT | NO | USED |
| WRITE SPEED | STRONG | FREE TEXT | PRODUCT | NO | USED |
| TYPE | STRONG | FREE TEXT | PRODUCT | NO | USED |
| INTERFACE | STRONG | FREE TEXT | PRODUCT | NO | USED |
| MAX TRANS RATE | STRONG | FREE TEXT | PRODUCT | NO | USED |
| RECORDABLE/RE-WRITABLE | STRONG | SELECTION | PRODUCT | NO | USED |

DOCUMENT DONE

*FIG. 28*

```
✻FAIRMARKET - LISTING OPTIONS - NETSCAPE                    ☐ ▢ ✕
FILE EDIT VIEW GO WINDOW HELP
⇐ BACK ⇒FORWARD  RELOAD  HOME  SEARCH  NETSCAPE  PRINT  SECURITY  STOP     N
  ▽BOOKMARKS  🔍 LOCATION:│HTTPS://ADMIN.FAIRMARKET.COM/ADMIN/LISTINGOPTIONS.ASP│ ▽
```

| FAIR MARKET | AUCTION ADMIN |
|---|---|

EMAIL MODULE
ADMIN HOME │ LISTING OPTIONS

ADMIN

LISTING TYPES
SELECT THE TYPE OF LISTINGS
- ☑ ENGLISH AUCTIONS
- ☑ DUTCH AUCTIONS
- ☑ QUICK WIN AUCTIONS
- ☑ CLASSIFIEDS

EMAIL TRANSFER
ACTIVATE OR DEACTIVATE EMAIL TRANSFER FEATURE
- ☑ ENABLE EMAIL TRANSFER

YOUR EMAIL TRANSFER RATE IS NOT SET. TO SET YOUR EMAIL TRANSFER RATE, CLICK HERE

MASS UPLOADS
ACTIVATE OR DEACTIVATE MASS UPLOAD FOR USERS
- ☐ ALLOW USERS TO PERFORM MASS UPLOADS OF LISTINGS

RELISTINGS OPTIONS
SELECT THE RELISTING OPTIONS
- ☐ ALLOW AUTOMATICS RELISTING OF AUCTION LOTS THAT DO NOT SELL

DURATIONS
ENTER THE MAXIMUM DURATION VALUES. ENTER THE DEFAULT DURATION VALUES

| AUCTIONS | [1] DAYS | AUCTIONS | [1] DAYS |
| CLASSIFIEDS | [1] DAYS | CLASSIFIEDS | [1] DAYS |

BID INCREMENTS

DOCUMENT DONE

*FIG. 33A*

BID INCREMENTS

SELECT THE BID INCREMENT OPTION:

○ ALLOW USER CONTROL OF EACH BID INCREMNET PER LISTING    SET A
MAXIMUM BID INCREMENT [        ]

⊙ USER DEFAULT BID CONTROL TABLE FOR ALL LISTINGS

| OPENING BID/RESERVE | BID INCREMENT |
|---|---|
| $0.00 – $99.00 | $1.00 |
| $100.00 – $249.99 | $2.50 |
| $250.00 – $499.99 | $5.00 |
| $500.00 – $999.99 | $10.00 |
| $1,000.00 – $2499.99 | $25.00 |
| $2,500.00 – $4,999.99 | $50.00 |
| $5,000.00+ | $100.00 |

○ USE CUSTOM BID INCREMENT TABLE FOR ALL LISTINGS
CUSTOM BID INCREMENT TABLE

| OPENING BID/RESERVE | BID INCREMENT |
|---|---|
| $0.00 – $99.00 | $1.00 |
| $100.00 – $249.99 | $2.50 |
| $250.00 – $499.99 | $5.00 |
| $500.00 – $999.99 | $10.00 |
| $1,000.00 – $2499.99 | $25.00 |
| $2,500.00 – $4,999.99 | $50.00 |
| $5,000.00+ | $100.00 |

[SAVE]   [CANCEL]

*FIG. 33B*

| OPENING BID/RESERVE RANGE | | BID INCREMENT | INSTRUCTIONS: |
|---|---|---|---|
| 0 | 99 | 1.00 | YOU CAN SPECIFY UP TO TEN DIFFERENT |
| 100 | 249.99 | 2.50 | BID INCREMENT RANGES IN THE TABLE TO THE LEFT |
| 250 | 499.99 | 5.00 | ENTER YOUR DESIRED VALUES IN DOLLARS |
| 500 | 999.99 | 10.00 | LEAVE THE ENDING VALUE OF YOUR LAST RANGE EMPTY |
| 1000 | 2499.99 | 25.00 | LEAVE ANY UNUSED ROWS EMPTY |
| 2500 | 4999.99 | 50.00 | CLICK SAVE TO CREATE/UPDATE YOUR BID INCREMENT TABLE |
| 5000 | | 100.00 | |
| | | | |
| | | | |
| | | | |

[SAVE] [CANCEL]

*FIG. 34*

| ✳FAIRMARKET – CUSTOM BID INCREMENT TABLE – NETSCAPE | \_ ☐ ☒ |
|---|---|

FILE  EDIT  VIEW  GO  WINDOW  HELP

⇐ BACK  ⇒ FORWARD  RELOAD  [HOME]  SEARCH  NETSCAPE  PRINT  SECURITY  STOP  [N]

🔖 ▽BOOKMARKS  LOCATION: HTTPS://ADMIN.FAIRMARKET.COM/AADMIN/CUSTOPTIONS.ASP ▽

FAIR MARKET                                              AUCTION ADMIN

USER OPTIONS

ADMIN HOME | USER OPTIONS

ADMIN HELP

CREDIT CARD OPTIONS

| | | |
|---|---|---|
| REQUIRE CREDIT CARD TO POST LISTINGS: | ⊙NO | ○YES |
| REQUIRE CREDIT CARD TO BID: | ⊙NO | ○YES |
| VALIDATE CREDIT CARD ON ENTRY: (VISA, MASTERCARD AND AMERICAN EXPRESS ONLY) | ○NO | ⊙YES |
| THRESHOLD AMOUNT TO CHARGE CREDIT CARD: | [1] | |

RATINGS OPTIONS

| | |
|---|---|
| MINIMUM RATING TO POST LISTINGS: | [-2 ▽] |

RATINGS OPTIONS

| SHIPPING METHOD | STATUS |
|---|---|
| FEDEX OVERNIGHT | VALID |
| UPS OVERNIGHT | VALID |
| FEDEX 2 DAY | VALID |
| UPS 2 DAY | VALID |
| US PSOTAL SERVICE | VALID |
| UPS GROUND | VALID |
| OTHER | VALID |

ADD A NEW SHIPPING METHOD

PAYMENT OPTIONS

| PAYMENT METHOD | REFERENCE INFO | STATUS |
|---|---|---|
| VISA | | VALID |
| MASTERCARD | | VALID |
| AMERICAN EXPRESS | | VALID |
| PREPAY | | VALID |
| CCD | | VALID |
| WIRE | | VALID |
| EXCHANGE | | VALID |
| OTHER | | VALID |

ADD CREDIT CARD PAYMENT METHOD    ADD OTHER PAYMENT METHOD

[SAVE]   [CANCEL]

DOCUMENT DONE

*FIG. 35*

```
✦ ADMIN - FEE SCHEDULE - NETSCAPE                                    _ ☐ ⊠
 FILE  EDIT  VIEW  GO  WINDOW  HELP
⇐ BACK  ⇒ FORWARD  RELOAD  HOME  SEARCH  NETSCAPE  PRINT  SECURITY  STOP   [N]
 ▽ BOOKMARKS  LOCATION: HTTPS://ADMIN.FAIRMARKET.COM/ADMIN/RATELIST.ASP      ▽

┌─────────────────────────────────────────────────────────────┐
 │ FAIR MARKET                     AUCTION ADMIN               │
 └─────────────────────────────────────────────────────────────┘
 ┌─────────────────────────────────────────────────────────────┐
 │ FEE SCHEDULE                                                │
 └─────────────────────────────────────────────────────────────┘
  ADMIN HOME │ FEE SCHEDULE
                                                     ADMIN HELP
 ┌─────────────────────────────────────────────────────────────┐
 │ FEES SETUP                                                  │
 └─────────────────────────────────────────────────────────────┘
  FROM                      FROM    TO     RATE    START DATE   END DATE
  AUCTION LISTING FEE
                            $0.00   $0.00

CLASSIFIED LISTING FEE
                            $0.00   $0.00

SELLER TRANSACTION FEE
  BUYER TRANSACTION FEE

┌─────────────────────────────────────────────────────────────┐
 │ LISTING FEES PROMOTION                                      │
 └─────────────────────────────────────────────────────────────┘
 ENTER THE TEXT (OR HTML) THAT YOU WANT TO APPEAR ON THE LISTING FEES PAGE. USE THIS
 TEXT TO PROMOTE OR EXPLAIN YOUR FEES

┌─────────────────────────────────────────────────────────────┐
 │                                                             │
 │                                                             │
 │                                                             │
 │                                                             │
 │                                                             │
 └─────────────────────────────────────────────────────────────┘

⊙ ALL FEES WILL APPEAR WHEN A USER CLICKS ON THE LISTING FEES LINK FROM YOUR AUCTION
     HOME PAGE. IF THERE ARE NO FEES ASSOCIATED WITH AN ITEM, IT WILL APPEAR AS "FREE"

⊙ SHOW ONLY THOSE FEE TYPES WITH ASSOCIATED CHARGES

⊙ DON'T SHOW ITEMS OR PRICES. I WILL ADD THEM MANUALLY (IN THE TEXT BOX) AND MAKE
     CHANGES EACH TIME I CHANGE THE FEE SCHEDULE

[ SAVE ]   [ CANCEL ]

DOCUMENT DONE
```

NETWORK-BASED SALES SYSTEM WITH A CUSTOMIZABLE USER INTERFACE

RELATED APPLICATIONS

This application is a continuation of U.S. application Ser. No. 09/441,388, filed on Nov. 16, 1999, which is incorporated herein by reference in its entirety.

FIELD

This disclosure relates to computer-based systems and methods that enable sales transactions between third parties through a communications network, such as internet auction and classified systems.

BACKGROUND OF THE INVENTION

Internet auction systems are well known. Such systems generally present web pages that allow users to bid for items offered through a particular auction services company. Other web pages permit users to submit items for sale through the same company. Classified systems that allow users to list, read, and respond to classified advertisements through the internet are also well known.

Before listing and selling items on current systems, users must select one of the available auction service companies or other sales service providers. This requires them to first find one or more appropriate web sites in the sea of information available on the internet. Users may then need to evaluate them to determine which ones are the most suitable for their purposes.

BRIEF DESCRIPTION OF THE DRAWINGS

FIG. 6 is a screen view of an illustrative listing (or "leaf") page for the network member site of FIG. 3;

FIG. 12 is a screen view of an illustrative advanced search page for the network member site of FIG. 3;

FIG. 13 is a screen view of an illustrative auction agent page for the network member site of FIG. 3;

FIGS. 14A and 14B are screen views of top and bottom parts of an illustrative listing information page for the network member site of FIG. 3;

FIG. 15 is a screen view of an illustrative listing review page for the network member site of FIG. 3;

FIG. 17 is a screen view of an illustrative mass upload page for the network member site of FIG. 3;

FIG. 20 is a screen view of a user interface administration page for the network member site of FIG. 3;

FIG. 28 is a screen view of the category tree administration page of FIG. 25 showing a category detail pane for an illustrative item-level category;

FIGS. 33A and 33B are screen views of top and bottom pars of a listing options administration page for the network member site of FIG. 3;

FIG. 34 is a screen view of a custom bid increment administration page for the network member site of FIG. 3;

FIG. 35 is a screen view of a user options administration page for the network member site of FIG. 3;

FIG. 36 is a screen view of a fee schedule administration page for the network member site of FIG. 3;

FIG. 37 is a screen view of an auction fee schedule administration page for the network member site of FIG. 3;

FIG. 39 is a screen view of a merchandising option edit page for the network member site of FIG. 3;

DETAILED DESCRIPTION OF AN ILLUSTRATIVE EMBODIMENT

Figure 1:
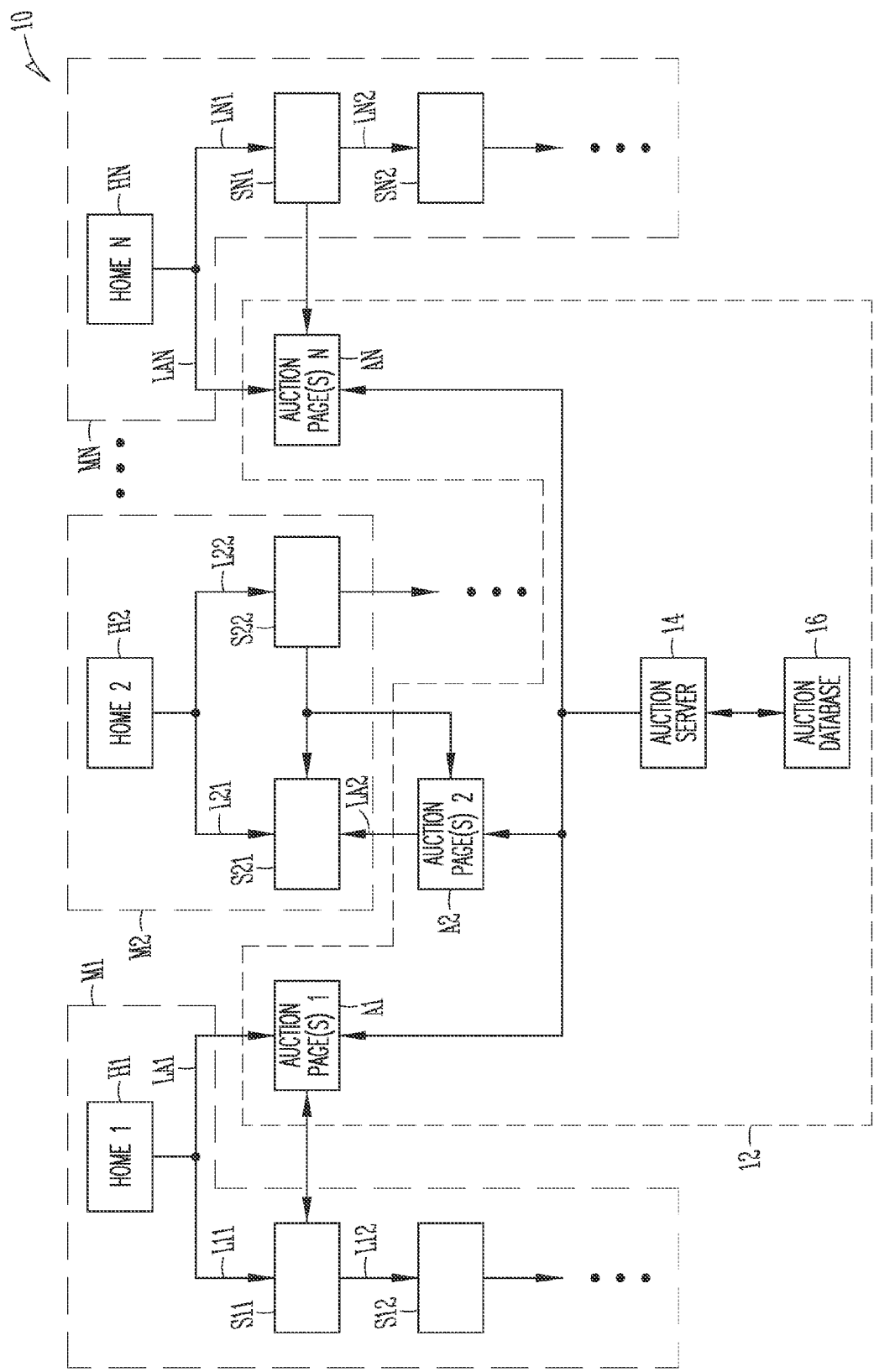
FIG. 1 is a block diagram illustrating a network auction system according to the disclosure.

In one general aspect, the disclosure features a sales system for coupling to a communications network that includes a first sales interface at a first network address and second sales interface at a second network address. The first sales interface can include a first set of user interface elements, and the second sales interface can include a second set of user interface elements. A customization interface can be responsive to user input to define the first and second sets of user interface elements.

In preferred embodiments, the customization interface can include a series of templates that each define display attributes of one or more views for the first and second sales interfaces. The customization interface can be responsive to user arrangement of a plurality of user interface tokens within the templates to define display attributes of one or more views for the first sales interface. The templates can be constructed and adapted to receive scripting commands. The customization interface can be responsive to user arrangement of a plurality of user interface tokens to define display attributes for one or more views of the first sales interface. The customization interface can be operative to define a set of transaction types for the system. The customization interface can be operative to define a set of transaction attributes for the system. The customization interface can be operative to provide different branding elements for the first sales interface and for the second sales interface. The customization interface can include a plurality of e-mail templates that each define display attributes of e-mail communications sent as part of a series of user interactions with one of the first and second sales interfaces. The customization interface can include an e-mail sender address selection interface operative to define a sender address for e-mail communications sent as part of a series of user interactions with one of the first and second sales interfaces. The customization interface can be remotely accessible. The customization interface can be accessible using a web browser. The customization interface can be a categorization interface responsive to user input to define the first and second sets of categorized interface elements. The categorization interface can be responsive to user input to select categorization interface elements from a base categorization set. The categorization interface can be responsive to user input to add custom categorization elements in addition to those in the base categorization set to at least one of the first and second sets of categorization interface elements. The categorization interface can be responsive to user input to map categorization interface elements in at least one of the sets to categorization interface elements selected from the base categorization set. The categorization interface elements can include collapsible categorization interface element trees. The categorization interface elements can each include different specification elements. The categorization interface elements can each include an unused attribute.

In another general aspect, the disclosure features a sales method for operation through a communications network that includes receiving customization commands from a first accountholder and receiving customization commands from a second accountholder. The method also includes steps of presenting a first sales interface through the network for the first accountholder based on the item categorization input received from the first accountholder, and presenting a second networked sales interface through the network for the second accountholder based on the item categorization input received from the second accountholder.

In preferred embodiments, the customization commands can include customizations of templates that each define display attributes of one or more views for the first and second sales interfaces. The customization commands can include a user arrangement of a plurality of user interface tokens to define display attributes for one or more views of the first sales interface. The customization commands can include a set of transaction attribute commands. The steps of presenting can present differently branded interfaces. The customization commands can include a user arrangement of a plurality of e-mail templates that each define display attributes of e-mail communications sent as part of a series of user interactions with one of the first and second sales interfaces. The customization commands can include an e-mail sender address selection to define a sender address for e-mail communications sent as part of a series of user interactions with one of the first and second sales interfaces.

Systems according to this aspect of the disclosure can provide flexible customization of sales systems that operate over a network. By providing customizing templates and/or tokens, such systems can allow site designers full control over the branding of their site pages and e-mail, while leaving the administration of these elements to a central system. And these customization features can be easily accessed through an ordinary web browser.

Referring to FIG. 1, a network auction system 10 includes a series of member web sites M1, M2, . . . MN and an auction server system 12, which are all operatively connected to a network such as the internet. As is conventional, each of the web sites includes a home page H1, H2, . . . HN, and a series of sub-pages S11, S12, . . . S21, S22, . . . SN1, SN2, . . . on which a legal entity, such as a corporation, provides content. The home pages and sub-pages are all linked together via a system of user-selectable hyperlinks L11, L12, . . . L21, L22, . . . LN1, LN2, which can be created using an appropriate scripting language, such as Hypertext Markup Language (HTML).

Users can access the home pages and sub-pages and navigate between them using a web browser that communicates with the web sites. As is well known, browsers allow the users to navigate between pages by following ("clicking on") links in the pages using a pointing device, such as a mouse. They also provide an address line that allows users to type in a page's address, which is formatted according to an appropriate protocol such as Hypertext Transfer Protocol (HTTP) or File Transfer Protocol (FTP).

Each of the web sites in the network auction system 10 also includes one or more links LA1, LA2, . . . LAN to one or more respective auction home pages A1, A2, . . . AN. These auction home pages can, in turn, include links to auction sub-pages. Collectively, an auction home page and its sub-pages can be referred to as an auction site.

The pages for each of the auction sites are generated by the auction server system, but they give users the impression that they are still using the member web site through which they accessed the web page. Users get this impression partly because the auction server system 12 includes a network auction server 14 that generates highly customized auction pages that look and act like the pages of the web site from which they are accessed. The auction server system also interfaces with the network through an address that is consistent with the address of the member web site from which it is accessed (e.g., by DNS mapping of a subdomain name such as "auctions.membername.com"). In addition, the auction server can transact by e-mail with the user using the name of the entity responsible for the content of the web sites, such as in the case of customer service e-mails. And users can gain access to an auction system through the same registration process through which they register for access to its parent member site.

Figure 2:
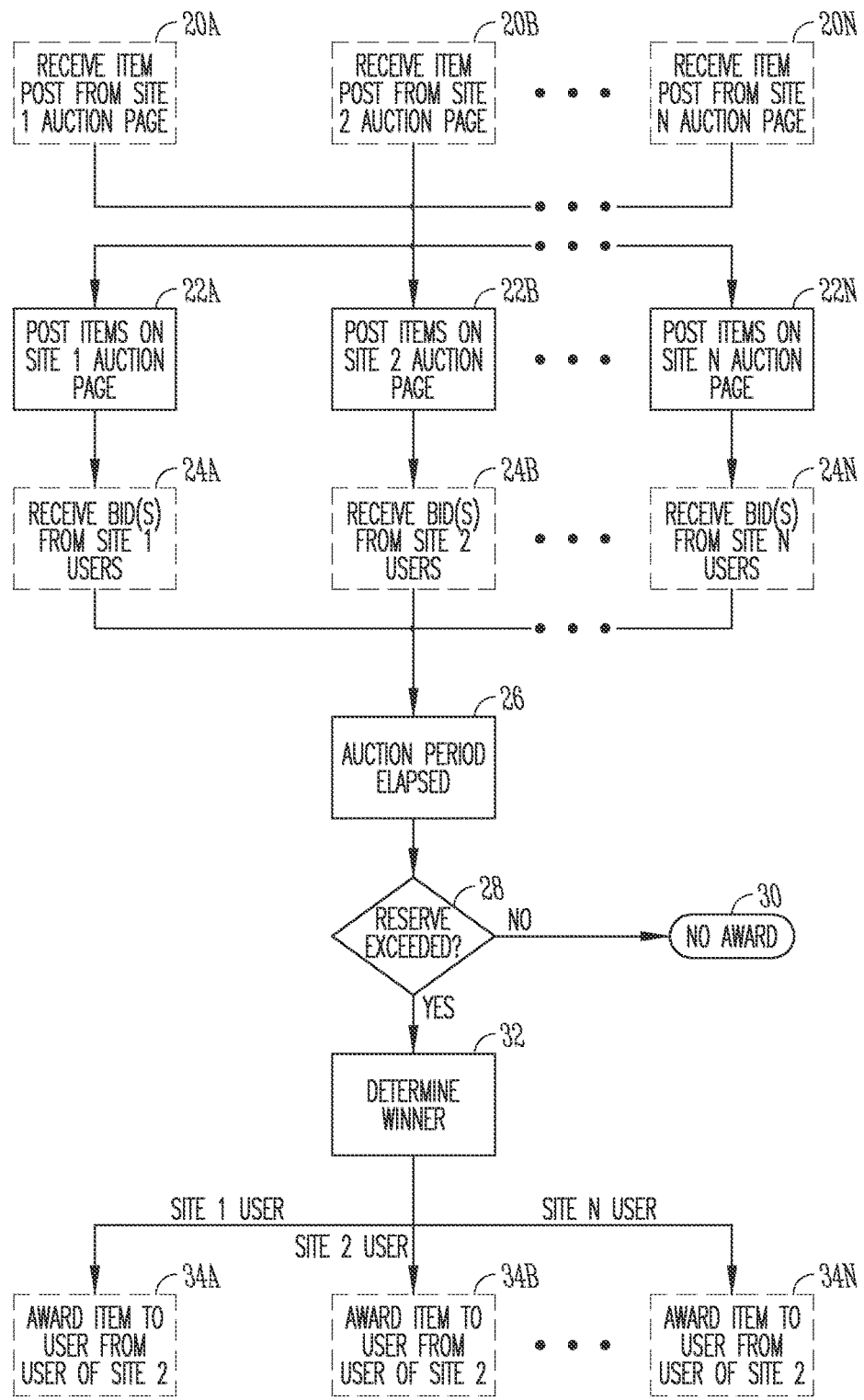
FIG. 2 is a flowchart illustrating the overall operation of the system of FIG. 1.

Referring to FIG. 2, the overall process of auctioning items begins with users entering listings for items into the auction pages of the auction network member sites W1, W2, . . . WN. The auction server system 10 receives these listings, indexes them, and stores them centrally in its database system 16 (steps 20A, 20B, . . . 20N). The items can then be offered on some or all of the auction pages (steps 22A, 22B, . . . 22N).

Users can also bid on items on the auction pages of the auction network member sites W1, W2, . . . WN. The auction server system receives the bids from the different auction sites, indexes them, and stores them in its database system 16 (steps 24A, 24B, . . . 24N). Bids are stored as part of series of item bidding histories that are updated as auctions progress.

When the auction period has elapsed for an item (step 26), the auction server system 10 reviews the highest bid for that item. The system tests this bid against an optional reserve price set by the listing user (step 28). If the highest bid is below the reserve price, no award is made (step 30). It the reserve price is exceeded, the name of the winning bidder can be retrieved (step 32) and the item is awarded to him or her (step 34A, 34B . . . or 34N).

Figure 3:
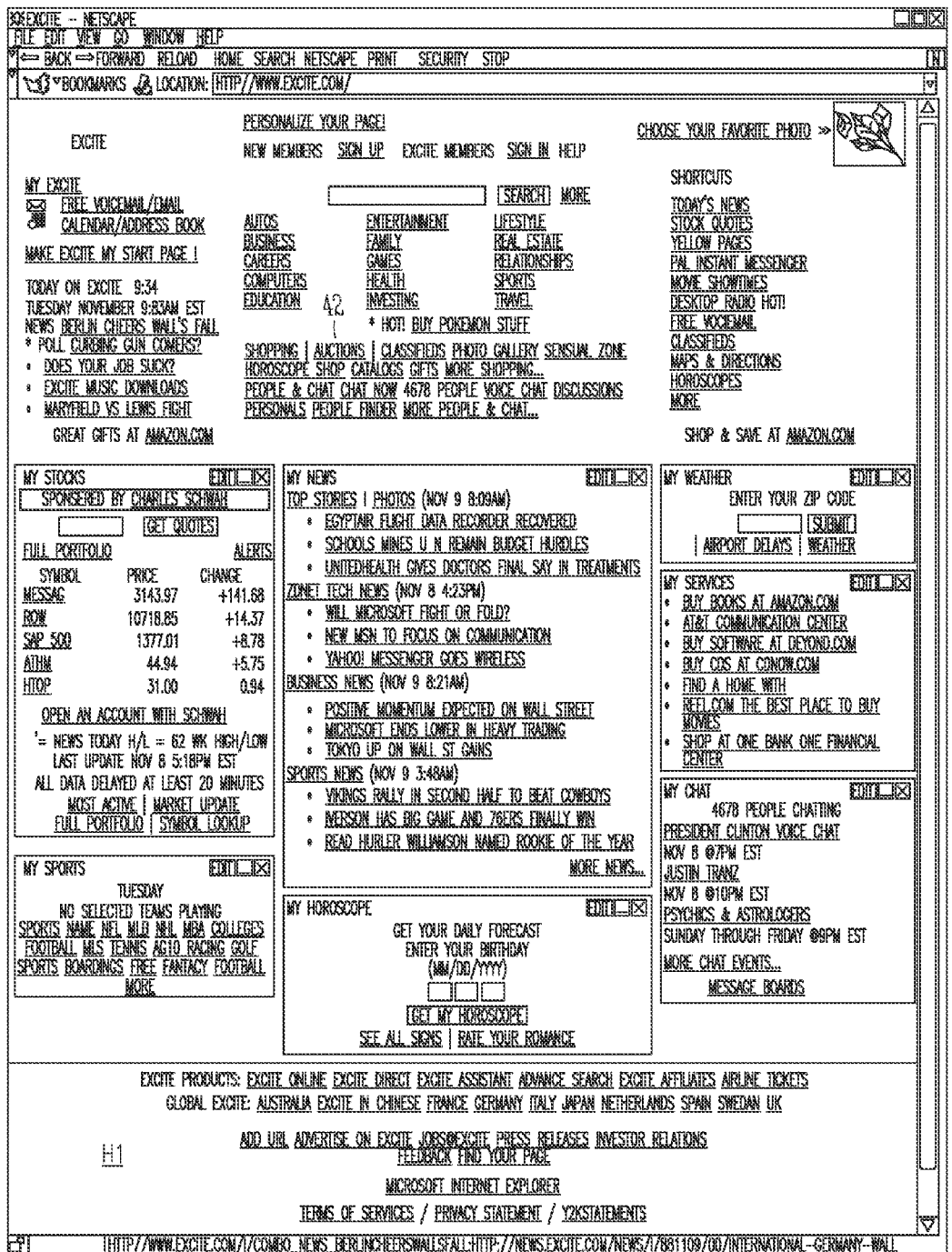
FIG. 3 is a screen view of an illustrative auction network member site home page in the system of FIG. 1.

Referring to FIG. 3, users can reach one of the auction pages (e.g., A1) by first viewing the home page H1 of an auction network member in their web browsers 40. This home page can include a link 42 to its associated auction page A1 as well as other material, such as additional links, controls, and content. It is expected that many users will reach the auction page, at least the first time, by selecting a link on the network member home page. Users can also access the auction site directly, however, such as through a bookmark. And further links to the auction site can exist on pages other than the home page of the member site W1.

Figure 4:
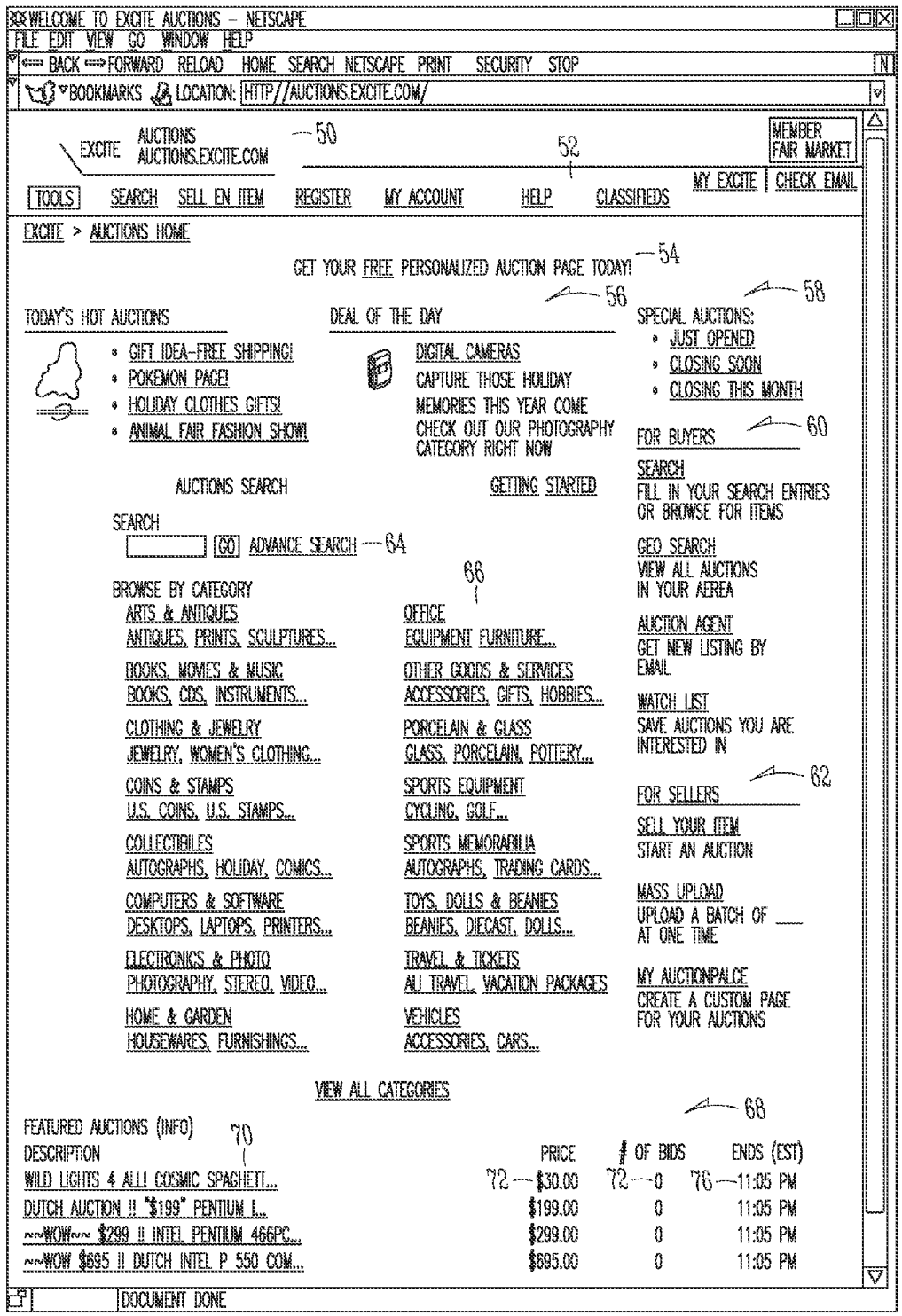
FIG. 4 is a screen view of an illustrative auction site home page for the network member site of FIG. 3.

Referring to FIG. 4, the first auction page A1 includes a member logo area 50, a toolbar 52, a promotional feature link 54, two promotional auction areas 56, and a special auctions area 58. Below these features are a buyers link area 60, a sellers link area 62, an auctions search area 64, and a category browsing area 66. The rest of the page is a featured auctions list 68 in the form of a list of item names 70, with corresponding prices 72, numbers of bids 74, and end times 76.

The configuration of this page is customized by the organization responsible for the content of the rest of the first site W1 (e.g., the web site's web designer). The logo area 50 can therefore bear the same logo that is presented on the home page H1 of the site. The position and makeup of the remaining features is also selected by the organization to match its brand identity. The other pages in the auction site can also be customized.

Figure 5:
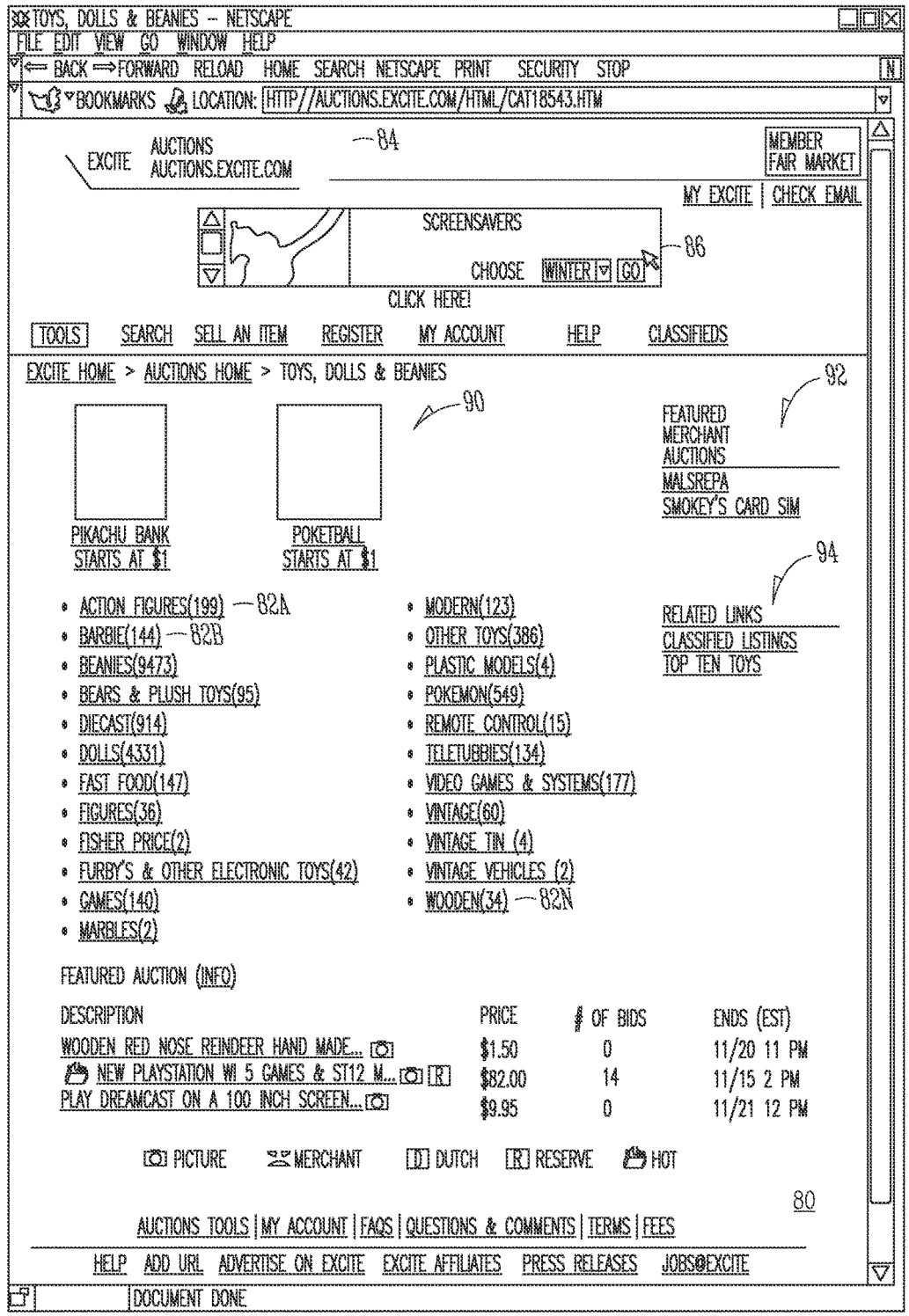
FIG. 5 is screen view of an illustrative category page for the network member site of FIG. 3.

Referring also to FIG. 5, the user can reach a category page 80 for a particular category of goods and services by following one of the category links in the category browsing area 66, or other similar links on other pages. Like other pages in the auction site, this page can include a logo 84 and a number of other features selected by the member organization. Such features can include an advertising message area 86, a toolbar 88, featured item areas 90, a featured merchant auctions area 92, and a related links area 94. The primary purpose of this page is to present a number of links 82A, 82B . . . 82N to subpages, which can either be subcategory ("drill-down") pages, or listing ("leaf") pages. The breakdown of goods and/or services into category pages, different levels of subcategories, and listing pages is customizable by the member organization. A site that sells primarily computers and only a few toys, for example, might present different types of computers in a complex tree of drill-down pages and present toys in a single category page.

Figure 6:
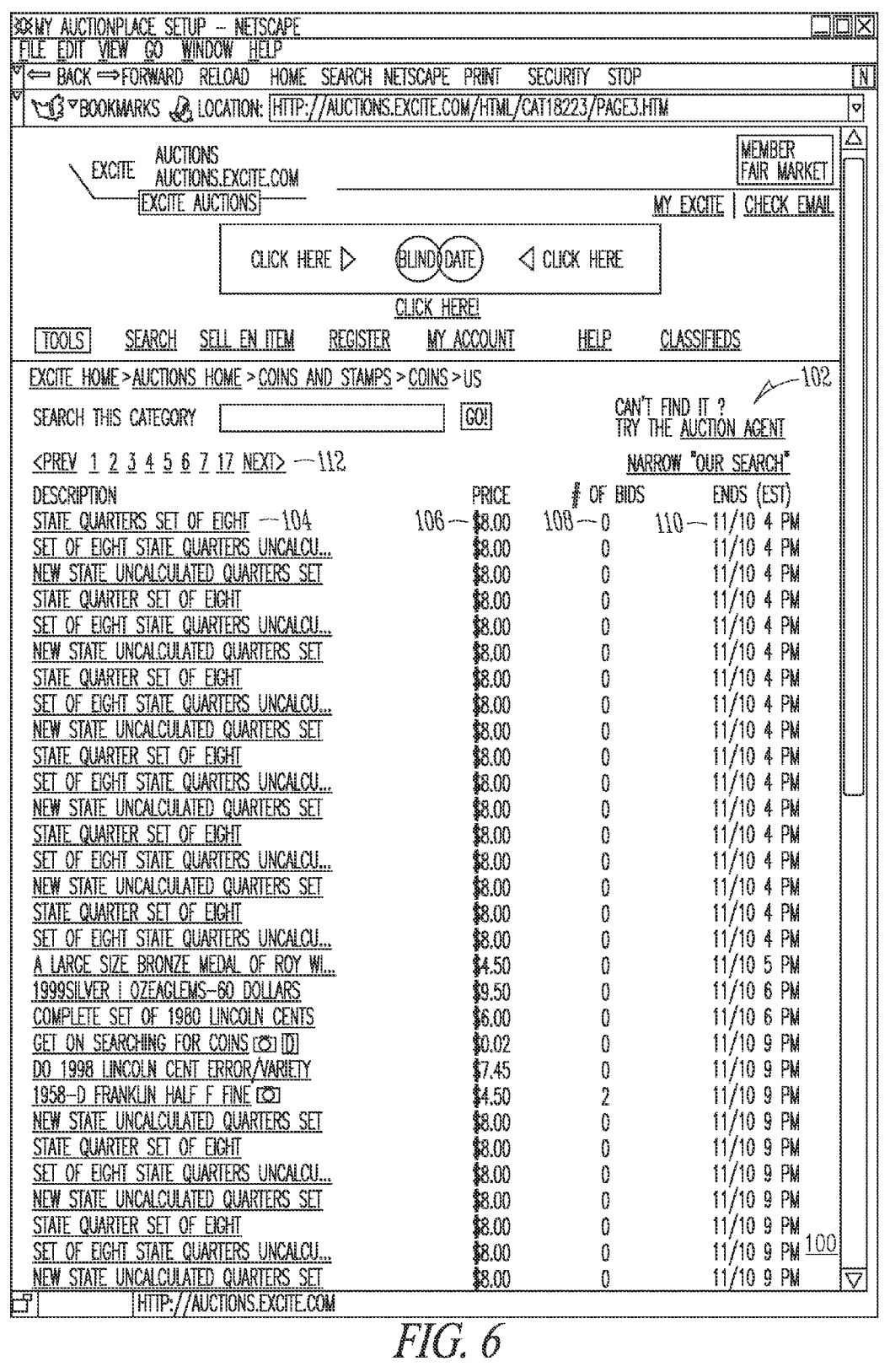

Referring to FIG. 6, at the lowest level in the categorization hierarchy are listing pages, such as a "U.S. Coins" page 100. Like other auction subpages it can include a number of custom features, but it always includes a listing area 102. This area can be in the form of a list of items names 104, with corresponding prices 106, numbers of bids 108, and end times 110. If there are more than a predetermined number of items to be listed, the system presents additional pages, which can be reached using a page navigation control 112.

Figure 7:
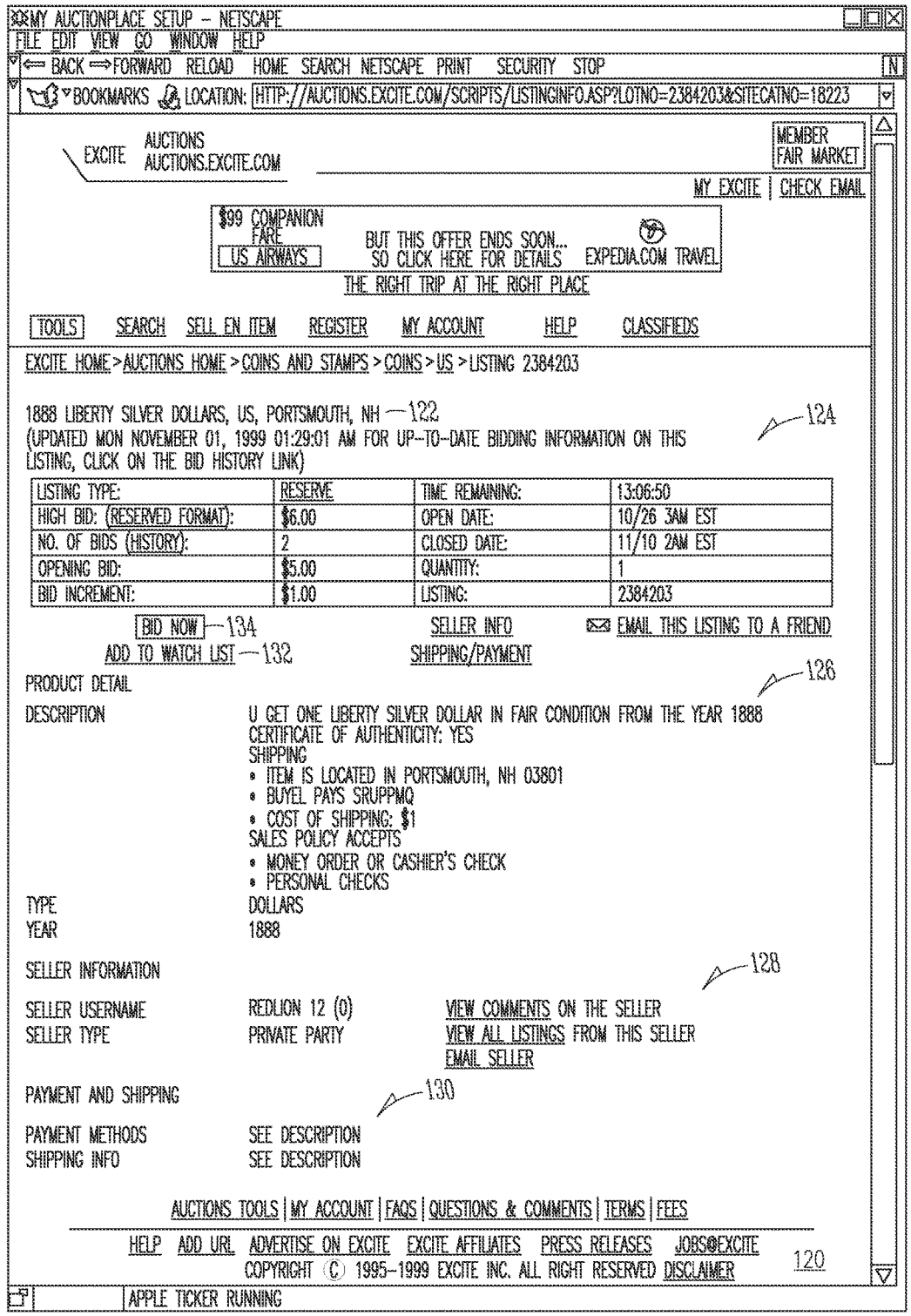
FIG. 7 is a screen view of an illustrative lot detail page for the network member site of FIG. 3.

Referring also to FIG. 7, each item name in the listing pages is a link to a lot detail page 120. Each lot detail page can include a full item name 122, a listing information table 124, a product detail table 126, a seller information area 128, and a payment and shipping information area 130. The listing information table can include a listing type entry, a high bid entry, a number of bids entry, an opening bid entry, a bid increment entry, a time remaining entry, an open date entry, a close date entry, a quantity entry, and a listing number entry.

Figure 8:
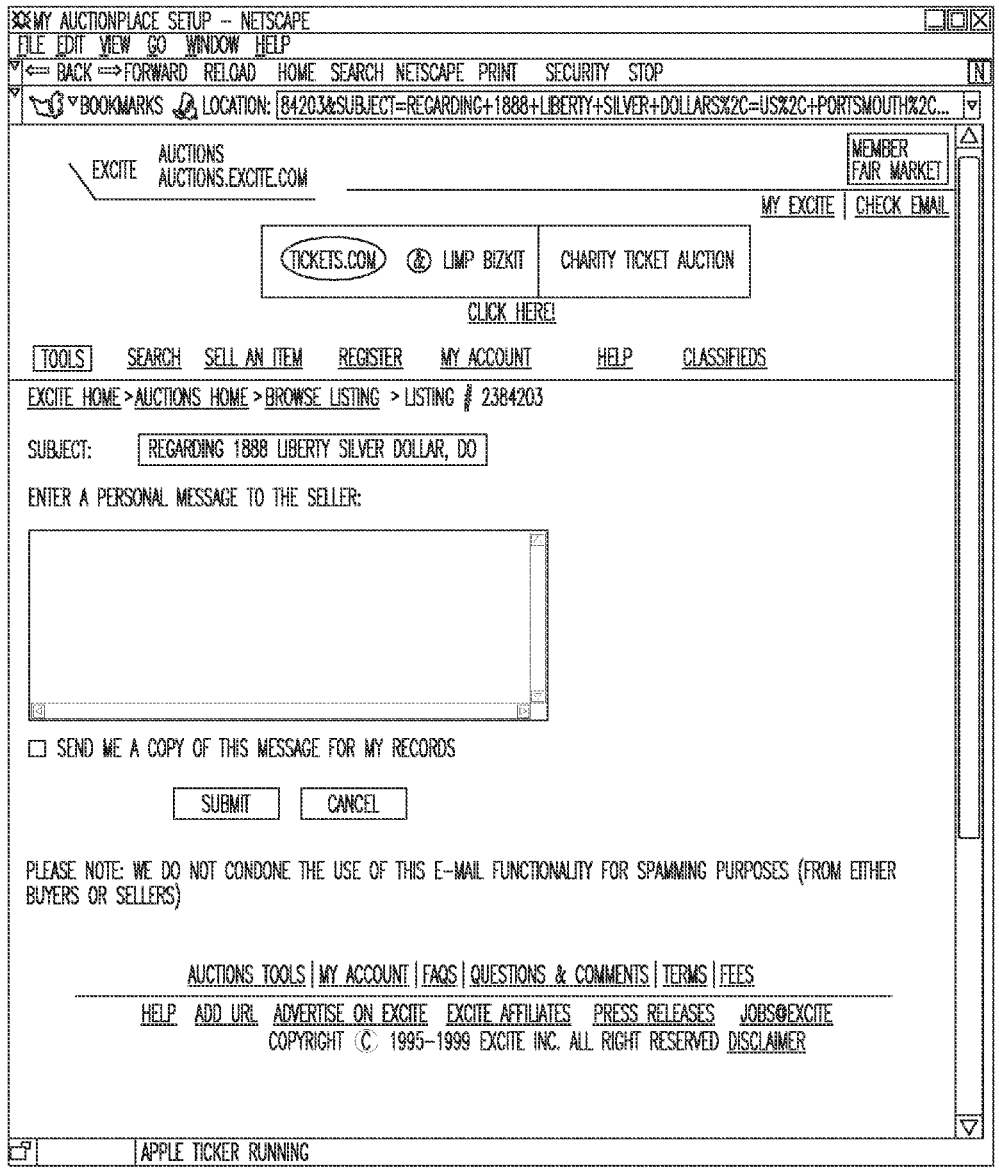
FIG. 8 is a screen view of an illustrative bidder-to-seller e-mail entry page for the network member site of FIG. 3.

The product detail area 126 is item-specific, and includes a series of information items about the item. The seller information area provides the seller's username, and the type of the seller, such as "private party" or "merchant." Also provided are links to comments on the seller, other listings by the seller, and an page that allows a user to send an e-mail message to the seller (see FIG. 8). The payment and shipping area includes information about available payment and shipping methods. An "add to watch list" link, and a "bid now" button are also provided on the lot detail page.

Figure 9:
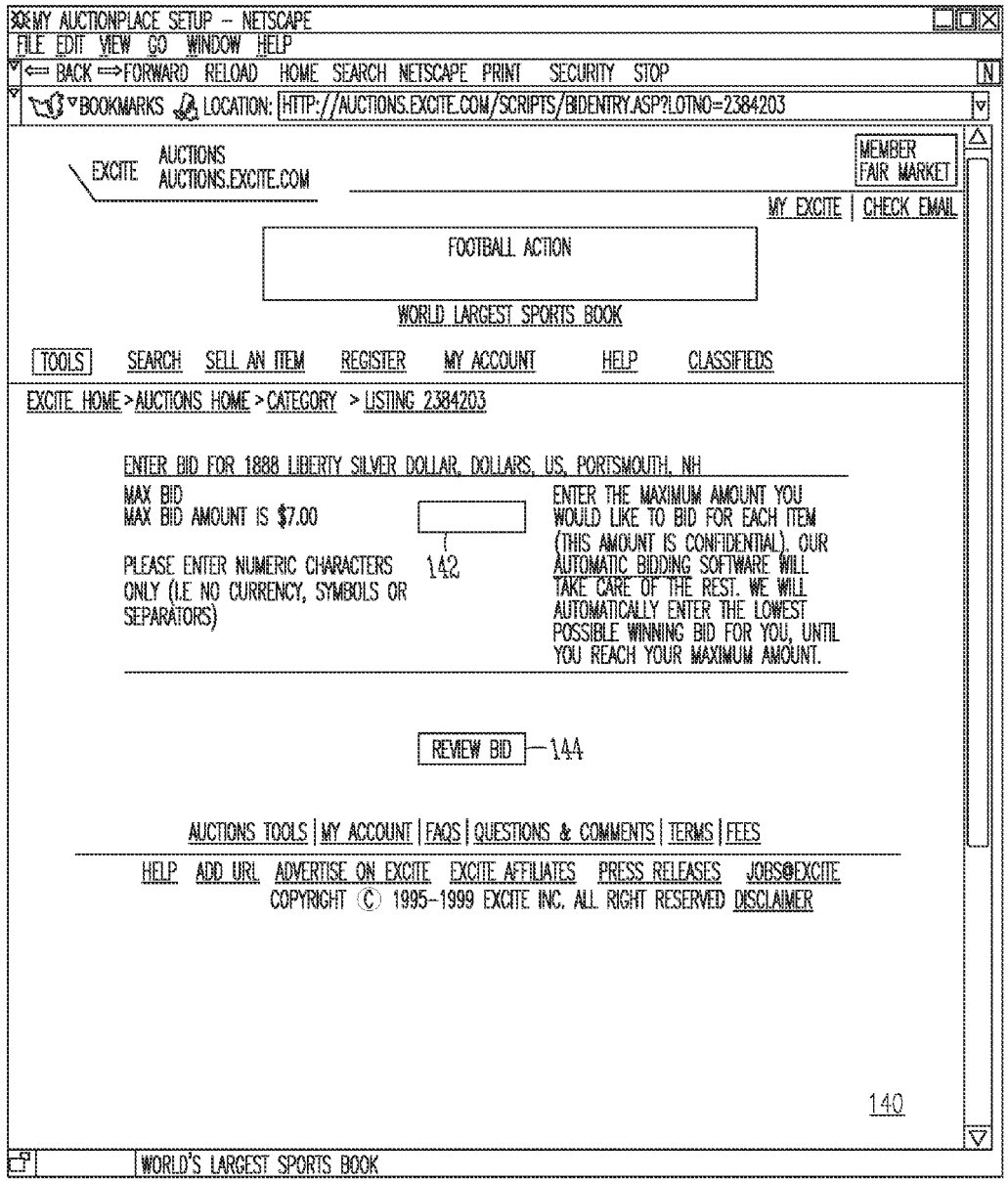
FIG. 9 is a screen view of an illustrative bid entry page for the network member site of FIG. 3.
Figure 10:
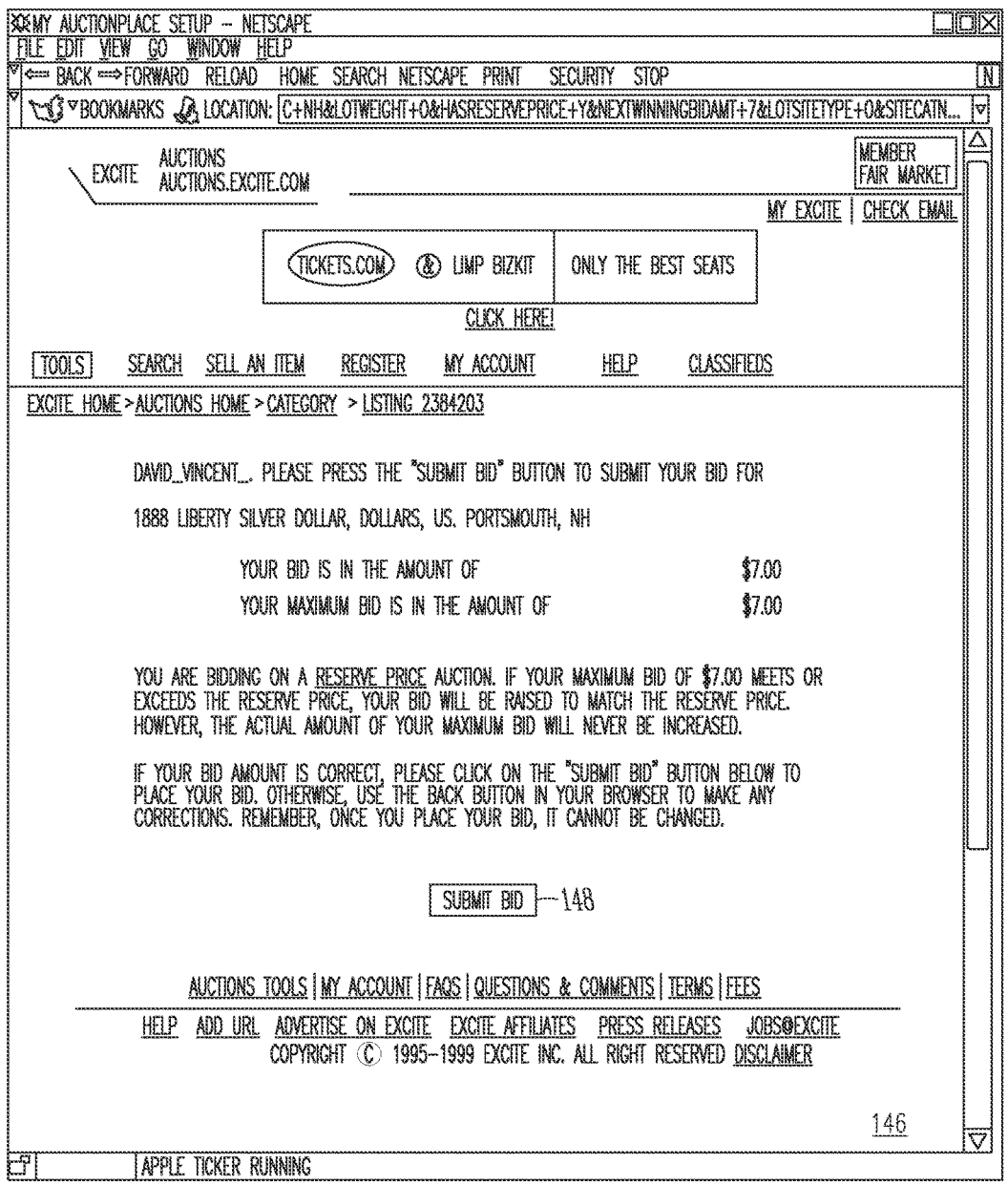
FIG. 10 is a screen view of an illustrative bid confirmation page for the network member site of FIG. 3.

Referring to FIGS. 9 and 10, clicking on the "bid now" button in the lot detail page 120 reveals a bid entry page 140. This page includes an area in which the user may input a maximum bid. This amount is the maximum amount the user would like to bid for each item, and is kept confidential. The system includes automatic bidding software to automatically enter the lowest possible winning bid for the user, until his or her maximum bid is reached. This operation is similar to the absentee bidding procedure followed by many in-person auctions. The bid entry page also includes a review bid button 144, which causes the system to display a bid confirmation page 146 with information about the transaction and a confirmation button 148.

Some high-ticket items are placed for auction using a delayed bid system. These items are marked on the bid page with a message stating that bids over a certain amount are subject to confirmation by telephone. Because of the delay involved in confirming first time bidders, new bidders are not allowed to bid on delayed bid items in the last hour of an auction. Previously confirmed bidders may continue to bid until the close of the auction.

Figure 11:
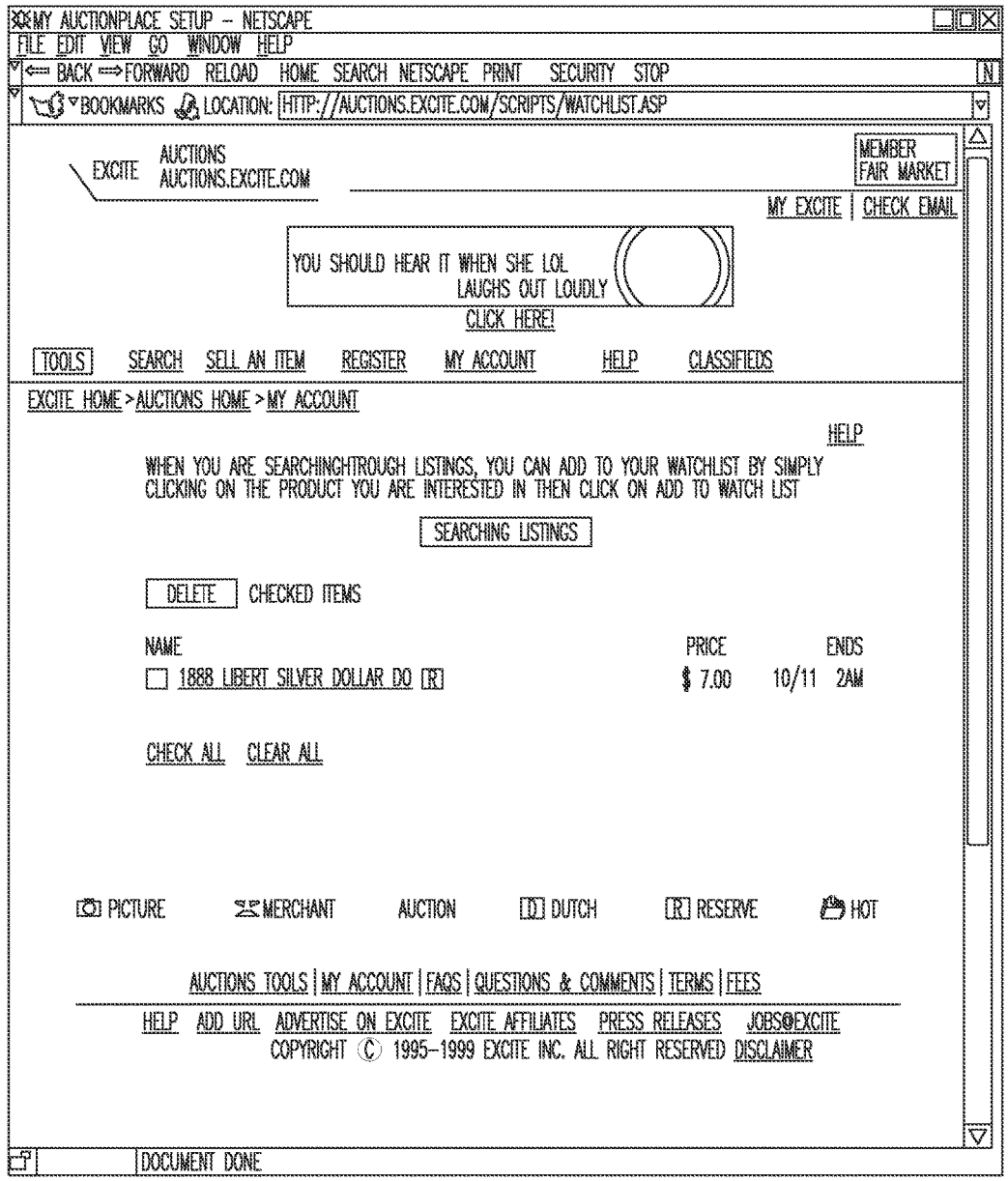
FIG. 11 is a screen view of an illustrative watch list page for the network member site of FIG. 3.
Figure 13:
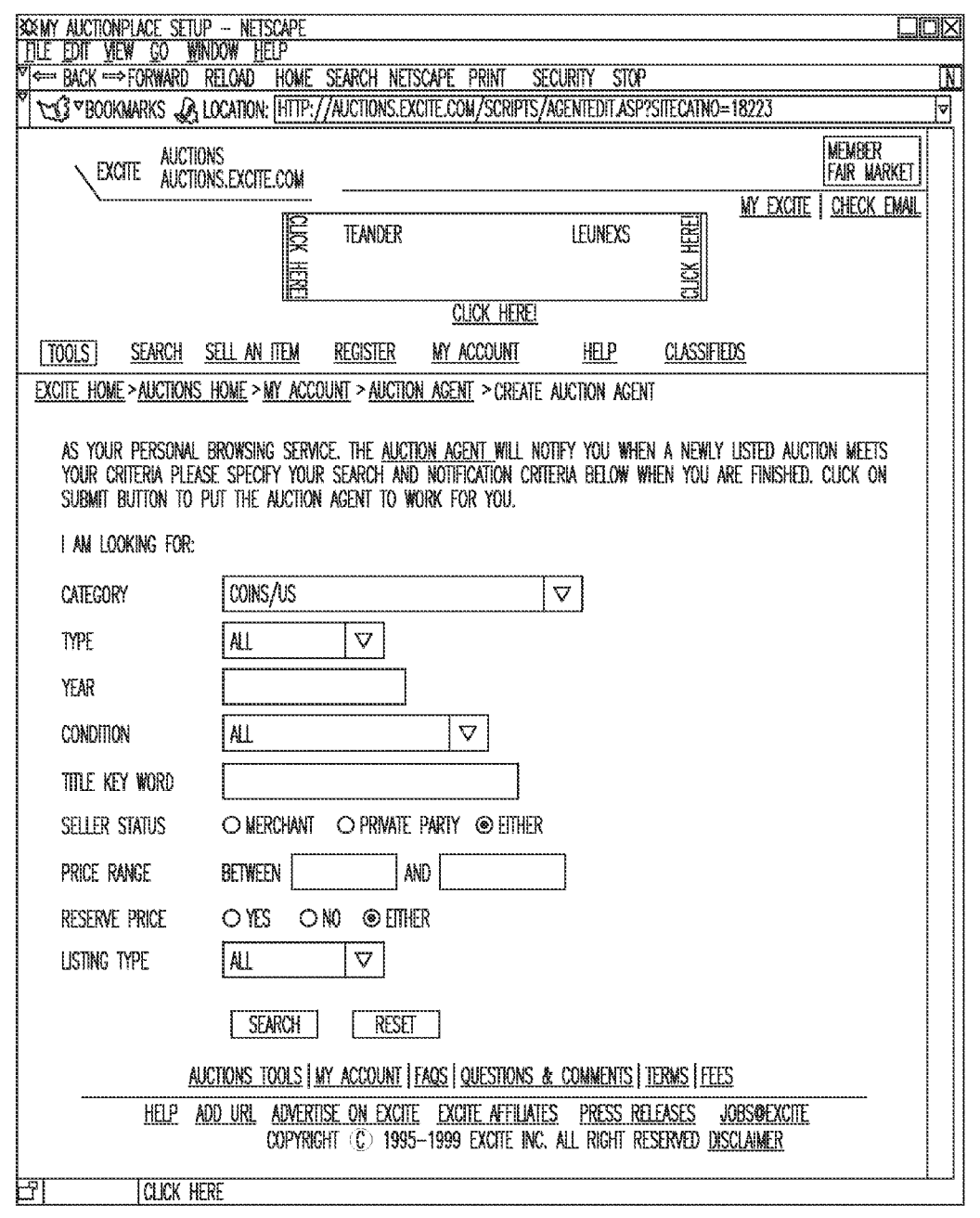

Referring to FIGS. 11-13, there are at least three other ways to access listings using the system: through a watch list, by searching, and via an auction agent. Watch lists are personalized item lists that a user can use to track a number of items (see FIG. 11). Searching allows a user to generate a listing page by specifying a single search text string to be searched for (simple search), or by specifying text strings and/or values in a various item fields, including category-specific item specifications (advanced search—see FIG. 12). An auction agent is a program that runs a set of search criteria on new listings and informs the user, such as by e-mail, when one matches the search criteria (see FIG. 13). Users can also review all their bids or all bidding activity for an item.

Referring to FIGS. 14A and 14B, a user can list an item for sale by clicking on one of several "sell your item" links, such as one on the first auction page A1. The system will then allow the user to navigate a tree of categories and subcategories that is similar to the one for viewing items. When the user reaches a leaf page and selects an item type, the system prompts him or her to log in to the system. If it is his or her first time using the system, it will allow the user to enter biographical information, such as name, address, telephone number, and e-mail address, and obtain a new username and password. The system also allows the user to sign up for different types of e-mail notifications at this time, including notifications from the member site, notifications from sponsoring third parties, and notifications from merchants based on the system's e-mail transfer feature.

Once registered or signed on, the user can enter listing information in a listing information page 150. This page includes three general areas, a listing information area 152, a product information area 154, and a payment/shipping information area 156. The listing information area includes text boxes for entering a listing type, an auction type (English or Dutch), and a listing title. It also includes areas for entering a listing start date and time, a listing end date and time, and an available quantity. Areas for entering an opening bid, a reserve/threshold price, and a minimum quantity a user must purchase are provided as well. The listing information area can be the same for all items.

The product information area 154 includes a description field and an image URL field, which can be the same for all items. The product information area also includes a series of item-specific drop-down selection fields that allow the user to select one of a list of predetermined specification values. For US coins, for example, these include type (e.g., quarter, dime nickel, etc.), condition (proof, mint, etc.), and year. Other products will generally have different specification fields and different preset selections for those fields. Standardizing these specification fields allows the system to efficiently perform powerful searching and sorting for relevant aspects of an item type, without cluttering the system with unnecessary information.

The payment/shipping information area 156 includes a series of checkboxes for accepted payment types, a seller location text box, and a series of checkboxes for available shipping methods. These controls are the same for all items.

Figure 16:
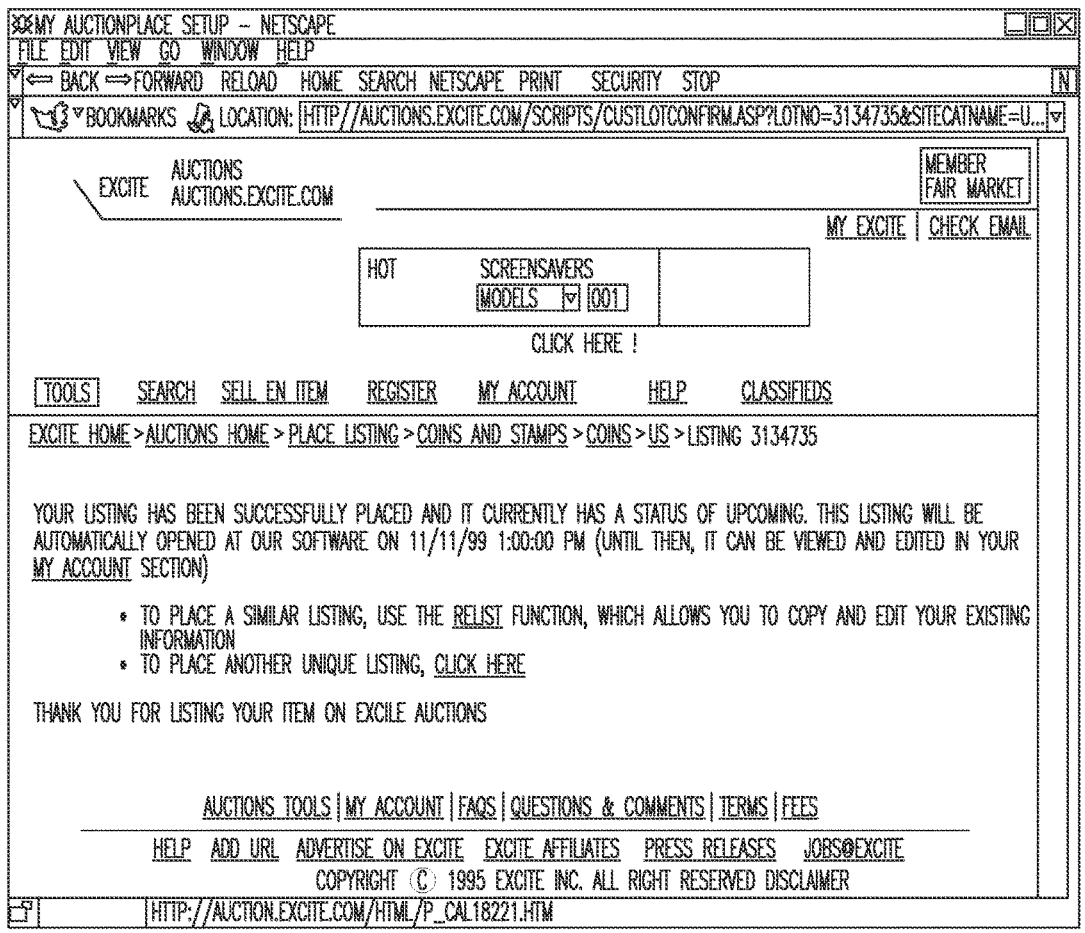
FIG. 16 is a screen view of an illustrative listing confirmation page for the network member site of FIG. 3.

Referring also to FIGS. 15 and 16, once the user has completed his or her input in the listing information page, he or she clicks on a review listing button 158. This button causes the auction server system to display a review listing page 160. This page restates the user's listing information, and provides merchandising option controls 162 and a bidder requirements control 164. The merchandising option controls allow the user to select more prominent placement of items in the auction pages of the web site, for a fee. The bidder requirements option allows the user to specify whether a user must have a credit card to bid on the listing. A place listing button 168 allows the user to place the listing, which causes the system to present a listing confirmation page. This page offers the user the opportunity to place either a new listing by typing in new information, or a similar listing by editing a copy of the information for the last item.

Referring to FIG. 17, the user can also select a link to a mass upload page 170. The mass upload page includes a file specification area that allows the user to specify the location of a tab-delimited text file, which can be generated with a word processor, spreadsheet, or other program. The file should begin with a line of category headings, and each subsequent line should include values for these categories. In one embodiment, the categories are:

Listing Type

To run the listing as an English auction, there should be an "A" in this field. For a "Dutch" auction, there should be a "D" in this field.

Category Number

The category number is a number that corresponds to the category being listing under, and is available from lists that can be accessed through a list link.

Listing Title

This is the title that buyers will see when they search for or browse listings. In one embodiment, the length of this title is 100 characters.

Available Quantity

This is the total number of units available in the listing. If the user has 75 items available, for example, he or she will enter 75 in this field. When listing an item in a Dutch auction, this value must be larger than one.

Minimum Purchase Quantity

This is the minimum number of units available to each buyer. If the user has 75 items listed, but doesn't want to ship orders of less than 15, then he or she should enter a 15 in this field. If he or she wants to ship the entire listing as a single order, then he or she should enter 75.

Opening Bid/Price

This is the staring bid per unit for the auction. If the user sets the minimum purchase quantity to 60 and the opening bid to $5, for example, the extended total is $300 for the lowest possible initial bid. If the user is placing a classified ad, his or her desired price should be entered in this field.

Reserve/Threshold Price/Negotiability

This field determines the minimum price at which the user agrees to sell the product, and must be greater than or equal to opening bid. If a user wants to start the bidding for an item at $6 per unit, but doesn't want to sell them for less than $15 per unit, he or she would enter six for the opening bid and 15 for the reserve price. This field should remain blank for a Dutch auction, or if the user doesn't want to set a reserve price.

Listing Start Date

This field defines the date on which the listing will be open.

Listing Start Hour

This is the hour on the start date at which the listing will open. It is preferable to require users to wait an hour before their listings appear, to allow them time to review each listing for accuracy. After the start date, a user cannot retract his or her listing.

Listing End Date

This is the last day a listing will appear. The maximum duration for an auction in one embodiment is 60 days.

Listing End Hour

This is the hour at which a listing will close.

Item URL

If the item can be illustrated by an existing picture on the web, viewers can be referred to it by entering a Uniform Resource Locator (URL) that points to it. Images can also be uploaded to the server.

Item Description

This field allows a user to list information such as a detailed technical specification, warranty, and exact packaging.

Weight

This field is for the weight of the item.

Specification Fields

These are values for the item-specific specification fields, in order, and are entered as text. There can also be a re-list field allowing the user to specify repetitive automatic relisting of an item.

Once the user has assembled his or her listing file, he or she can upload it to the auction server system. The system will then merge the file into the database as a series of listing items.

Figure 18A:
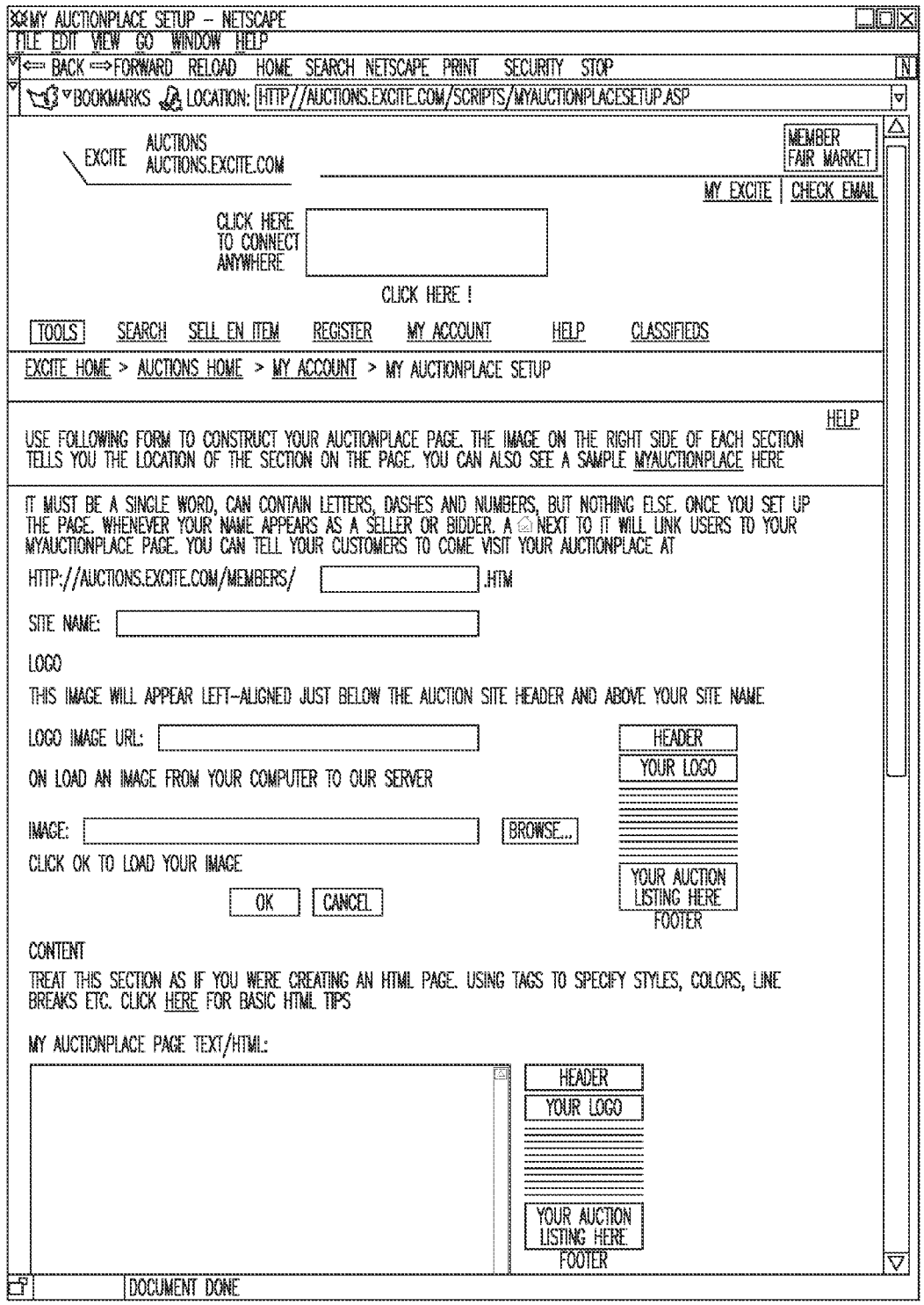
FIGS. 18A and 18B are screen views of top and bottom pars of an illustrative kiosk setup page for the network member site of FIG. 3.
Figure 18B:
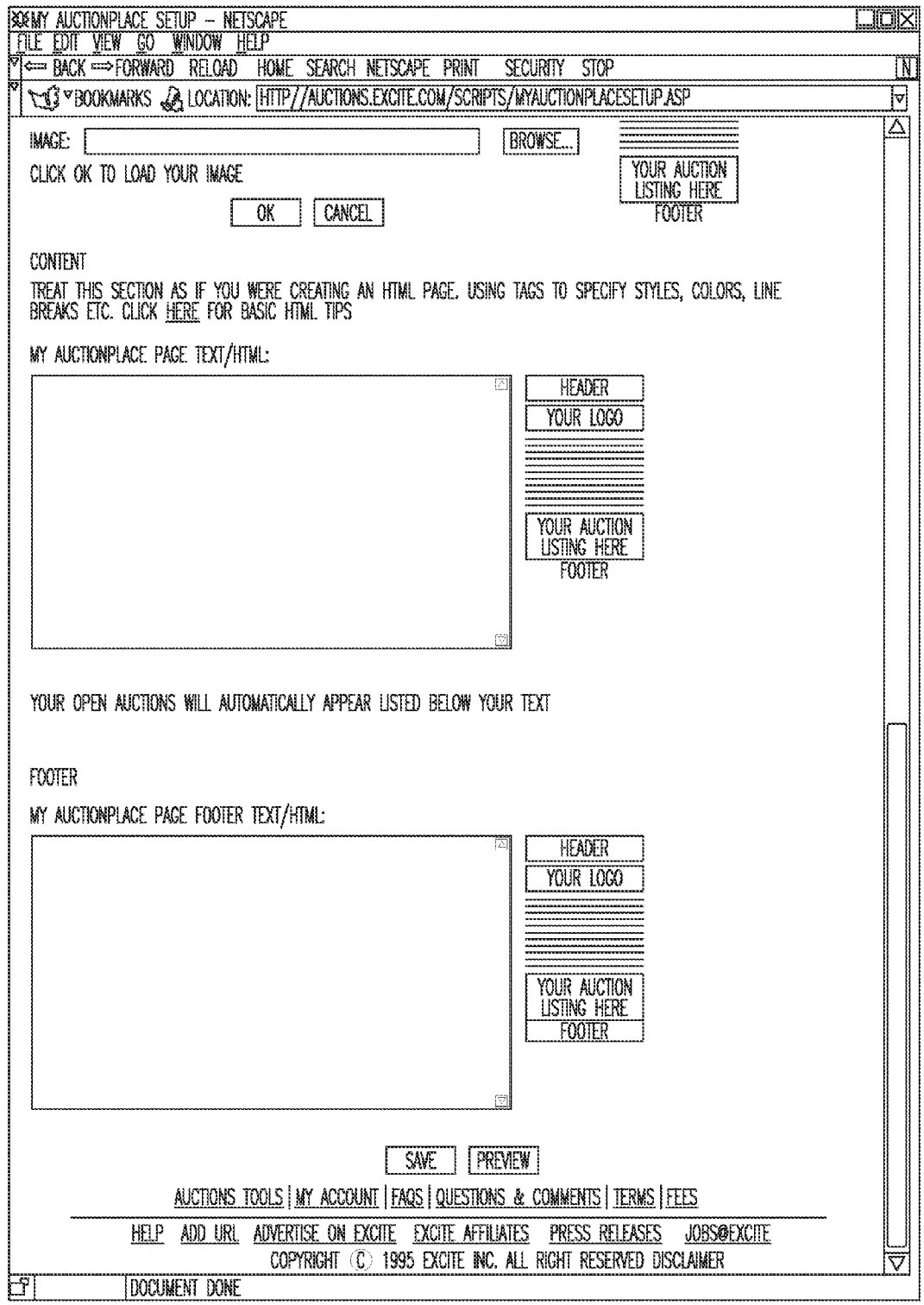

Referring to FIGS. 18A and 18B, sellers can also create personalized auction areas known as kiosks. Kiosks can be created using a kiosk creation page 180. This page allows the user to create a page at a customizable address with custom features, such as a seller logo, html content, and list of auction items listed by that user.

Sellers can also use a number of customizable pages to manage other aspects of their transactions such as shipment and payment defaults, images, and default tracking sort criteria (not shown).

When an item is awarded, the auction server system sends the winner an e-mail message, which can bear the member organization's name, informing him or her that he or she has won the item. It also records charges for any transaction fees resulting from the transaction. This information is aggregated and periodically transferred to the member site by ftp for billing purposes.

Figure 19:
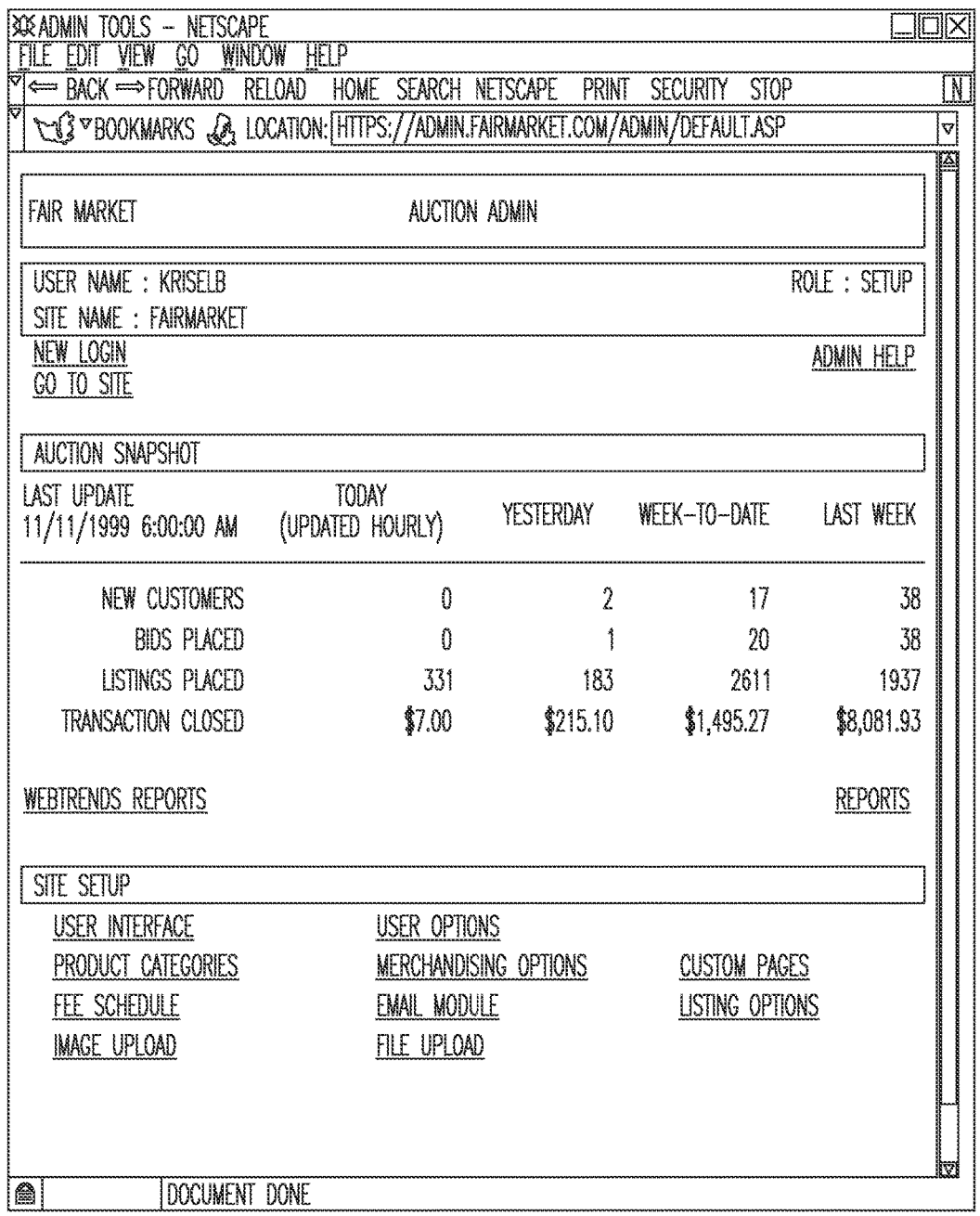
FIG. 19 is a screen view of an administration home page for the network member site of FIG. 3.

Referring to FIG. 19, client organizations have access to an administration module generated by the auction server system. This module can be accessed via a web browser over a secure connection. A password and user ID are required to access the administration module, and password access is managed through session cookies.

Different levels of access can be made available to different users. In one embodiment, there are four different levels of administration users with different levels of access:

Administration

Administration users have access to all functionality contained in the administration module and are the only user group that can define other users. The initial user ID for an organization will be an administration level user ID.

Listing Maintenance

Users in this group have access to listing maintenance.

Reports

Users in this group only have access to reporting functionality

Site Setup

Users in this group have access to the site setup.

There are also two higher levels of access for the administrative users at the auction server site. The first is known as the network administrator level and provides administration-level privileges for all member sites and allows the user to run reports on the aggregate network data. The second is known as the control level, and it allows the user to create a new site, manage the base category tree, run network reports, perform accounting tasks, manage invalid words (e.g., obscenity, words relating to counterfeiting), create a showcase that allows users to distribute listings from one merchant site to another, run fraud protection modules (e.g. to detect aliasing to beat bad ratings), universal searches (e.g., for customer service), and listings management (e.g., for customer service to close a listing) (see FIG. 45).

There are several options when setting up a new user. If the user has already been registered on the front end and they need access to the administration module, an existing administration user can follow an "Add Previously Registered User" link. For a completely new user, an administration user can follow an "Add New User Link." These links lead to pages on which an administration user can provide a new user's biographical information, assign them an initial password, assign them to a user group, and save the resulting account profile. To modify an existing user's administration account, the administration user can simply click on a name link for that user from a list of administration users for the site.

Figure 21:
FIG. 21 is a screen view of a template maintenance page for the network member site of FIG. 3.

Referring also to FIGS. 20 and 21, administration users can design the user interface for their sites through modular user interface functionality that is available on a user interface page that can be accessed through a user interface link in an administration home page in their administration module. At the top of the user interface page there is a link to page templates. This link leads to a template maintenance page.

The modular functionality is based on a tiered setup. The top tier consists of a series of templates (e.g., twelve of them). A template is provided for each distinctly different page that makes up the auction page. By clicking on anyone of the template names, the user will be shown a layout area for that template. This layout area is equivalent to the second tier of the functionality. Each layout area consists of scripting code, such as HTML code, and tokens. The scripting code can be used to control the look and feel of the page, and the tokens represent auction-specific information that is fundamental to the page.

The tokens make up the third tier of the modular functionality. They are objects that each represent a section of the auction member site. In one embodiment, there are approximately 80 of them. Tokens can be selected and pieced together to create a large number of customizations to an auction site. In addition, each token is itself customizable. New custom tokens can also be created.

Figure 22:
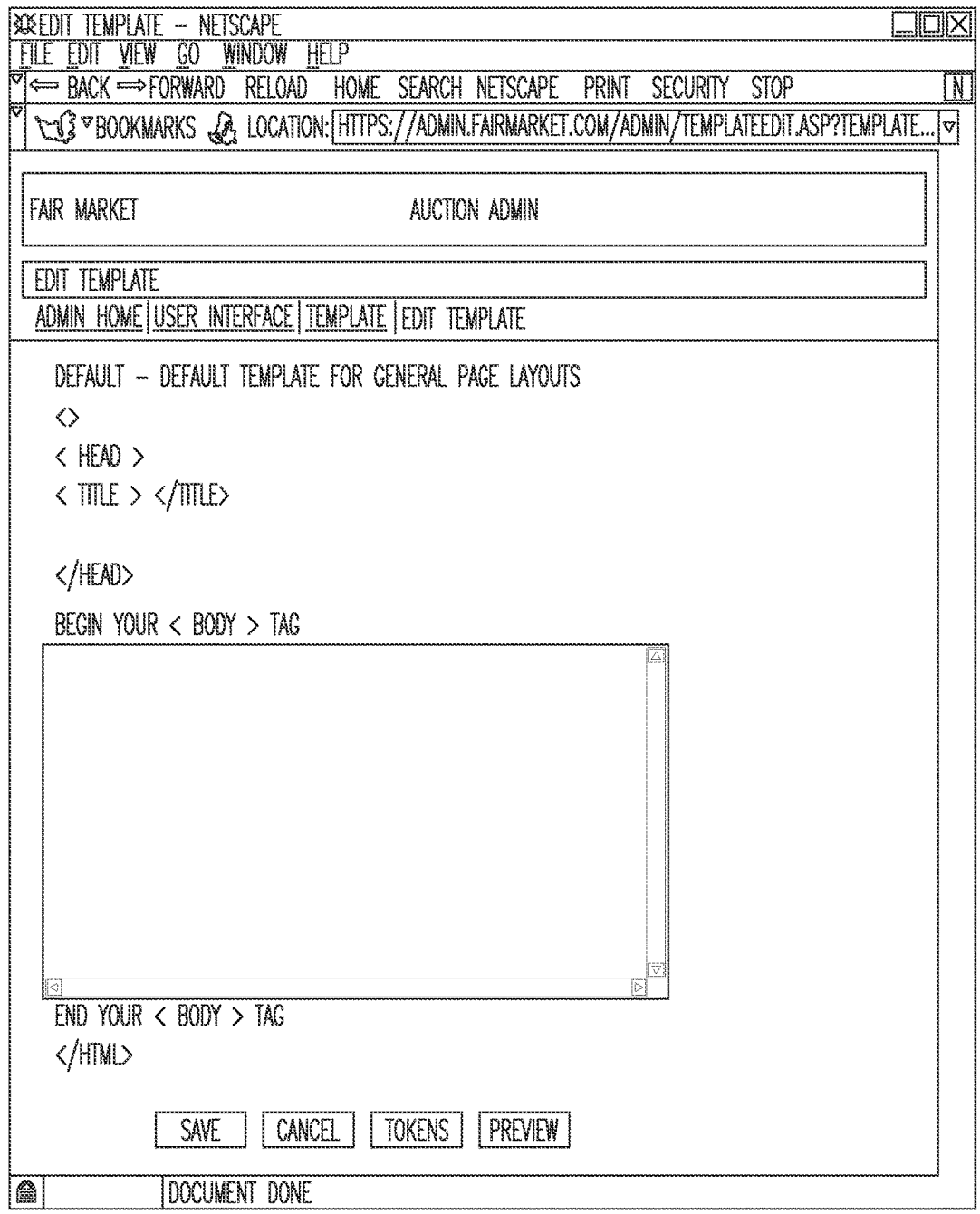
FIG. 22 is a screen view of a template layout page for the network member site of FIG. 3.

Referring to FIG. 22, each of the templates represents a style of page that is seen on the auction web site. They are:

Default

This template is used for all pages not controlled by the other templates. All auction-specific information is represented by one token—the FMContent token. Examples of default pages include: "Help for Buyers," "Terms and Conditions," etc.

Home

This is the sites main auction page (e.g., A1), and will typically be set up like the member site's current home page, but it can be customized in any suitable way. Common elements would include the site header, a search option, categories, and featured listings.

Category

This page is used to display the different levels of the category tree. The browse category tree is usually accessed through the home page and the search listings page.

Leaf

This is a listing page that will be used to show the actual listings that are under one or more category pages. For example, a leaf page entitled "Hewlett Packard®" might be found under a sequence of two category pages entitled "Computers" and "Desktops."

Lot Detail

This page shows the Listing information such as Start and End time, seller info, shipping info, time remaining to bid, how many bids, and what the current winning bid is. This is where bidding occurs.

Secure

This template is used for any pages that are shown on the secure server, such as credit card information, customer information, etc.

FAQ's

This page will house a list of Frequently Asked Questions, that will be tokenized so as to provide both the implementation manager and the site administrator a simple, intuitive way to update FAQ's and other help topics. Some parts of the FAQs are dynamic, which allows new sections to be added automatically by the system if new functions are added by member sites. This also allows the system to automatically update a specific section if the functionality that section describes is enhanced by the auction server system.

Search

Layout for the static search page. This page allows the user to determine the exact placement of the numerous searches that are provided.

Place

Layout for the main "place a listing" static page. This page allows a user to fully customize how his or her site's main "place a listing" page will look, and will ultimately determine how its listing placement process will flow.

Featured

Layout for the featured listings page. This page allows the user to control the look and feel of his or her featured listings page.

Member

This template controls the layout for kiosk pages. This allows the member site administrator to determine the general look and feel of the kiosk pages and how they will flow to and from the parent site.

SubPlace

This is the template that controls the second tiered pages of the listing placement process.

The layout of each of these sections will initially default to the classic auction style with a navigational column on the left side of the pages. This layout can be customized, however, by altering the scripting code on the templates in a template editing window in a layout page for that template. The layout pages allow users to see what tokens are present on the page, and where these tokens are placed. By altering the layout of each template, the user can change the overall look and feel of groups of pages on the member site. Similarly, by changing the location of the tokens and the code around them, users can move specified items around in the confines of the groups of pages.

The tokens can include text, scripting language, such as HTML or ASP, and/or calls to auction system functionality. They can also include references to other tokens. The tokens represent parts of the page that are moveable or customizable, and they each correspond with either a section or sections of the auction site. For example, there is a token for the search functionality. This token can be altered to place the search functionality on the bottom of the page, thus altering the look of the page. The page template with the new layout is then saved with all the relevant new information, causing the corresponding page or pages to be changed on the live auction site.

Figure 23:
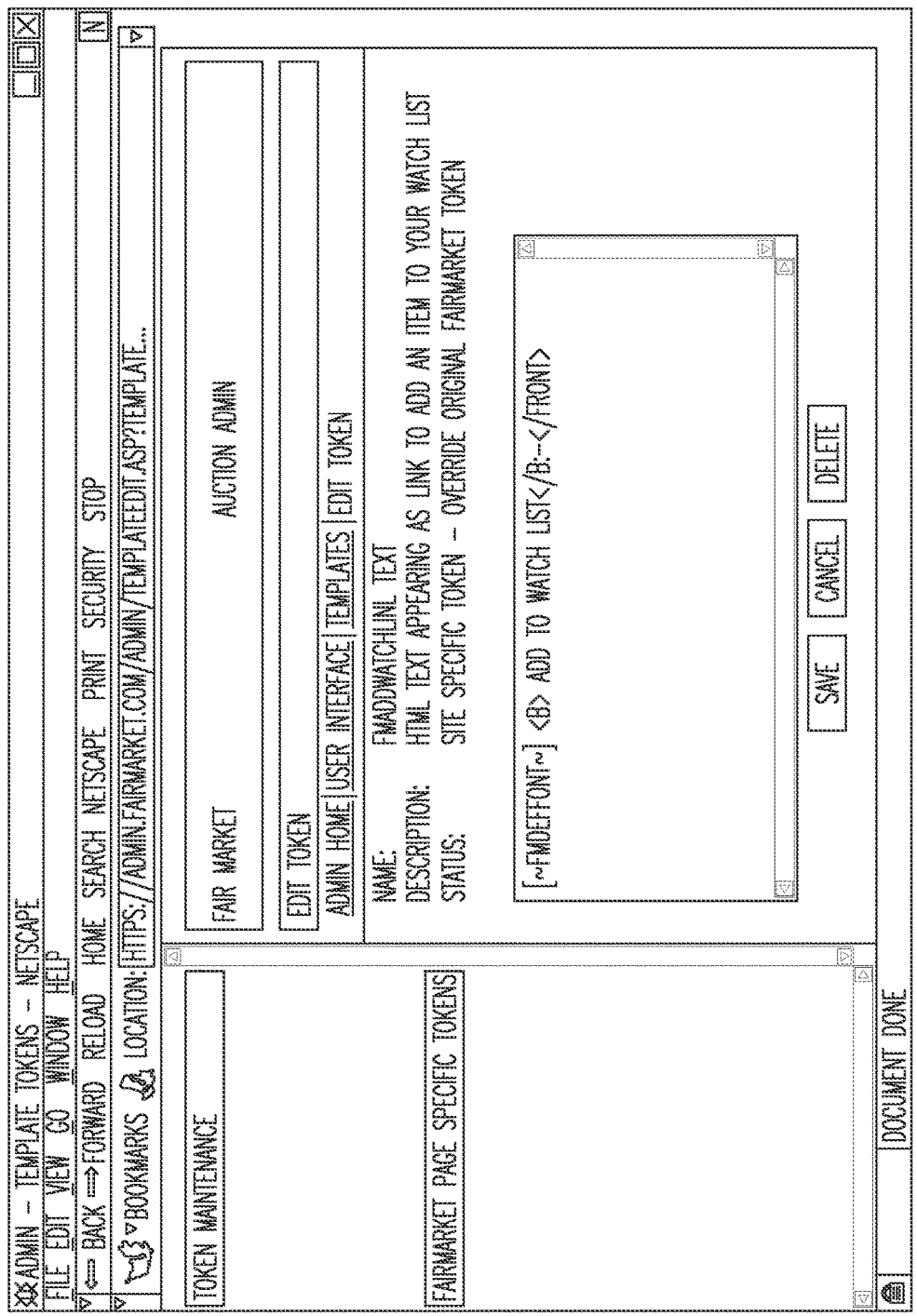
FIG. 23 is a screen view of a token maintenance page for the network member site of FIG. 3.

Referring to FIG. 23, users can manage tokens from a token maintenance page. This page includes a token navigation list bar and a token editing window. The token navigation list bar allows the user to select one of the available tokens to be listed in the token editing window, where its content can be edited. New tokens can be created by following a new token link to a token creation page and providing parameters for the new token.

Figure 24:
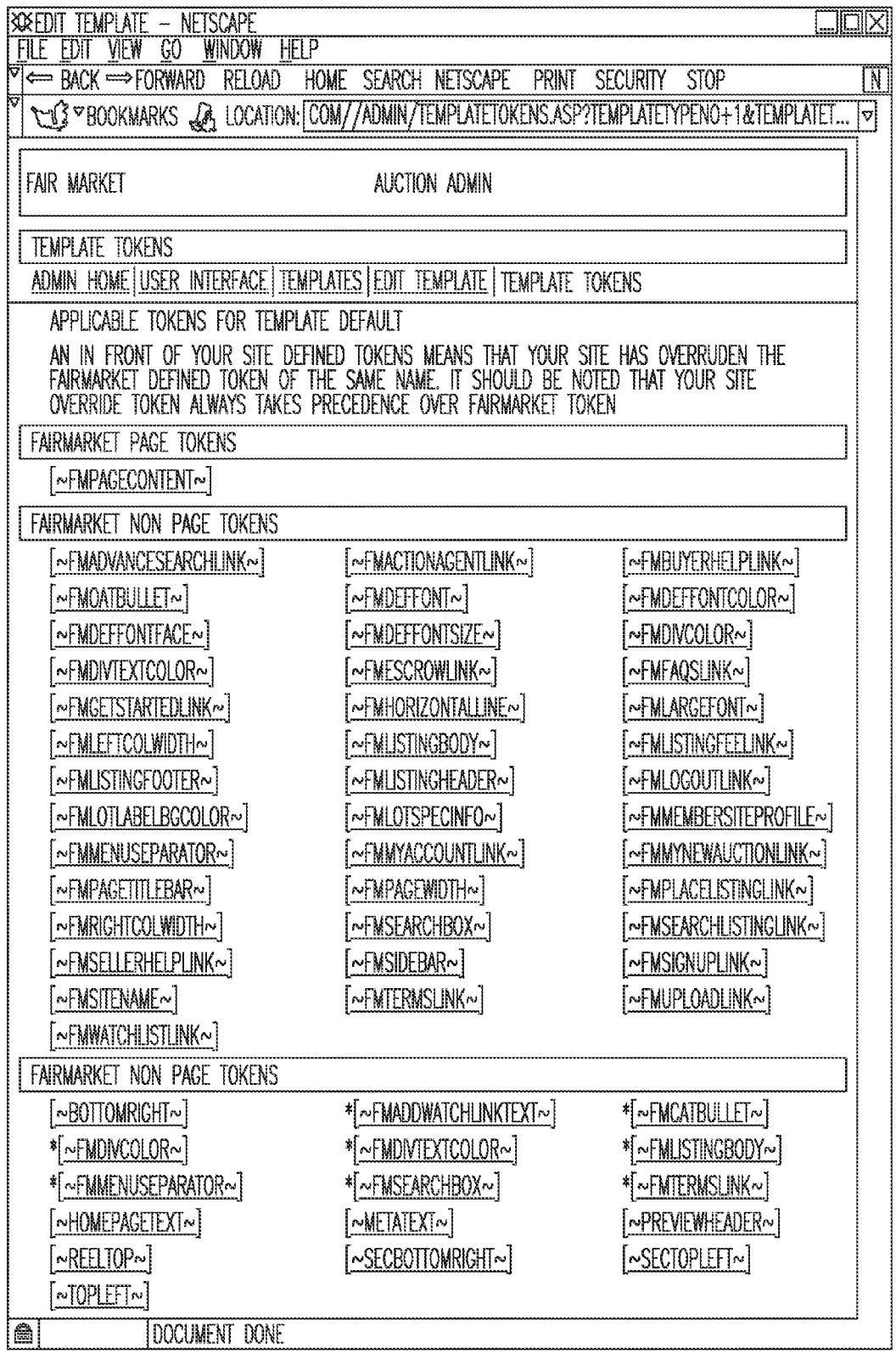
FIG. 24 is a screen view of a token list page for the network member site of FIG. 3.
Figure 25:
FIG. 25 is a screen view of a token details page for the network member site of FIG. 3.

Referring to FIGS. 24 and 25, the user can also reach a token list page that lists all available tokens in a link format. Actuating a token name in this view takes the user to a token details page, which lists the name, description, and value for the token.

An illustrative list of tokens is presented below. These tokens are broken down into five groups: I) auction server system page-specific tokens, II) auction server system non-page-specific tokens, III) member site tokens, IV) tokens for a new member site template, and V) configurable listing box related tokens. The user can override these tokens with an asterisk (*).

I. Auction Server System Page Specific Tokens

FMAdRefNo

Category specific advertisement reference number defined by site. This token is used to target an advertising server. It is placed where at a location normally used pass values to an advertising server. The values for this token are defined in the product category functionality.

FMCatContentBox

This listings box appears on the listing pages and displays the featured merchant listings. This ContentBox is controlled by the auction server system.

FMCategories

The selectable category links that appear on category browse page and are used by the end user to navigate through the category tree.

FMCatFeaturedListings

The listings box that appears on the lowest level category browse page. A merchandising option can be set up to allow end users to place listings in this listing box.

FMCatListings

The listings box for the main set of listings associated with a category.

FMCatNavLinks

Links for navigating between category leaf pages if there is more than one category leaf page. They are usually at the bottom of the page.

FMCatPromoText

Promotional text for a specific category that appears on the leaf page or browse page for that category. The content of this token is defined in the product category functionality.

FMCatRefNo

Category-specific reference number defined by site that allows an administration user to dynamically identify what category the user is in. This token is used to link to dynamic information on a main site that is related to the category.

FMHomePageListings

The listings box that appears on the home page. A merchandising option can be set up to allow users to place listings in this listing box.

FMListingKey

This token provides listing key icons and links to help pages. Usually found at the bottom of the page.

FMLotActionItems

A group of action-oriented links, including bid now, seller info, shipping and payment terms, etc. These are found directly underneath the listing detail information.

FMLotInfo

This is a table of basic information for a listing, including opening and closing time, price, seller name, etc.

FMLotSellerInfo

This is a table of seller information for a lot that lists all relevant info on the seller of the item. Found on the lot detail page.

FMLotShipPayInfo

This is a table of shipping and payment information for a listing. It is found on the lot detail page.

FMMainCategories

This is a table of top level categories for navigating to lower levels. These are the main categories that are seen on the home page.

FMPageContent

On default auction pages, this is the page that contains all generic content.

FMSiteCatNo

This is the site-specific category number that is allotted to each site by the network for identification reasons.

FMTimeStamp

This token provides the date and time that the information on the page was last published.

II. Auction Server System Non-Page Specific Tokens

*FMAdvancedSearchLink

This is a link to the advanced search page. This link is usually present next to the general keyword search.

*FMAuctionAgentLink

This is a link to the auction agent page. This link is usually present in the navigation menu.

*FMBuyerHelpLink

This is a link to buyer help. This link is usually present in the navigation menu.

*FMCatBullet

This is a token for the category emphasis bullet.

*FMDefFont

This is a token that holds the default font style tag.

*FMDefFontFace

This is a token that holds the default font face.

*FMDivColor

This is the color that makes up the divider bars on the auction pages.

*FMDivTextColor

This is the color that makes up the text in the divider bars.

*FMEscrowLink

This is a token that holds the link to the escrow services page. It is usually found in the navigation menu.

*FMFAQsLink

This is a link to FAQs page. It is usually found in the navigation menu.

*FMHorizontalLine

This is a token that draws a horizontal line the width of the page for divider purposes.

*FMLargeFont

Large font tag.

*FMLeftColWidth

This is a token that specifies the default left column width.

*FMListingFeeLink

This is a link to the listing fees page. It is usually found on the navigation menu bar.

*FMLogoutLink

This is a link to release a use cookie and return to home page.

*FMLotSpecInfo

This link defines the various specification of a lot for sale.

*FMMenuBar

This is a token that makes up the base navigational menu bar.

*FMMyAccountLink

This is a link to the my account page.

*FMMyNewAuctionLink

This is a link to the new auction site setup page.

*FMPageTitle

This is a token that makes up the application generated page title.

*FMPageTitleBar

This is a token that makes up the descriptive page title bar.

*FMPageWidth

This token sets the default page width.

*FMPlaceListingLink

This is a link to the place a listing page.

*FMRightColWidth

This token sets the default right column width.

*FMSearchBox

This token consists of the standard lot title search box with submit button.

*FMSearchListingLink

This token houses a link to the locate listings page.

*FMSecSideBar

This is a token that sets up the standard vertical navigation bar on secure pages.

*FMSellerHelpLink

This is a link to the seller help page. Usually located on the vertical navigation bar.

*FMSideBar

This is a token that sets up the standard vertical navigation bar.

*FMSignupLink

This is a link to the new customer registration page. It is usually located on the Vertical Navigation bar.

FMSiteName

This is a token that holds the registered name of the auction site.

*FMTermsLink

This is a link to the customer terms page. It is usually located on the vertical navigation bar.

*FMUploadLink

This is a link to the upload listings page. This is found in the my account section.

*FMWatchListLink

This is a link to the watch list page. This is usually found in the my account section.

FMwebAddress

This is a token that holds the web site address.

FMMenuSeparator

This is a token that holds the separator string to use between menu items.

FMDefFontSize

This is a token that defines the default font size for the site.

FMDefFontColor

This is a token that defines the default font color for the site.

FMDefFont

This is a token that defines a default token for the site.

III. Member Site Tokens

*BottomRight

This is the HTML following auction page content specifying the footer of a member site. Used in standard auction format.

HomePageText

This is the HTML that will appear on the home page.

*MetaText

This is the MetaText tag.

*SecBottomRight

This is the HTML following auction page content on secure page.

*SecTopLeft This is the HTML preceding auction page content on secure page.
*Top Left
This is the HTML preceding auction page content that represents the header and left hand column of a member site. Used in standard auction format.
VI. Tokens for New Member Site Template
FMMemberHeader
If a kiosk site, this is the kiosk header established by the site. Otherwise, it is a standard black bar with a link back to the main site.
FMMemberTitle
This is the name of the member site.
FMMemberSiteProfile
This is the member's site profile.
FMMemberHomePageText
This is the member's home page text.
V. Configurable Listing Box Related Tokens
FMListingHeader
This is a token that holds the layout defining listing box header.
FMListingBody
This is a token that holds the layout defining listing box record format.
FMListingFooter
This is a token that holds the layout defining listing box footer.
FMMerchantImg
User-defined image for merchant listings.
FMLotLink
The HREF for a listing page.
FMLotTitle
The title of a listing.
FMLotPhotoImg
A token that defines the image to use if a listing has a photo.
FMLotTypeImg
A token defining an image for the particular listing type. There is an administration part to the implementation of this token.
FMLotPrice
The current minimum bid amount for a listing.
FMLotEndDate
The ending date for a listing.
FMLotNumBids
The number of bids for the listing.

Figure 26:
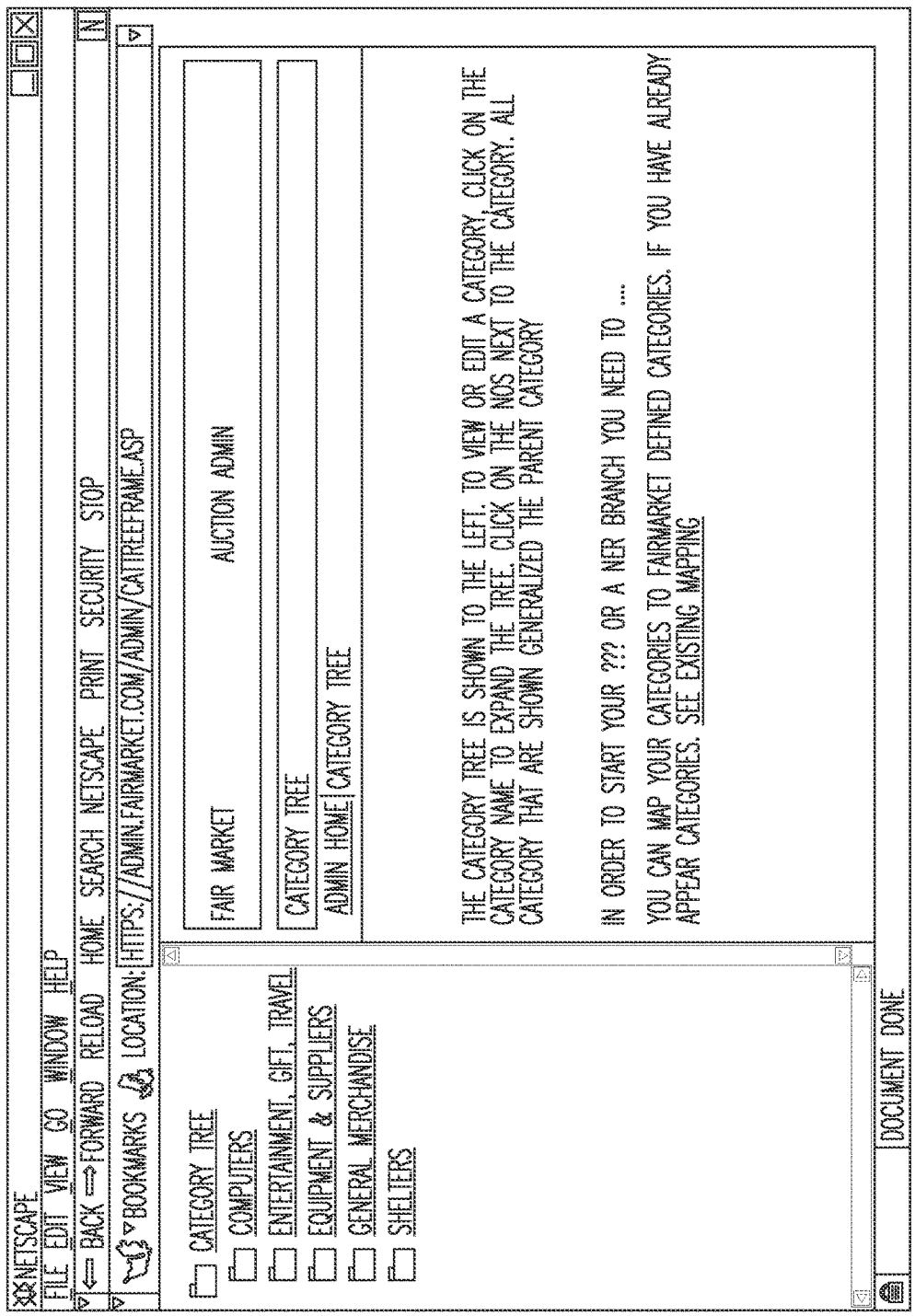
FIG. 26 is a screen view of a category tree administration page for the network member site of FIG. 3.
Figure 27:
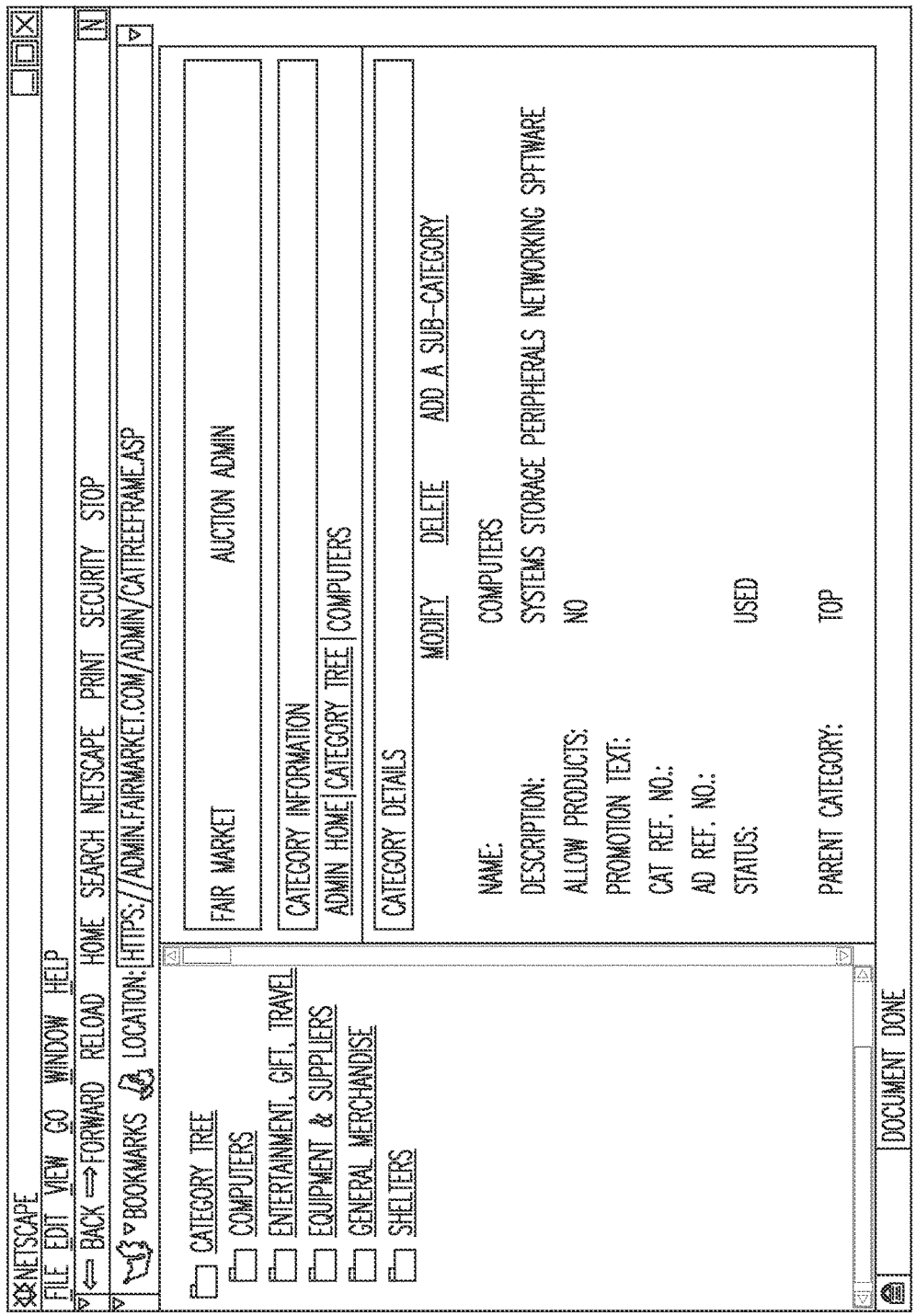
FIG. 27 is a screen view of the category tree administration page of FIG. 25 showing a detail pane for an illustrative parent-level category.

Referring to FIGS. 26-28, a product categories module allows a site administrator to set up his or her site category ontology quickly and easily. When the site is first set up, the category ontology can be empty, or it can inherit the auction server system base category tree.

The product categories module is controlled by a category tree page. This page includes a tree frame on the left and a details pane on the right. The user can use the tree frame to navigate through the category ontology. In order to expand or contract each category folder, the user can click on a + or − box next to each category. To see details about each category in the details window, the user can click on the underlined category name in the tree.

There are two types of categories-parent level categories and product (or item) level categories. Parent level categories are defined by folder icons and product level categories are defined by a page icon. A parent level category is defined as a category that can contain other categories. A product level category is defined as the lowest level category in an ontology—the one that will contain the actual product listings. An administrative user can create as many levels in a category ontology as he or she needs. If the ontology is empty, the user can click on an "Add New Top Level Category" link to begin the tree.

Clicking on the "Add New Top Level Category" link or "Add a Sub-Category" link will cause the system to prompt the user with an add a new category entry form. This form can include the following fields:
Name
The name of the category that will appear on the site when users browse through the categories.
Description
A category description that will appear on the site next to the category in a promotional layout.
Allow Products
Clicking "yes" will define the category as a product level category. Clicking "no" will define the category as a parent level category.
Promotional Text
If this category is a parent level category, this text (or HTML) will appear the column opposite of the children categories when the user clicks on this category link. If this category is a product level category, this text will appear at the bottom of the page.
Email Promotion Text
This field contains upselling information for bid winner in notification email. Promotion text can only be edited for leaf nodes in category tree.
Category Ref. No.
This field is defines a tag value pair that can be used to dynamically link with other sections of the member site. For instance, to initiate a search for product reviews based on the product level category, the user can set up this field to provide the input parameters for the search script.
Ad Ref No.
This field is similar to the category ref no. but is used to pass a tag value pair to an advertisement serving engine, allowing the member site to target advertising based on the category the user is browsing.
Status
To allow the category to be displayed to the member site's user base, the used button is clicked.

Once created, categories can be modified or deleted. To modify a category, the user can click on the category name in the category tree and use a modify link. To delete a category, the same procedure is followed, but with a delete link. A category that has sub-categories or products associated with it cannot be deleted. If this presents a problem, such as if a product line is temporarily unavailable for auction, the user can change the status of the category to not used.

Product specifications can be added to each product level category. When users enter a product listing for that category, they will be prompted to enter values in the product specification fields. The user can also click on an "add specification" link at the bottom of the product category detail page to add a product specification. At this point, the user will be prompted with the add a new specification form. This form can include the following fields:
Specification Name
The name of the specification as it will appear to the users of the member site when they look at a listing detail page or enter a listing.
Data Type
A string value can be used to create an alphanumeric field and a number value to create a numeric field.

Input Style

Free text input gives the user the ability to enter any value into the field. Single selection will prompt the user with a drop down menu.

Default Values

This field is only used if single selection is chosen for the input style. The values in this field will appear in the drop down menu.

Target

Either "Product" if the specification is to be associated with the product table in the database or "Listing" if the specification is to be associated with the listing table in the database. For example, a manufacturer would be a specification associated with the product whereas a condition specification would be associated with the listing. This field is for internal use only and has no impact on the end user.

Input Required

Determines whether a specification is to be a required field during the place a listing process. Clicking no will cause the specification to be displayed during the place a listing process, but will not be required.

Status

Clicking the button will cause the specification to be displayed to end users.

Figure 29:
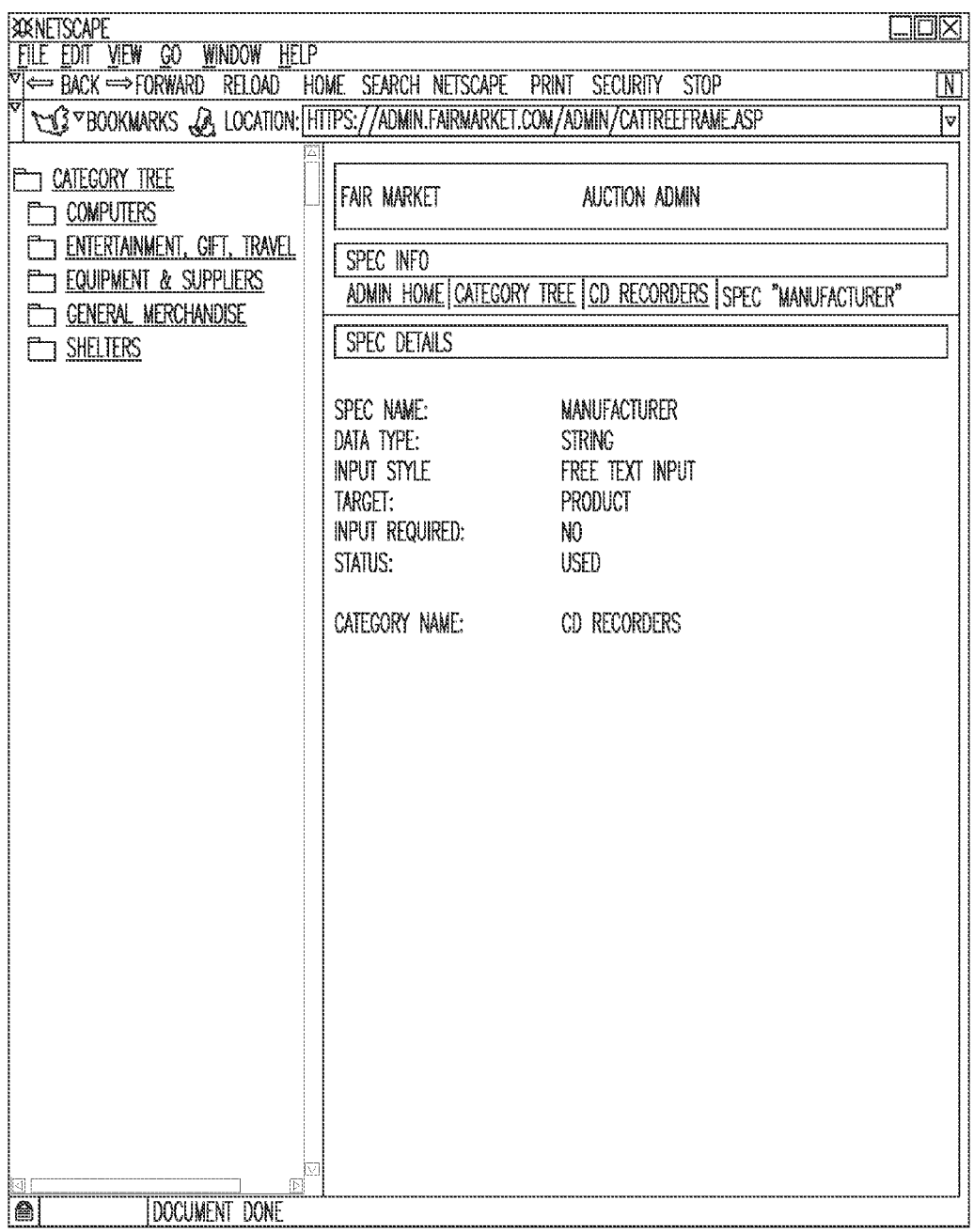
FIG. 29 is a screen view of the category tree administration page of FIG. 25 showing a specification detail pane for an illustrative specification.

Referring to FIGS. 28 and 29, existing specifications will appear at the bottom of the product category detail page. To view its specification, the user can click on a specification name in the table. This will take him or her to the specification detail page.

Categories created with the categories module can be mapped to auction system server categories. This allows a member site export its listings in those categories to other member auction sites and to import their listings, even if they are named differently on the different sites. For example, products entered as "notebooks" on one site could be presented as "laptops" on another site.

To map a product level category, the user clicks on a "map to a category" link from the product level category detail page. This link will only appear for categories that have not yet been mapped. Clicking on the link will present the user with the auction server system base category ontology. The user can then search through this ontology to find the server system product level category that best matches the member site product level category.

Because categories may not match exactly, the module allows users to specify mapping specifications that act like filters. For example: a user may have a product level category called "spreadsheets," but the server system categories list only "software." In such an instance, the user will be able to map the spreadsheets in the system's software category to his or her narrower category by specifying a filter based on the specifications for that category.

When a user maps to an auction server system category, the user category automatically inherits the specifications from the auction server system category. This allows users to perform specification-based searches for similar items across the whole auction network. Inherited specifications can also be deleted, or their can be mapping removed. Names of the specifications can be changed as well.

Figure 30:
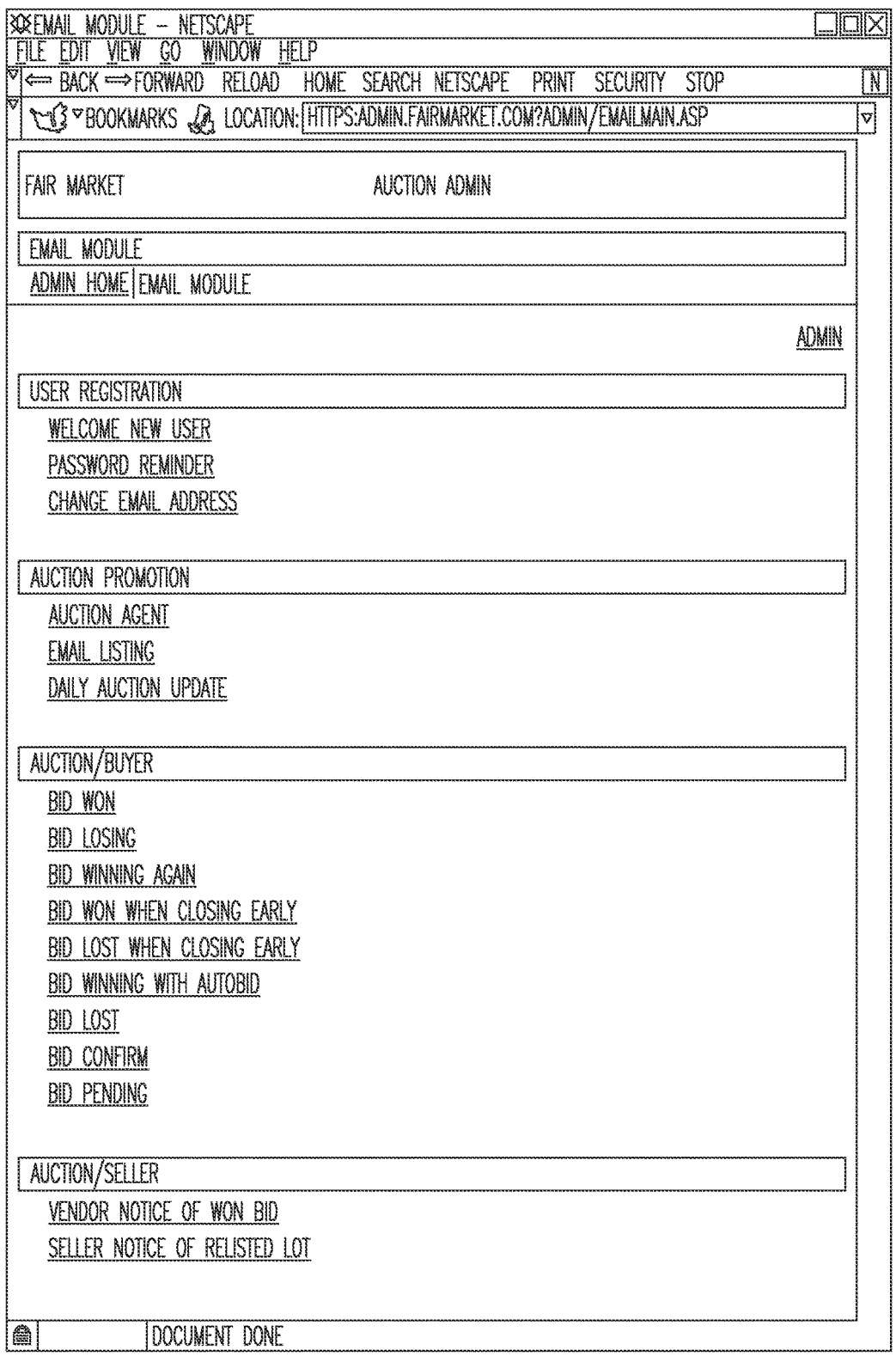
FIG. 30 is a screen view of an e-mail module administration page for the network member site of FIG. 3.
Figure 31:
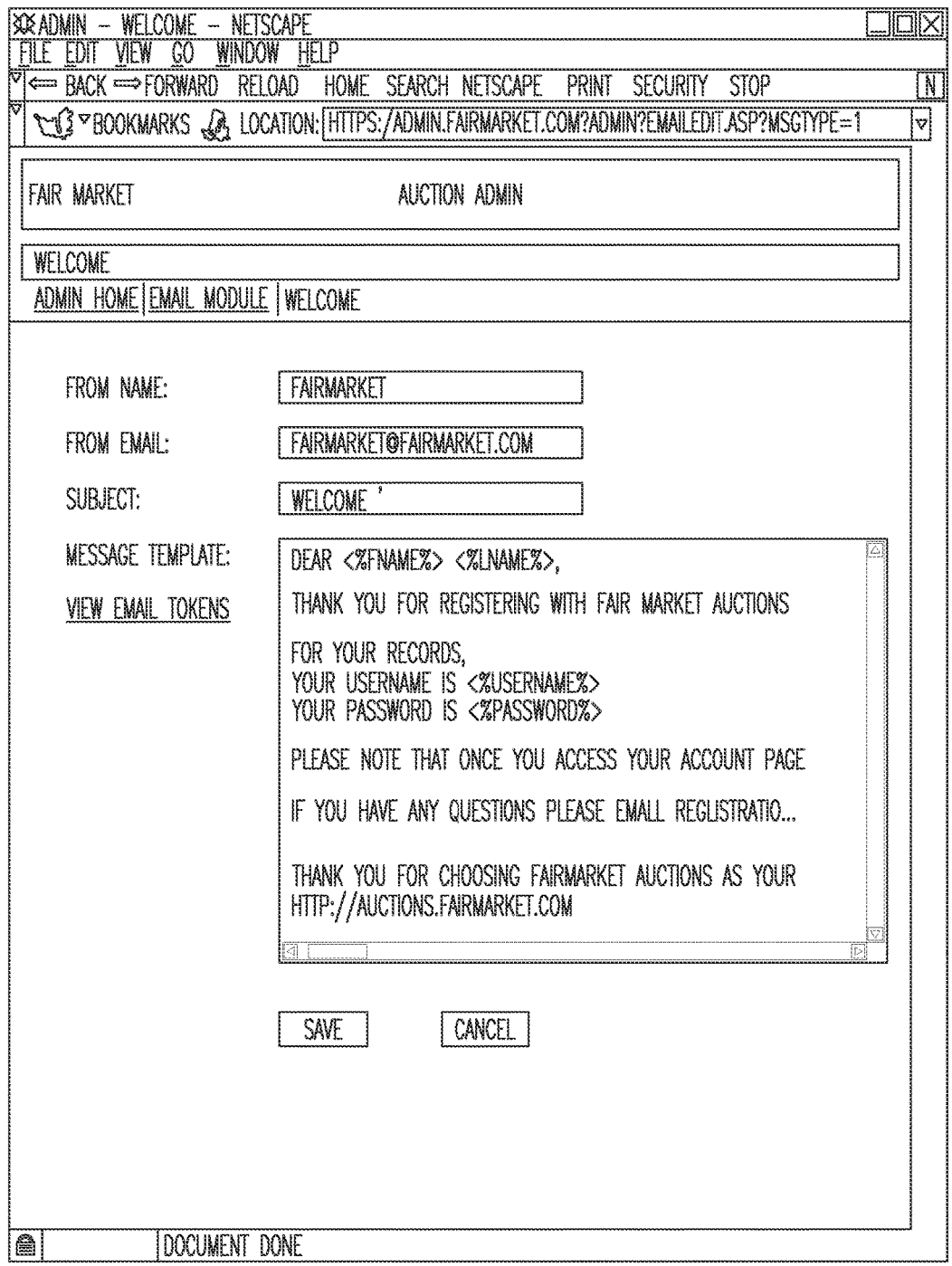
FIG. 31 is a screen view of an e-mail editing page for the network member site of FIG. 3.
Figure 32:
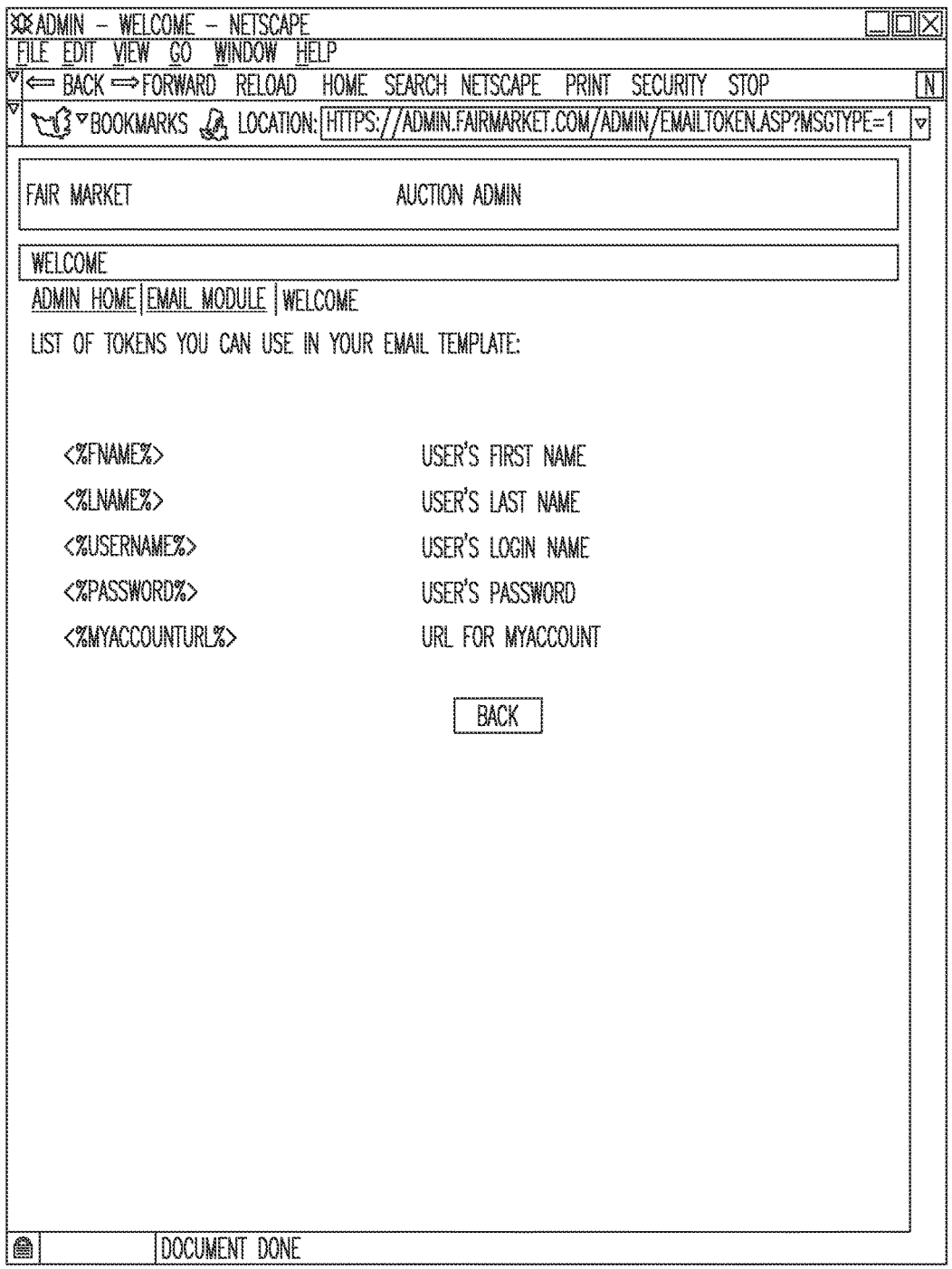
FIG. 32 is a screen view of an e-mail token description page for the network member site of FIG. 3.

Referring to FIGS. 30-32, each site is provided with standard e-mail messages. To customize them, the user can click on links to them in an e-mail module page. The user can then change the text of the e-mail as necessary in an e-mail editing page. The user can also move, but preferably should not delete, a series of variables, which can be enclosed in percentage signs and brackets. These variables draw data from the database and provide important information to end users. The e-mail tokens are described on an email token description page accessible from a view e-mail tokens link.

A "from name" entry can also be customized to specify the e-mail's return address. If the organization running the auction server is taking care of the member's customer service, this entry may be listed as "membercompany@acutionservercompany.com." Alternatively, the from address can omit any mention of the server organization's name, such as auctions@membercompany.com, but replies to such messages generally need to be redirected to the auction server system company's e-mail address.

Referring to FIGS. 33 and 34, the server system includes a listing options page that allows a user to choose from a number of different listing options. A first is a transaction type option area that allows the user to limit his or her site to one or more transaction types, such as English auctions, Dutch auctions, quick-win auctions, and classifieds. Classifieds are a brief advertisement offering property, goods or services, for a fixed price or best offer price. English auctions are publicly-held sales at which property, goods or services are sold to the highest bidder. Dutch auctions are auctions for listings of multiple items, in which the winners pay the lowest winning bid price. Quick-win auctions are auctions for listings of single items, in which the listing is immediately closed if the reserve price is met. Other types of transactions can also be handled by the system.

A second listing option is to enable e-mail transfer. This option allows users to submit their e-mail address to merchants during the bidding process, who can then contact users about related listings or specials. If the user chooses to enable the e-mail transfer function he or she can enter a rate (amount per email address) that will be charged to the merchant. This can be accomplished by clicking on a link that appears once the option is set, and entering a rate in a rate box on an e-mail transfer page, which also includes a list of reports sold.

Administration users can select an option allowing sellers to perform bulk uploads. They can also select an option allowing sellers to automatically relist their auction lot and specify the maximum length, in days, of an auction and classifieds. The administration user can specify the default length, in days, of auctions and classifieds as well.

The listing options page also allows the user to set up bid increments in a bid increment table. The user can choose from a default bid increment table, which is based on industry standards, or a custom table. Bid increments are a function of the reserve price. If there is no reserve price, the bid increment is a function of the opening bid. Each member site can allow its users to control the bid increment per listing. When using this option, it is preferable to set a maximum bid increment as well.

The system also allows users to amend and/or set their own terms and conditions on a listing page. These will appear above the auction server system's standard service terms. The terms can be drafted using HTML.

Referring to FIG. 35, the administration module can also display a user options page. This page allows the user to specify whether to require a credit card to post listings or to bid, and to specify the types of credit cards accepted.

The user options page also allows the user to specify minimum ratings to post listings. This allows control over the quality of sellers. Bid winners have the ability to rate the seller. If a seller receives poor ratings and they drop below a predetermined number, they will be unable to post listings on the member site.

Figure 37:
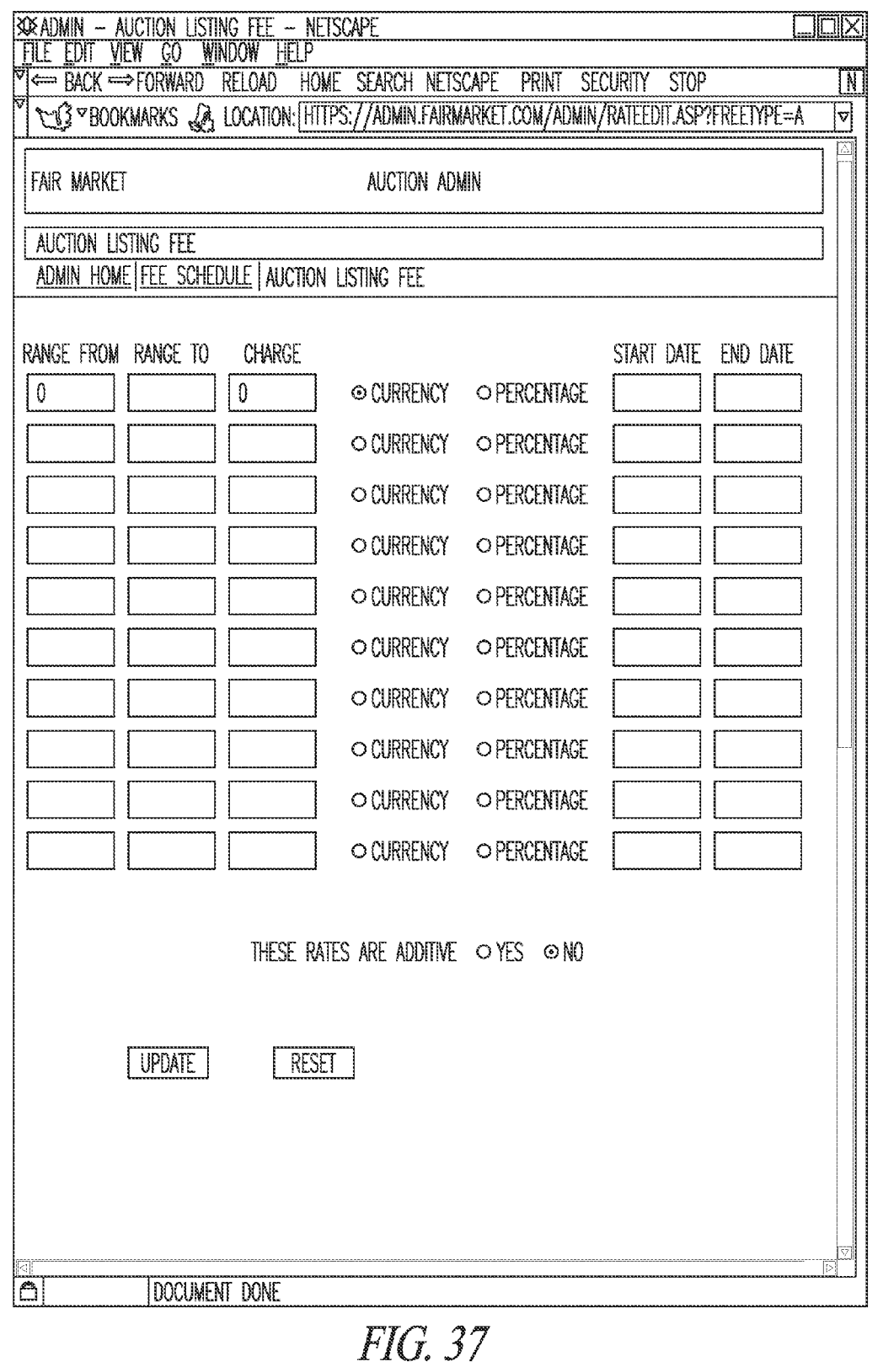

Referring to FIGS. 36 and 37, the user can also set the fee structures for buying and selling on his or her site through a fee schedule page with links to specific fee schedule pages, such as an auction fee schedule page. He or she can charge a flat fee or a percentage on any of the following:

Auction Listing Fee

The fee charged to a user to place a listing up for sale as an auction

Classifieds Listing Fee

The fee charged to a user to place a listing up for sale as a classified

Seller Transaction Fee

The fee charged to a seller if the listing is sold successfully

Buyer Transaction Fee

The fee charged to the buyer if the listing is sold successfully

Member and/or server sites can also share fees based on which site finds the buyer and/or which site finds the seller.

In one embodiment, members can provide information about users, such as their e-mail addresses, to other members for a fee. This fee can be transferred electronically by the auction server system.

The system provides a number of reports to its users. These are assembled from copies of the database that are made on a regular basis (e.g., nightly). Links to third-party network activity reports are also supported. Reports are stored at locations accessed through scrambled URLs.

Administration users have the ability to edit the listings placed on their sites. If listings are still in the upcoming state, they can edit them in their entirety, change their images, and even delete them before they go live. After listings open, administration users may only edit descriptions associated with the listings, change listing images, or close listings.

The re-list function allows a user to easily place listings. This tool prompts the user to perform a search for recently placed listings, such as by listing number, listing status, listing start date, or product name. From a search results page, the user can then select the listings to be re-listed and enter a date for the newly copied listings to open. The listings selected in this manner will be copied and give a status of upcoming. The user may edit the new listing before the listing opens.

An e-mail listings function allows an administration user to build a file of listings that will be sent to all his or her end users who have requested email notifications of specials. Like the re-list function, this function can be accessed through a search results interface.

The system allows administrative users to add new kiosk users and update the user information of an existing kiosk user. They can also define various kiosk parameters, including a kiosk header area, which is an area defined by HTML parameters on the top of the kiosk page and at the top of the kiosk administration panel. Its specification can consist of one image, multiple images, images and text size, body background and text link colors. The header can be any size, but preferably no more than 634 pixels in width.

The kiosk fee schedule page allows a user to set up pricing schemes that will be put into effect on his or her site. Separate rates can be charged to the user whether they are fees for placing a listing, fees for placing a classified, or simply buyer and seller transaction fees. The fee structure can be non-existent, can be one standard price per interaction, or can be a tiered structure that varies the costs incurred on the user based upon the price at which the user's auction closed.

Figure 38:
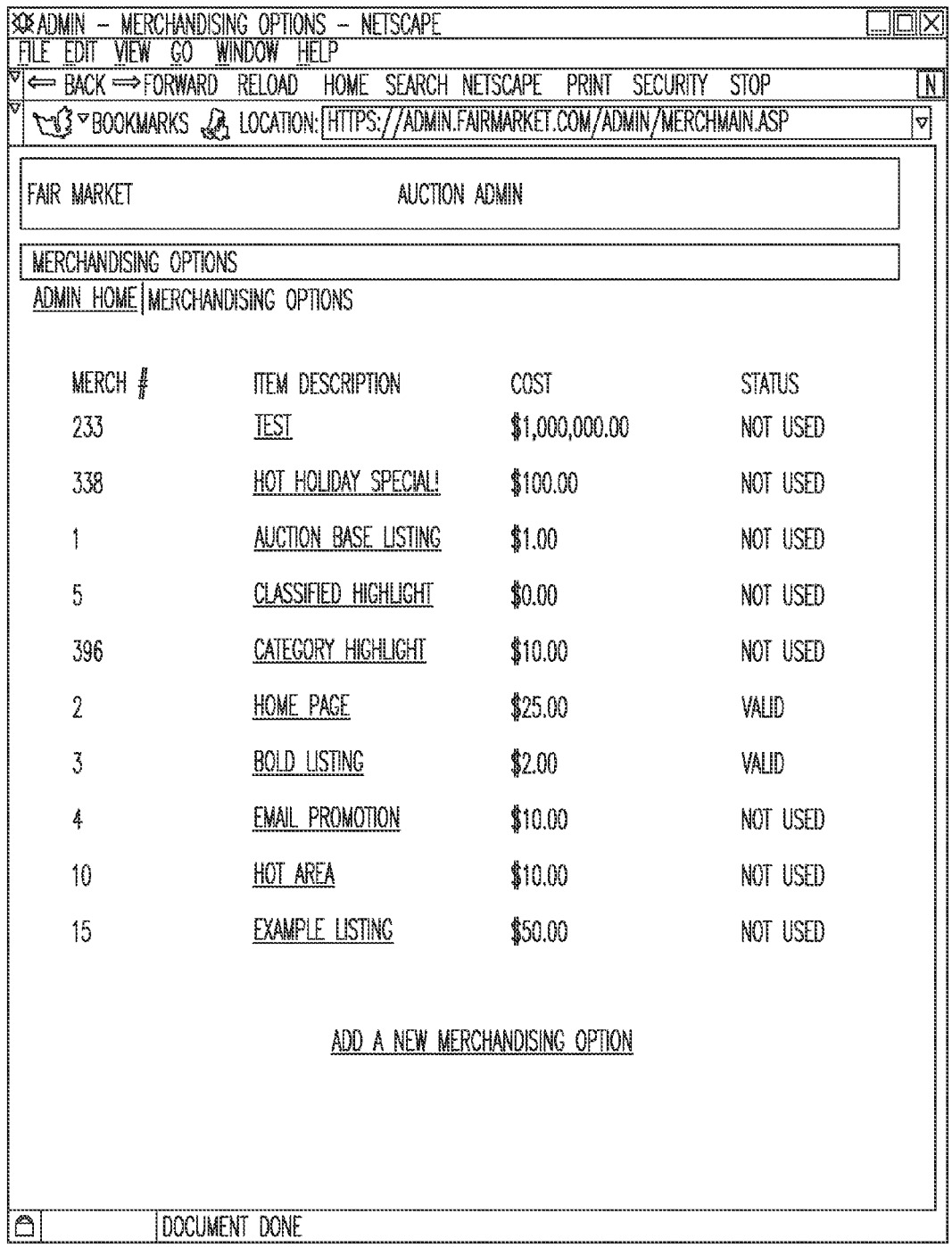
FIG. 38 is a screen view of a merchandising options administration page for the network member site of FIG. 3.
Figure 39:
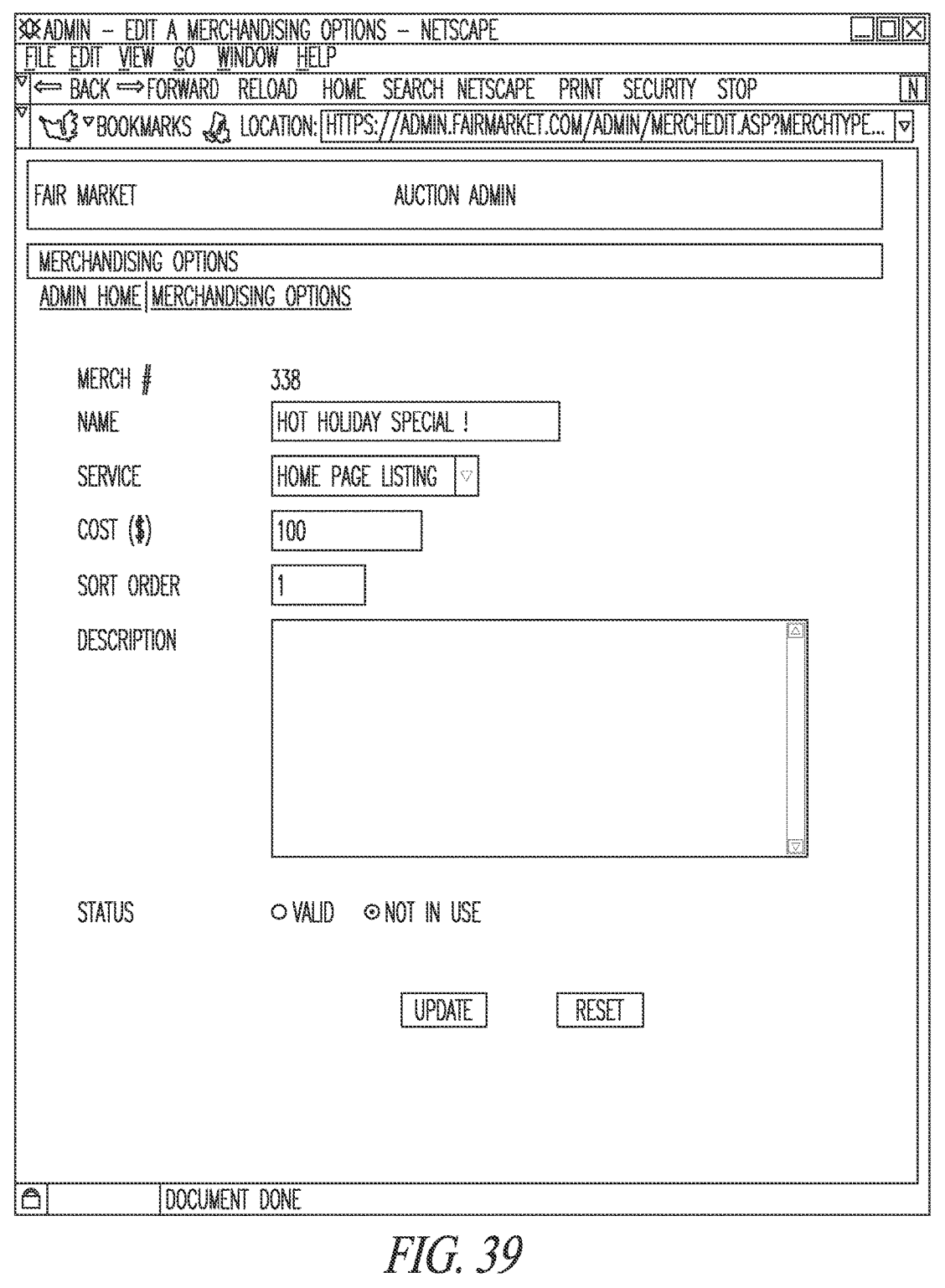

Referring to FIGS. 38 and 39, administration users can also set up the merchandizing options for their auction site. These can be accessed through a merchandizing options page, which provides a create link as well as a list of links to individual option pages. These option pages allow users to set the parameters for individual merchandising options of different types, including auction base listings, classifieds base listings, home page listings, bold listings, weekly e-mail promotions, listings featured on group pages, or listings featured on parent pages.

Figure 40:
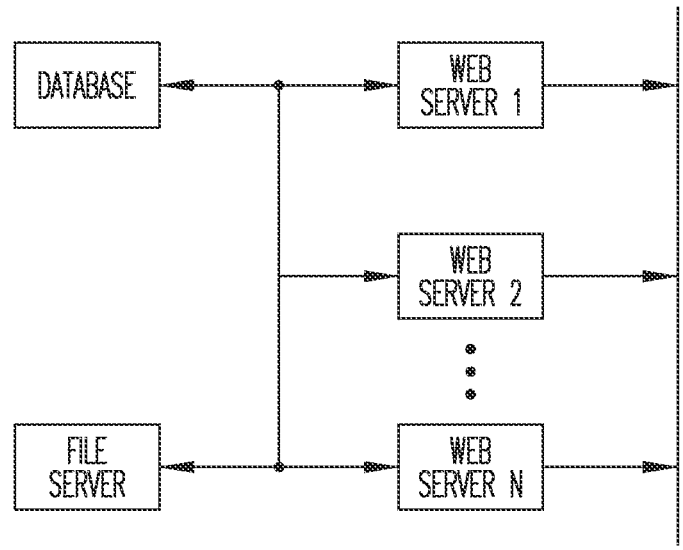
FIG. 40 is a block diagram illustrating an overview of the implementation of the auction server system of FIG. 1.

Referring to FIG. 40, the implementation of a publicly available auction server system is scalable to allow it to efficiently serve a number of auction sites, which each have a variable number of end users. In one embodiment, it is implemented with a cluster of computers that includes a database server connected to a file server and a number of web servers. Critical applications are multithreaded where practical to allow for the use of multiprocessor computers. In one embodiment, the clusters run the Microsoft Windows NT® operating system, but other operating platforms, such as UNIX® or MAC-OS®, could also be used. The servers run Microsoft® Internet Information Server software. Programming languages used in the system include Symantec Visual Café, Microsoft® Visual Basic, HTML and ASP. The database is implemented using a Microsoft® SQL server.

Figure 41:
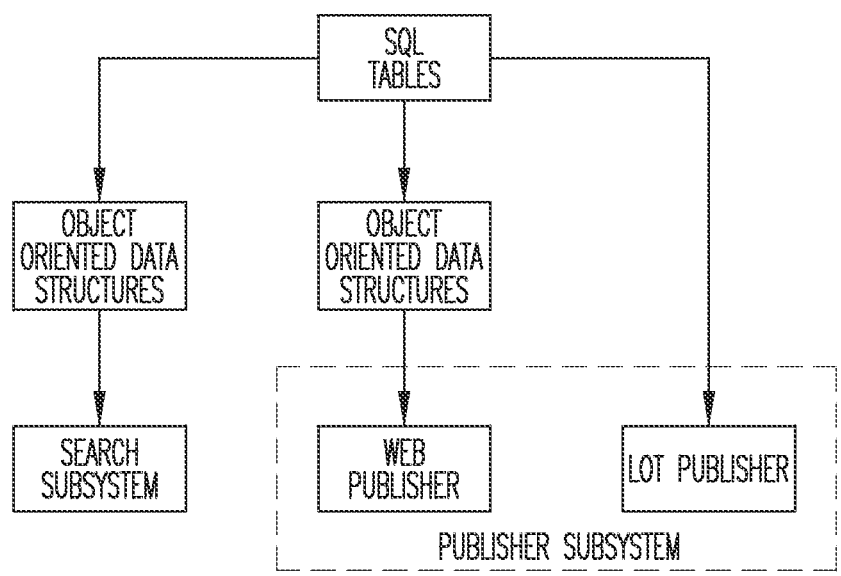
FIG. 41 is a general block diagram illustrating data management portions the implementation of FIG. 40.

Referring to FIG. 41, the auction server system includes an important module called the publisher subsystem ("publisher"). The publisher is a piece of the auction server system that creates entire web pages or building blocks for pages before they are requested by end users. This improves the response time of these pages and reduces the load on the main database. In one embodiment it is implemented using Java, VisiBroker Object Request Broker, available from Inprise Corporation of Scotts Valley, Calif.

The publisher is made up of two separate programs, a program called the lot publisher and a program called the web page publisher. The lot publisher creates the lot detail fragments and notifies the search subsystem of changes to the live database (i.e., new or changed listing records). The web page publisher creates all other pages.

The web page publisher consists of three pieces: a component that scans the live auction database for changed records, a cache, and multiple writer threads that create web pages from the cache. Most of these pages are written to the file server, although the home pages for each site are written to the web servers.

Figure 42:
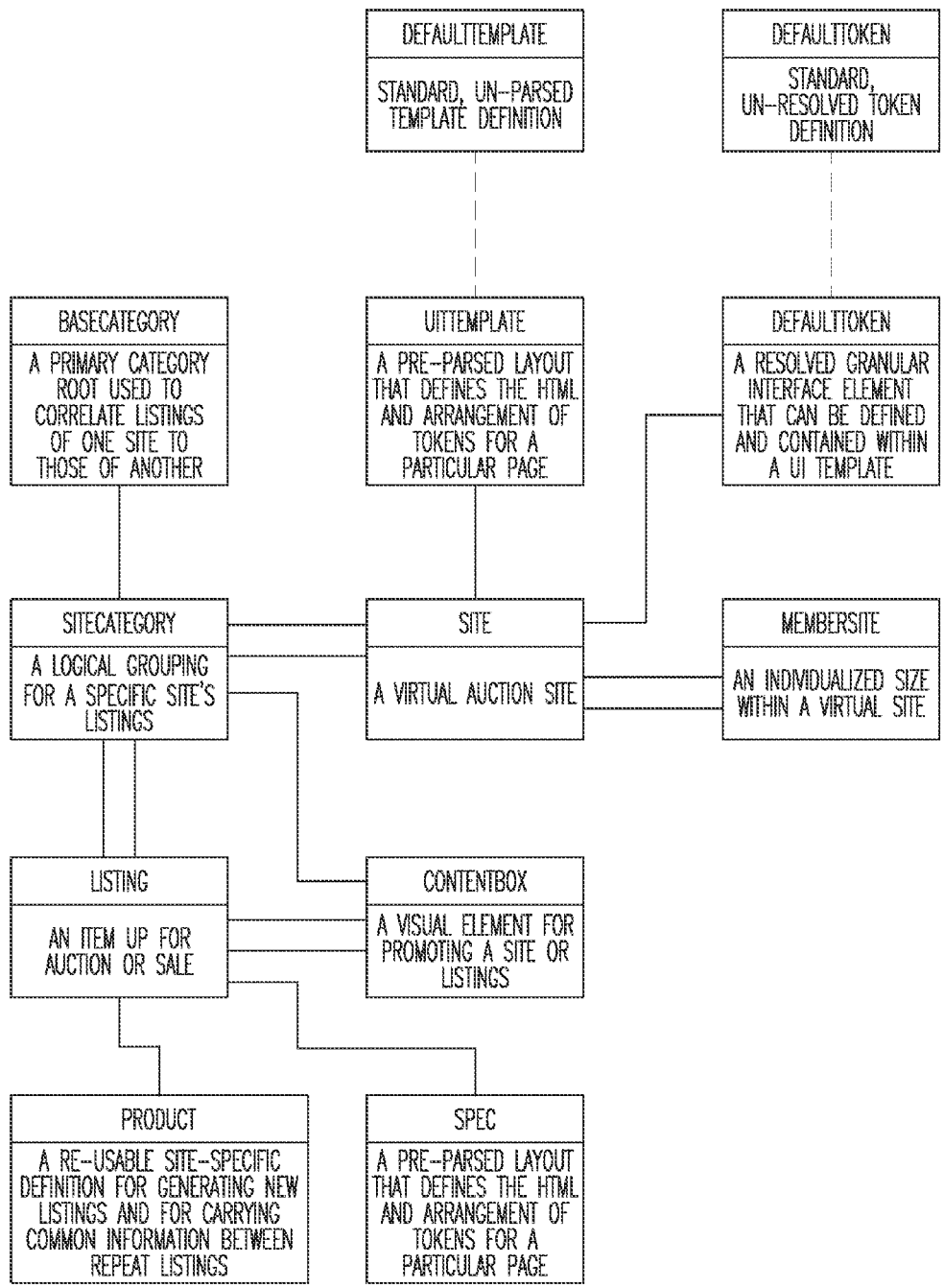
FIG. 42 is a general block diagram illustrating a data model for a publisher cache for the implementation of FIG. 40.

Referring also to FIG. 42, the publisher's memory cache contains an object model representation of the live auction database. This structure is created when the publisher begins execution and is modified each time that the publisher retrieves changed records from the live database in a process known as object-relational mapping. The object-oriented model is a structured representation of the data that can be accessed efficiently in generating the pages and fragments.

Each object also contains a so-called dirty bit that indicates whether it has changed since the last time that the publisher executed. The dirty bits are used by the various page writing threads to indicate whether a new page must be created. Each page is governed by several dirty bits, which form part of the internal description of the page that is maintained by the publisher. Once all pages are written, all of the dirty bits are cleared before the next pass through the live database.

Figure 43:
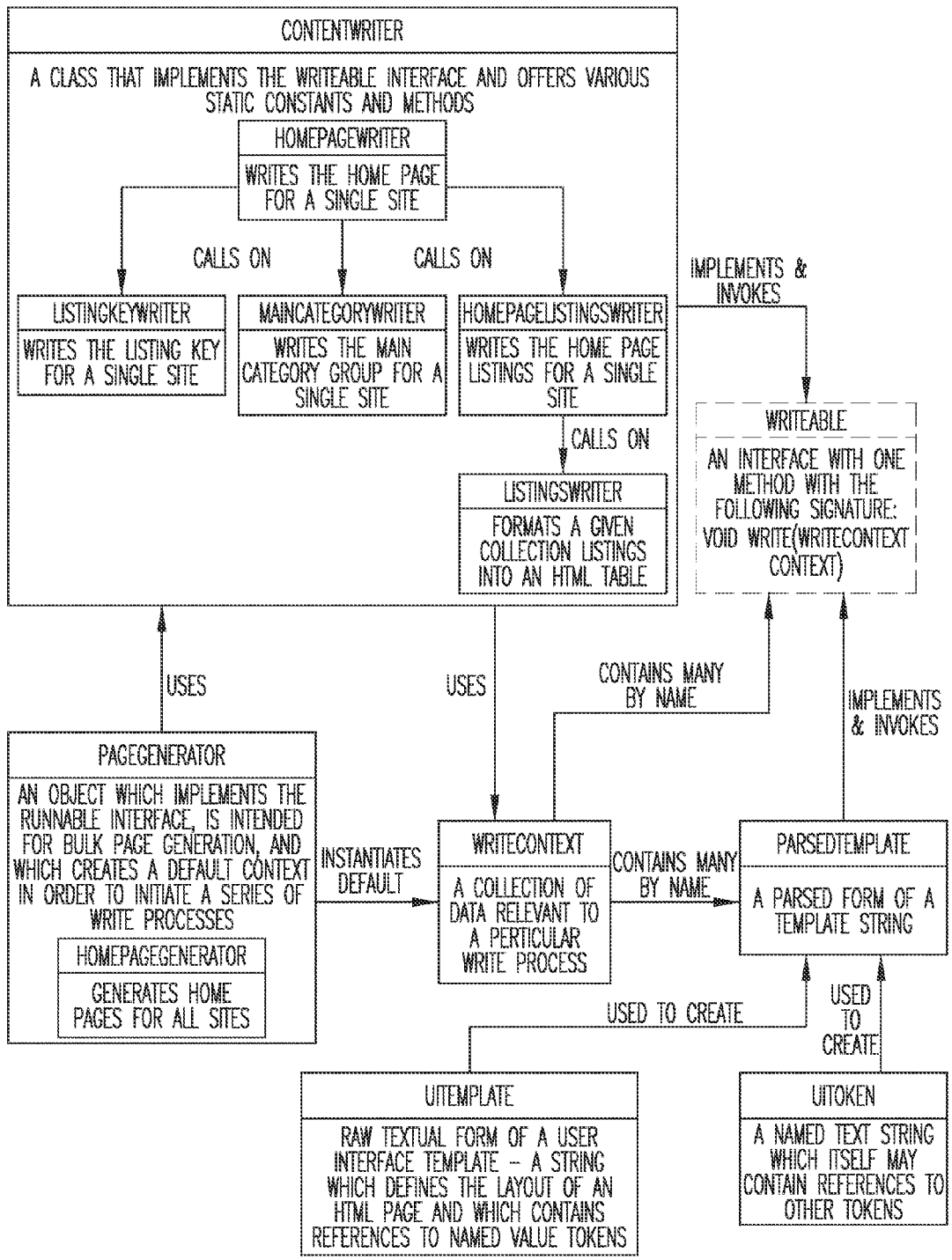
FIG. 43 is a flowchart illustrating an overview of the operation of the publisher for the implementation of FIG. 40.
Figure 44:
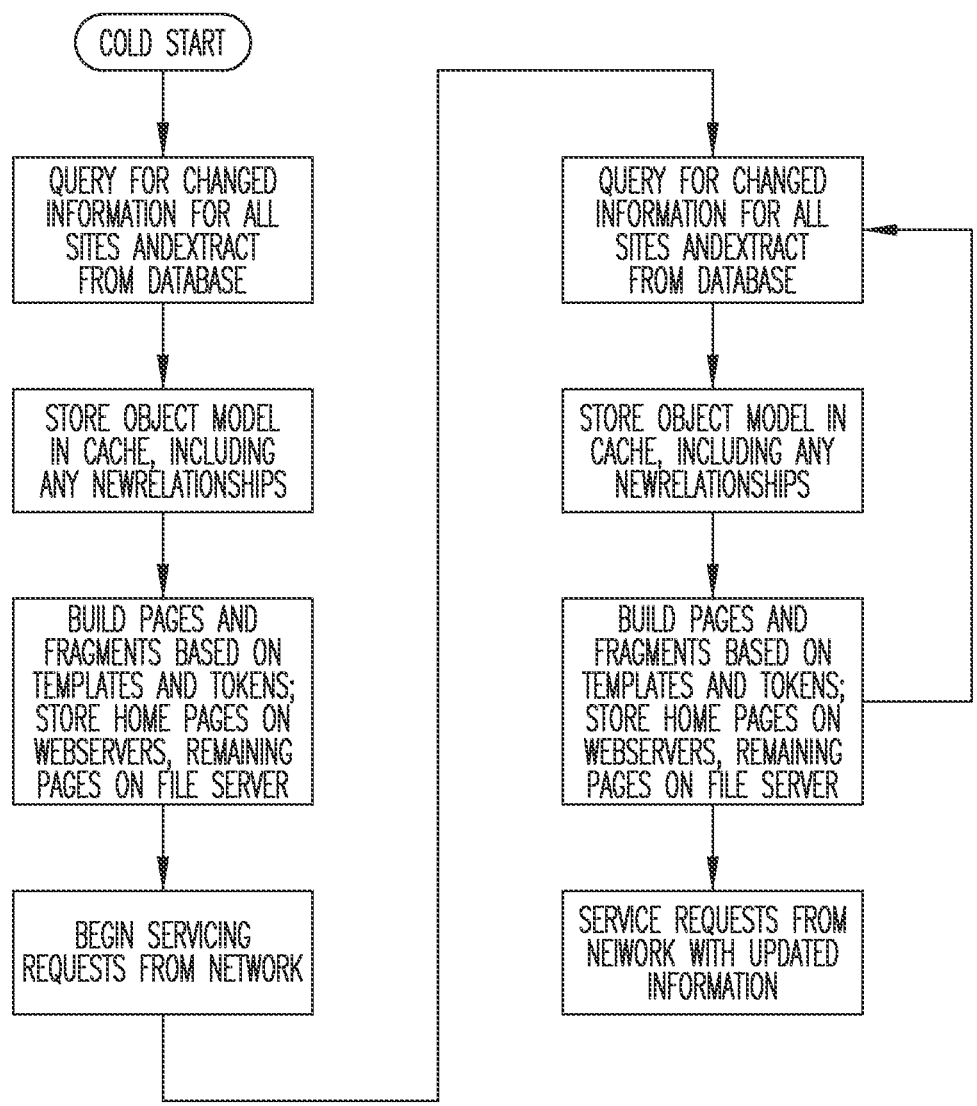
FIG. 44 is a general block diagram illustrating output generation for a publisher cache for the implementation of FIG. 40.

Referring also to FIGS. 43 and 44, the publisher scans the live auction database for any records (except user information) that have changed since its last pass across the database. It reads all of these records, incorporates them into its memory representation of the data, and invokes its writer threads. The rules that dictate what pages must change in response to changed database records are contained directly in the Java code within the publisher.

On startup, all dirty bits are set and the publisher must therefore create a copy of each web page. Once the system is running, however, the publisher only creates pages that have changed as a result of database changes. Home pages are an exception to this rule, as home pages for each site are unconditionally created each time the publisher runs. The publisher creates a single copy of each site's home page, and this copy is then replicated and copied to all of the web servers by a script called RepliMonster. This script invokes a Microsoft component called RoboCopy.

The web publisher runs continuously. It periodically scans the database for changed records, invokes multiple page writer threads to create pages, and goes back to the database for the next round of changes. Under typical operational loads, this means that the publisher updates pages approximately every ten minutes, but the scan period can vary. Sites can be grouped by priority, so that some are processed more frequently than others.

When an end user accesses a client's auction site, various pages are delivered in response to user requests. A typical interaction involves a user browsing through the category tree looking for a certain type of item. Each of the requests generated by this activity can be fulfilled by sending existing pages from the file server directly back to the user.

When a user requests information about a specific item, a lot publisher Active Server Pages (ASP) script is invoked with the item number and other details as input parameters. This script assembles the requested page on the fly using the site's lot page template, the page menu HTML fragment, the lot detail fragment (stored on the file server), and token information specific to each site. The site-specific information is stored in server memory where it was loaded from the live database as part of server updates.

The lot detail fragment is a representation of the information on a lot detail page that is not customized for viewing on any particular site. When a lot detail page is requested for a particular auction site, this information is customized for viewing on that site. The fragment is then left on the file server, in case it is needed again-either by the same server or a different server. If the information in the fragment has not changed in the database, the fragment can be reused. This feature can take pressure off of the database.

The following table lists the different types of pages created by the publisher. This table also indicates how many pages are created for each type for each site, where these pages are stored, and whether the publisher output varies by site.

TABLE 1

Pages Created by Publisher

| Page type | What publisher creates | How many pages per site | Destination (where publisher places pages) | Does publisher output vary with each site? |
| --- | --- | --- | --- | --- |
| Home page | HTML | 1 | web server (indirectly - see Note a) | Yes |
| Main search page | HTML | 1 | File server | Yes |
| Main place page | HTML | 1 | File server | Yes |
| "drill down" pages for browsing | HTML | Multiple (Note b) | File server | Yes |
| "drill down" pages for placing items for sale | HTML | Multiple (Note b) | File server | Yes |
| Category map for browsing | HTML | 1 | File server | Yes |
| Category map for placing items for sale | HTML | 1 | File server | Yes |
| "leaf" pages | HTML | Multiple (Note c) | File server | Yes |
| Lot detail page fragment (Note d) | Tagged text that is interpreted when the lot detail pages are built | Multiple (Note e) | File server | NO |
| Menu page (ingredient of lot detail page) | HTML fragment | Multiple (Note e) | File server | Yes (Note f) |

Notes on Table 1:
(a) The publisher places each site's home page on a replication server that in turn transfers the home page onto all existing web servers. Additional web servers can be added to the configuration without modifying the publisher.
(b) The number of "drill down" or category subpages depends on the size and structure of the category tree. This number is different for each site.
(c) The number of "leaf" pages also depends on the size and structure of the category tree. This number also differs for each site.
(d) Lot detail page fragments are created by the lot publisher program. All other page types are created by the web page publisher program,
(e) A lot detail page is created for each item currently available for sale. The publisher does not create lot detail pages for each site. Instead, these pages are assembled only when created, using publisher output (lot detail page plus menu page) as well as other template and token information.
(f) Menus differ from site to site because of different category trees, separator characters, and fonts used to display the information.

There are three database record types that are particularly important to the publisher because of their effects on the form and content of the pages that it creates: item records, category records, and site information records. Item records are records that are created in an item table in the database each time a new item is offered for sale, and closed each time an item is sold. Item records include fields that affect the leaf pages and lot detail pages. Closing an item record indicates to the publisher that it should remove it from its database, and indicates to the search module that it should do the same to its database. The publisher also creates a revised version of a lot detail page once an item has been sold so that users who access the pages through a path other than leaf pages will see that the item is no longer available. Bidding causes slight changes to both leaf pages and lot detail pages.

New or changed category records modify the size and shape of the category tree for a site. These changes in turn affect the appearance of the so-called drill-down pages as well as the menu fragments that appear on several types of pages.

Site Information Records are the records are created by administration users using the administration module. Site information changes can affect the appearance of all pages.

Instead of using a predefined hierarchy to locate items, a user might use the auction server system's search subsystem. This subsystem is similar to the publisher in that it maintains a database of currently available items and delivers lists of items in response to user requests. It differs from the publisher in that the publisher uses predefined criteria (each site's category tree) and creates pages (except lot detail pages) before they are requested, while the search subsystem relies on user-specified criteria and creates the listing pages only when they are requested. Note that the page construction logic for each site exists in both search and the publisher.

The search subsystem is implemented as a Structured Query Language (SQL) database, although other implementations are possible, such as full-text index. Each user search request is translated into an SQL query on this database. In one embodiment, there are five identical search boxes to provide adequate capacity for user load.

The search subsystem depends on the publisher for information about changes to the database. In particular, the lot publisher writes a record into a file for each lot detail page that it creates. When all writer threads have completed execution, the file is sent to the search subsystem.

Like the publisher, the search subsystem performs three types of operations. Listing new items for sale results in new records in the search SQL database. Items that have changed (new high bid, etc) cause existing records to be modified. Items that have been sold appear in the file as modified records (status is closed). The search subsystem will change the status of these records accordingly, but they can be thought of as disappearing from the search database because search queries will never find them.

Depending on access patterns, it may be possible to publish pages selectively based on anticipated demand. In such an embodiment, the publisher creates pages that are likely to be accessed before the fact, but defers other pages until and unless they are requested. The publisher can also be configured to generate views of the data in formats other than scripted pages, such as text or bitmaps. In one embodiment, auction information is distributed by pager.

The search subsystem and publisher could also be combined. In such an embodiment, the search subsystem can search its database for items that meet a user's search criteria but feed this information back to the publisher for actual page creation.

Although the system described above is implemented using a particular combination of hardware and software, other implementations are also possible. System elements can be built using special-purpose hardware, software running on a general purpose processor, or a combination of both. In addition, while the system can be broken into the series of modules and functional groupings shown, one of ordinary skill in the art would recognize that it is also possible to combine them and/or split them to achieve a different breakdown.

It is contemplated that information about user preferences can be gleaned from their interactions with the auction system. This information can be used to generate advertising tailored to the individual user. It is also contemplated that advertising space could be reserved on the auction pages and filled on an auction-network-wide basis. Revenue from this advertising could be shared between the auction system and member systems.

In addition, while an auction system with classified capabilities was presented as an illustrative embodiment, other sales models, such as reverse auctions, requests for proposals (RFP's), "wanted to buy," and coupons, can also be provided using the same approach. Like the auction system, such systems can employ a customized interface to bring offerors and buyers/respondents together through a network of member sites, and facilitate transactions between them.

The auction network has the ability to take listings from one network site and promote them on another network site. In one embodiment, this is set up by auction server system personnel through a distributed merchandising area interface that interacts with the publisher, although an automated end user interface could also be provided.

A merchandising area (or showcase area) can contain either a group of listings or scripting commands. Each merchandising area is linked to a token that can be distributed to any site on the network. Merchandising areas can be distributed at the site level or the page level, depending on the type of token. When a site's user interface is built using the template/token tool, these merchandising tokens are placed into the page template.

When the merchandising area is populated with scripting commands or listings, the contents of the merchandising area shows up on the sites that contain the related token. These contents show up wherever the token is positioned on that page. In one embodiment, merchandising area setup and population are performed in the control section of the administration module, by it would be possible to allow other administration users to access these functions.

Figure 45:
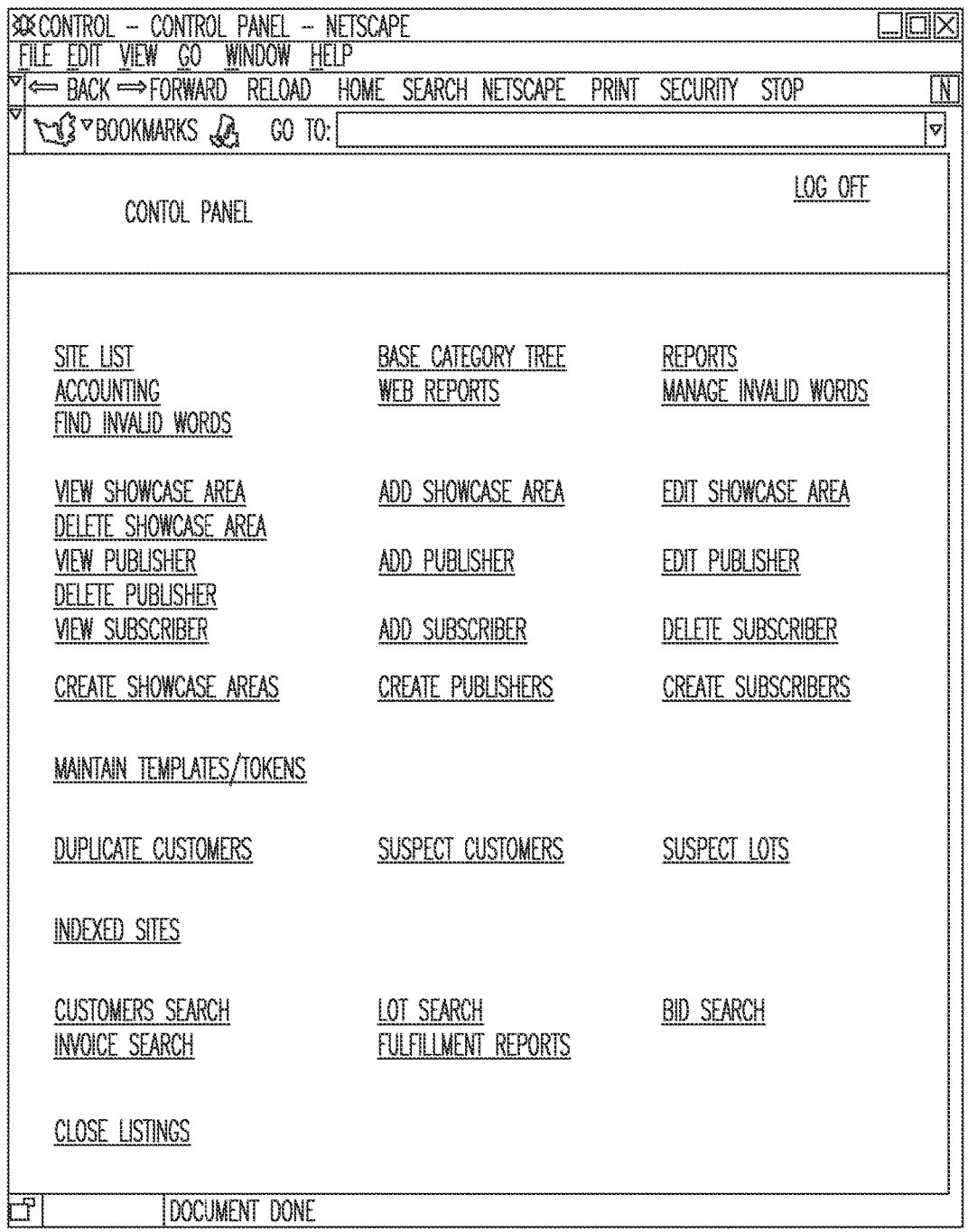
FIG. 45 is a screen view of an administration control panel page for the auction server system.
Figure 46:
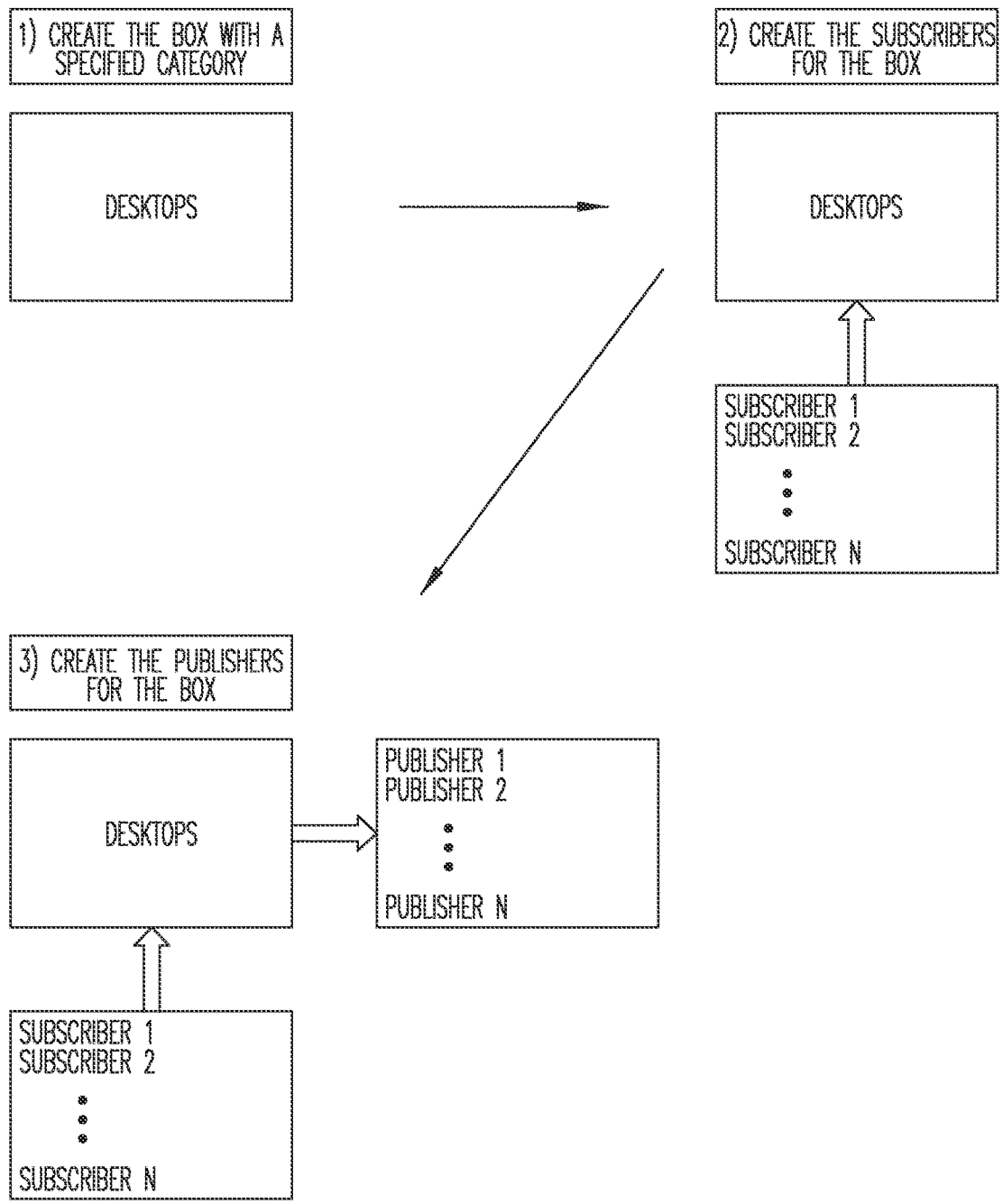
FIG. 46 is a state diagram illustrating the creation of a showcase area.

Referring to FIGS. 45 and 46, showcase areas get their start in the control panel. An auction server system employee first creates a showcase area that is associated with a specified category that is to be featured and/or merchandised. Once the category specific showcase area is created, the next step is to create both publishers (where the box will show up) and Subscribers (those customers that can add item-related content into the showcase area). Adding Subscribers is performed by clicking an "Add Subscriber" link and then selecting the appropriate customers from the list that should be allowed to enter items into the box. The Final Step is to add Publishers or the site that the box will show up on. This is achieved in an almost identical process to adding subscribers. The user first selects a "Create Publishers" link and then selects the sites that he or she would like to have the showcase box and its featured items show up on.

For example, for a Computers/Desktops page, we would want listings from computer merchants to show up, but not other types of merchants. Site-specific boxes can also be created by specifying the publisher and subscriber to be the same or related entities. In such cases, no other manufacturers or resellers are able to list items in this box.

The present disclosure has now been described in connection with a number of specific embodiments thereof. However, numerous modifications which are contemplated as falling within the scope of the present disclosure should now be apparent to those skilled in the art. Therefore, it is intended that the scope of the present disclosure be limited only by the scope of the claims appended hereto. In addition, the order of presentation of the claims should. not be construed to limit the scope of any particular term in the claims.

We claim:
1. A sales system, comprising:
a first sales interface;
a second sales interface; and
at least one processor and executable instructions, accessible on a computer-readable medium, that, when executed, cause the at least one processor to perform operations comprising:

generating the first sales interface based on a first set of customization commands and communicating the first sales interface, over a network, through a first member site to a first user;
generating the second sales interface based on a second set of customization commands and communicating the second sales interface, over the network, through a second member site to a second user;
receiving a first request to view a listing of an item that is presented in an offer for sale to the first user via the first sales interface;
receiving a second request to view the listing of the item that is presented in an offer for sale to the second user via the second sales interface;
storing an object model representation of a central database system in memory, the object model representation including a record of the listing;
retrieving the record of the listing from the central database system in response to the receiving the first request or the second request to view the listing;
detecting a change of the record, the change based on a sale of the item of the record;
modifying, in memory, the object model representation of the central database system in response to the detecting the change of the record, the object model being a structured representation of data in memory, the data being retrieved from the central database system and stored in the object model;
regenerating the first and second sales interfaces while the sales system is operational in response to the modifying the object model representation.

2. The system of claim 1, wherein the first and second sales interfaces are operative to present a plurality of linked pages.

3. The system of claim 1, wherein the first sales interface includes elements that are included in a first set of pages and wherein the second sales interface includes elements that are included in a second set of pages.

4. The system of claim 1, wherein the first sales interface includes a header that is included in the first set of pages and wherein the second sales interface includes a header that is included in the second set of pages.

5. The system of claim 1, wherein the first sales interface includes interface elements that include at least part of a name of the first domain, and wherein the second sales interface includes interface elements that include at least part of a name of the second domain.

6. The system of claim 1, wherein the operations are further comprising receiving a user arrangement of a plurality of user interface tokens, the user interface tokens define display attributes of at least one view of at least one of the plurality of sales interfaces.

7. The system of claim 6, wherein the user interface tokens represent parts of the first and second sales interfaces that are customizable.

8. The system of claim 1, wherein the operations are further comprising scanning the central database system to identify the record in the central database system that is changed.

9. The system of claim 1, wherein the operations are further comprising maintaining a dirty bit to indicate a change since the last generation of the first or second sales interfaces.

10. A method comprising:
generating a first sales interface based on a first set of customization commands;
generating a second sales interface based on a second set of customization commands;
communicating the first sales interface, over a network, through a first member site to a first user;
communicating the second sales interface, over the network, through a second member site to a second user;
receiving a first request to view a listing of an item that is presented in an offer for sale to the first user via the first sales interface;
receiving a second request to view the listing of the item that is presented in an offer for sale to the second user via the second sales interface;
retrieving a record of the listing from a central database system in response to the receiving the first request or the second request to view the listing;
detecting a change of the record, the change based on a sale of the item of the record;
modifying, in memory, an object model representation of a central database system in response to the detecting the change of the record, the object model being a structured representation of data in memory, the data being retrieved from the central database system and stored in the object model; and
regenerating the first and second sales interfaces responsive to the modification, in memory, of the object model representation, while the sales system is operational.

11. The method of claim 10, wherein the first and second sales interfaces operate to present a plurality of linked pages.

12. The method of claim 10, wherein the first sales interface includes elements that are included in a first set of pages and wherein the second sales interface includes elements that are included in a second set of pages.

13. The method of claim 10, wherein the first sales interface includes a header that is included in the first set of pages and wherein the second sales interface includes a header that is included in the second set of pages.

14. The method of claim 10, wherein the first sales interface includes interface elements that include at least part of a name of a first domain, and wherein the second sales interface includes interlace elements that include at least part of a name of a second domain.

15. The method of claim 10, further comprising receiving a user arrangement of a plurality of user interface tokens.

16. The method of claim 15, wherein the user interface tokens define display attributes of at least one view of at least one of the plurality of sales interfaces, wherein the user interface tokens represent parts of the first and second sales interfaces that are customizable.

17. The method of claim 10, further comprising scanning the central database system to identify the record in the central database system that is changed.

18. The method of claim 10, wherein the record includes a dirty bit to indicate whether the record has been changed since the last generation of the first or second sales interfaces.

19. A machine readable medium having no transitory signals and storing a set of instructions that, when executed by the machine, cause the machine to perform actions comprising:
generating a first sales interface based on a first set of customization commands;
generating a second sales interface based on a second set of customization commands;
communicating the first sales interface, over a network, through a first member site to a first user;

communicating the second sales interface, over the network, through a second member site to a second user;

receiving a first request to view a listing of an item that is presented in an offer for sale to the first user via the first sales interface;

receiving a second request to view the listing of the item that is presented in an offer for sale to the second user via the second sales interface;

retrieving a record of the listing from a central database system in response to the receiving the first request or the second request to view the listing;

detecting a change of the record, the change based on a sale of the item of the record;

modifying, in memory, an object model representation of a central database system in response to the detecting the change of the record, the object model being a structured representation of data in memory, the data being retrieved from the central database system and stored in the object model; and regenerating the first and second sales interfaces responsive to the modification, in memory, of the object model representation, while the sales system is operational.

20. The machine readable medium of claim 19, further comprising scanning the central database system to identify the record in the central database system that is changed.

* * * * *